US009894360B2

United States Patent
Tsuchiya et al.

(10) Patent No.: US 9,894,360 B2
(45) Date of Patent: Feb. 13, 2018

(54) IMAGE PROCESSING DEVICE, IMAGE PROCESSING METHOD, AND PROGRAM

(71) Applicant: SONY CORPORATION, Tokyo (JP)

(72) Inventors: Toshiharu Tsuchiya, Kanagawa (JP); Masao Sasaki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 118 days.

(21) Appl. No.: 14/767,149

(22) PCT Filed: May 16, 2014

(86) PCT No.: PCT/JP2014/002602
§ 371 (c)(1),
(2) Date: Aug. 11, 2015

(87) PCT Pub. No.: WO2014/192244
PCT Pub. Date: Dec. 4, 2014

(65) Prior Publication Data
US 2015/0381980 A1    Dec. 31, 2015

(30) Foreign Application Priority Data

May 31, 2013   (JP) .................................. 2013-114947

(51) Int. Cl.
| | |
|---|---|
| *H04N 19/119* | (2014.01) |
| *H04N 19/176* | (2014.01) |
| *H04N 19/146* | (2014.01) |
| *H04N 19/156* | (2014.01) |
| *H04N 19/162* | (2014.01) |
| *H04N 19/124* | (2014.01) |

(52) U.S. Cl.
CPC ......... *H04N 19/119* (2014.11); *H04N 19/124* (2014.11); *H04N 19/146* (2014.11); *H04N 19/156* (2014.11); *H04N 19/162* (2014.11); *H04N 19/176* (2014.11)

(58) Field of Classification Search
CPC ...................................................... H04N 19/119
USPC ...................................................... 375/240.02
See application file for complete search history.

(56) References Cited

U.S. PATENT DOCUMENTS 8,849,052 B2 *   9/2014   Sato ..................... H04N 19/176
                                                              382/251
2009/0110066 A1    4/2009   Wang et al.
(Continued)

FOREIGN PATENT DOCUMENTS

| JP | 2007243337 A | * | 9/2007 |
| JP | 2008-78969 A |   | 4/2008 |
| JP | 2008078969 A | * | 4/2008 |

OTHER PUBLICATIONS

International Search Report and Written Opinion dated Sep. 26, 2014 in PCT/JP2014/002602.
(Continued)

*Primary Examiner* — Jonathan Messmore
(74) *Attorney, Agent, or Firm* — Oblon, McClelland, Maier & Neustadt, L.L.P.

(57) ABSTRACT

An image processing system, method and device for processing an image signal. The image processing system, method and device receive an operating mode signal indicative of a determined operating mode associated with resource efficiency, and control a depth of block division for a block setting process based on the determined operating mode indicated by the operating mode signal.

21 Claims, 31 Drawing Sheets

(56) References Cited

U.S. PATENT DOCUMENTS

| | | | |
|---|---|---|---|
| 2009/0304086 A1* | 12/2009 | Shi | H04N 19/176 375/240.24 |
| 2010/0295922 A1* | 11/2010 | Cheung | H04N 19/176 348/42 |
| 2011/0274142 A1* | 11/2011 | Miki | H04L 1/06 375/141 |
| 2013/0016787 A1* | 1/2013 | Kim | H04N 19/176 375/240.16 |
| 2014/0036995 A1 | 2/2014 | Wang et al. | |

OTHER PUBLICATIONS

Satish Lokkoju, et al., "Fast Coding Unit Partition Search" IEEE International Symposium on Signal Processing and Information Technology (ISSPIT), XP032496073, 2012, pp. 315-319.

\* cited by examiner

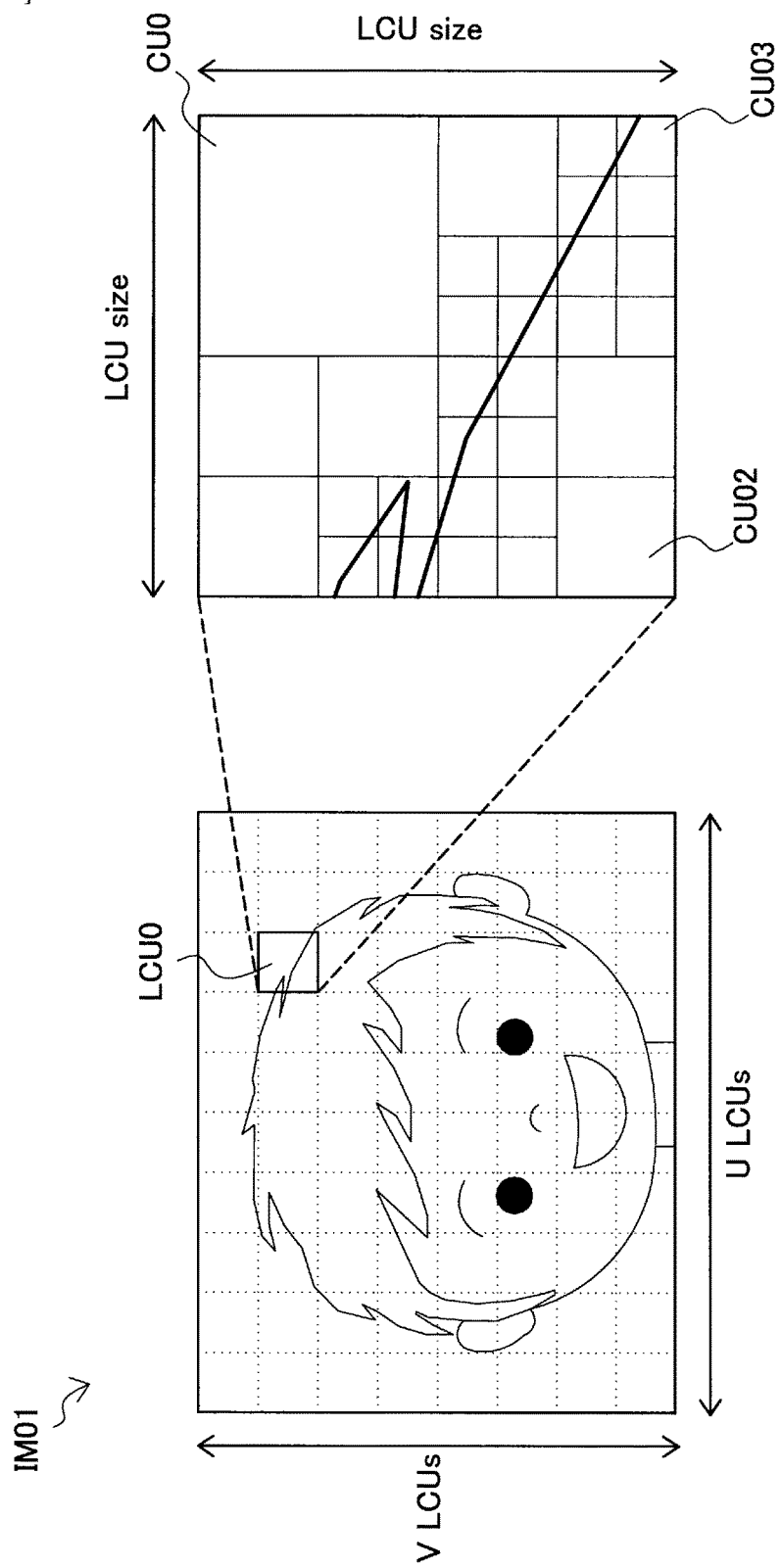
[Fig. 1]

[Fig. 2]
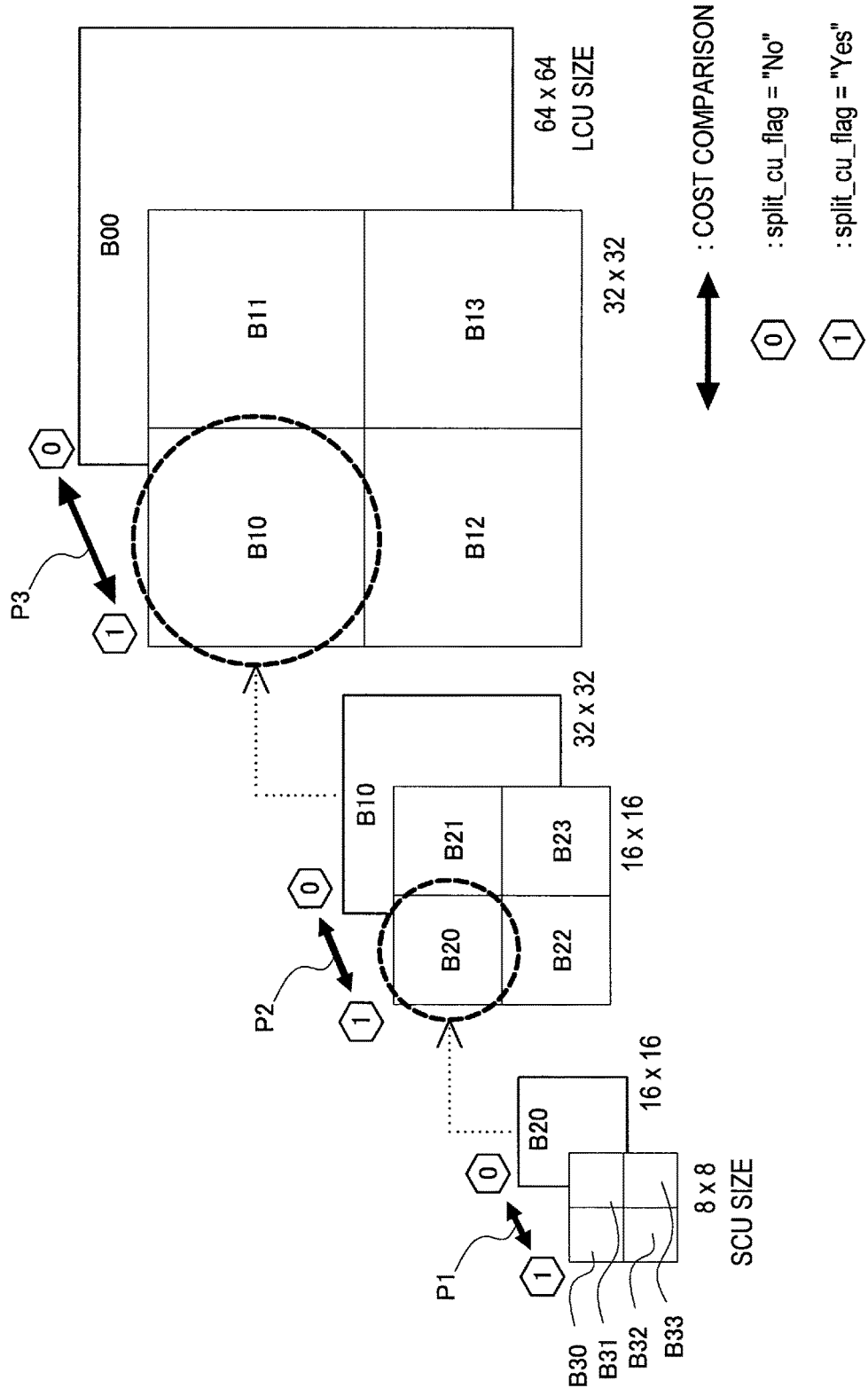

[Fig. 3A]

[Fig. 3B]
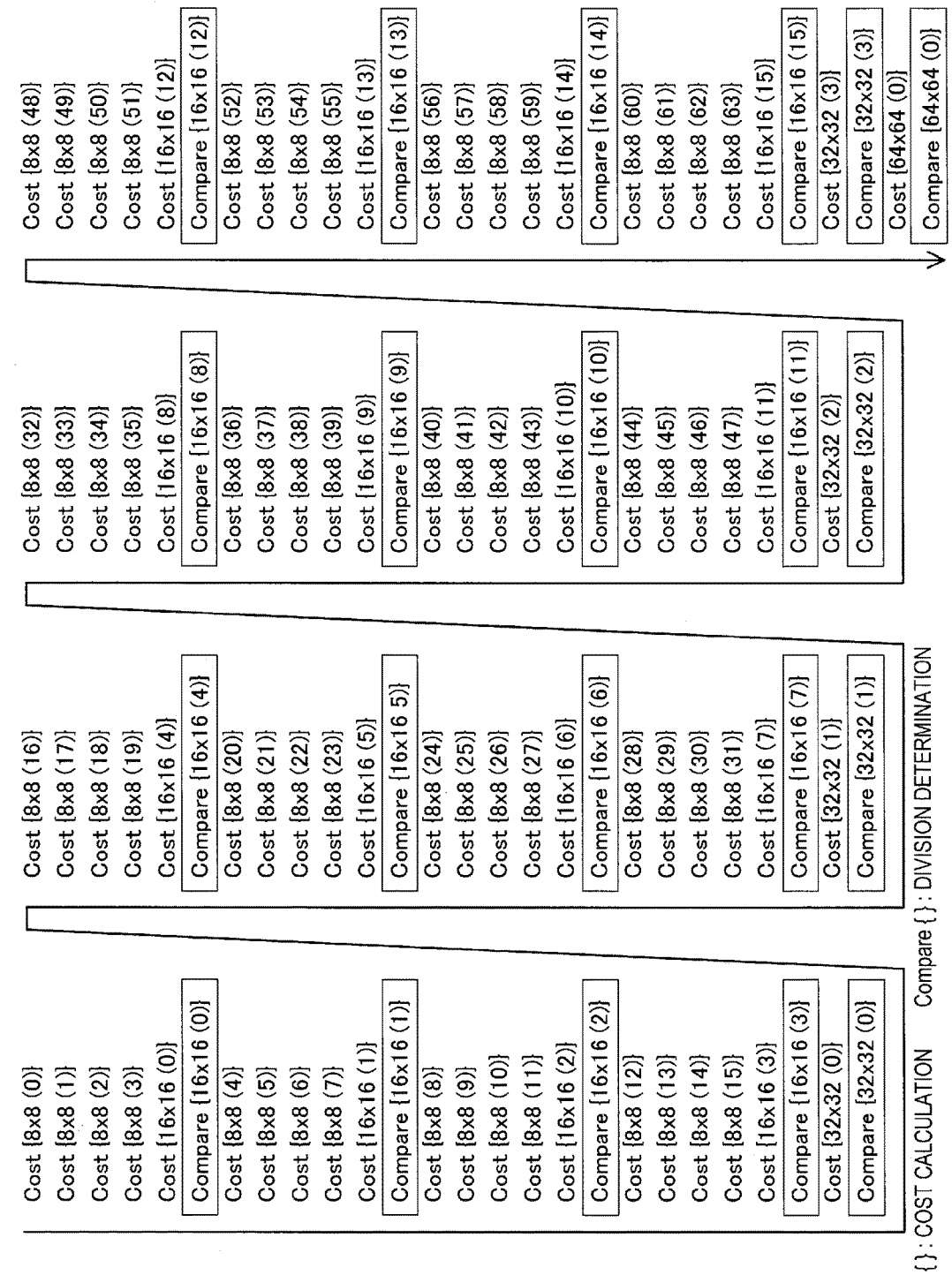

[Fig. 4]
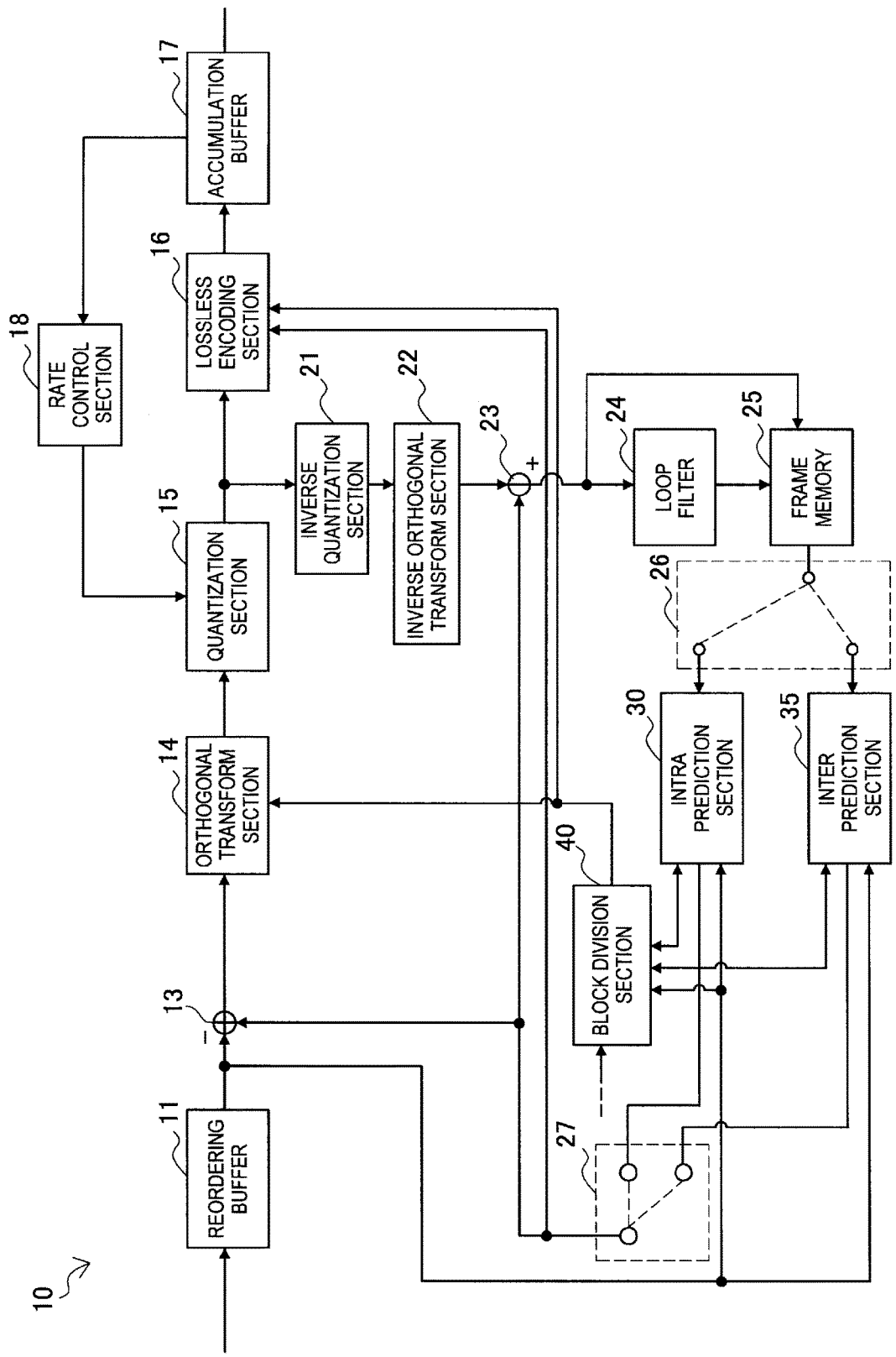

[Fig. 5A]
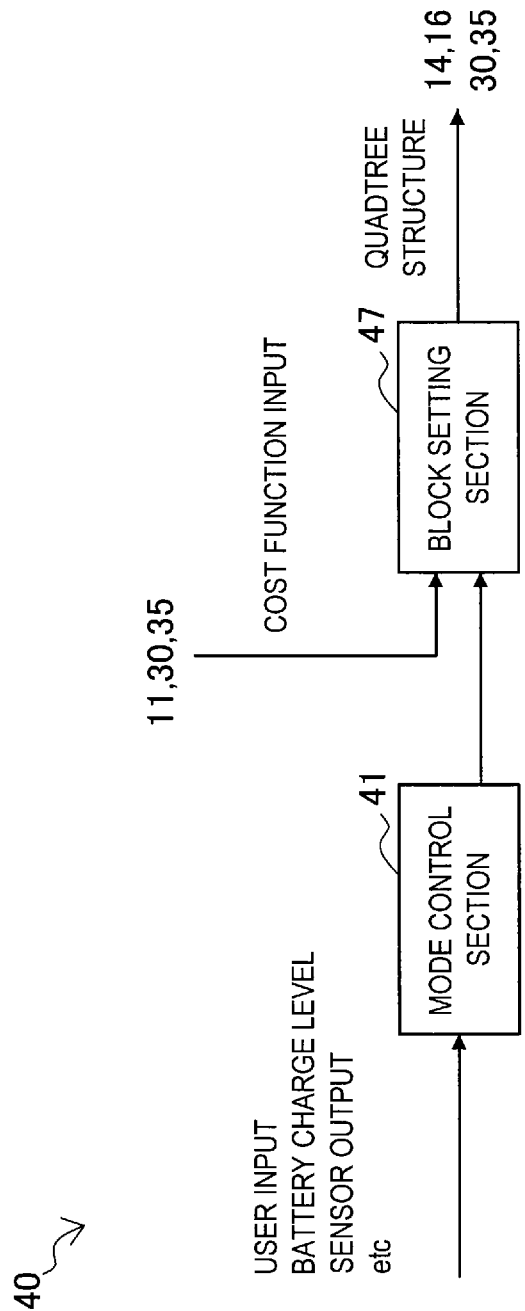

[Fig. 5B]
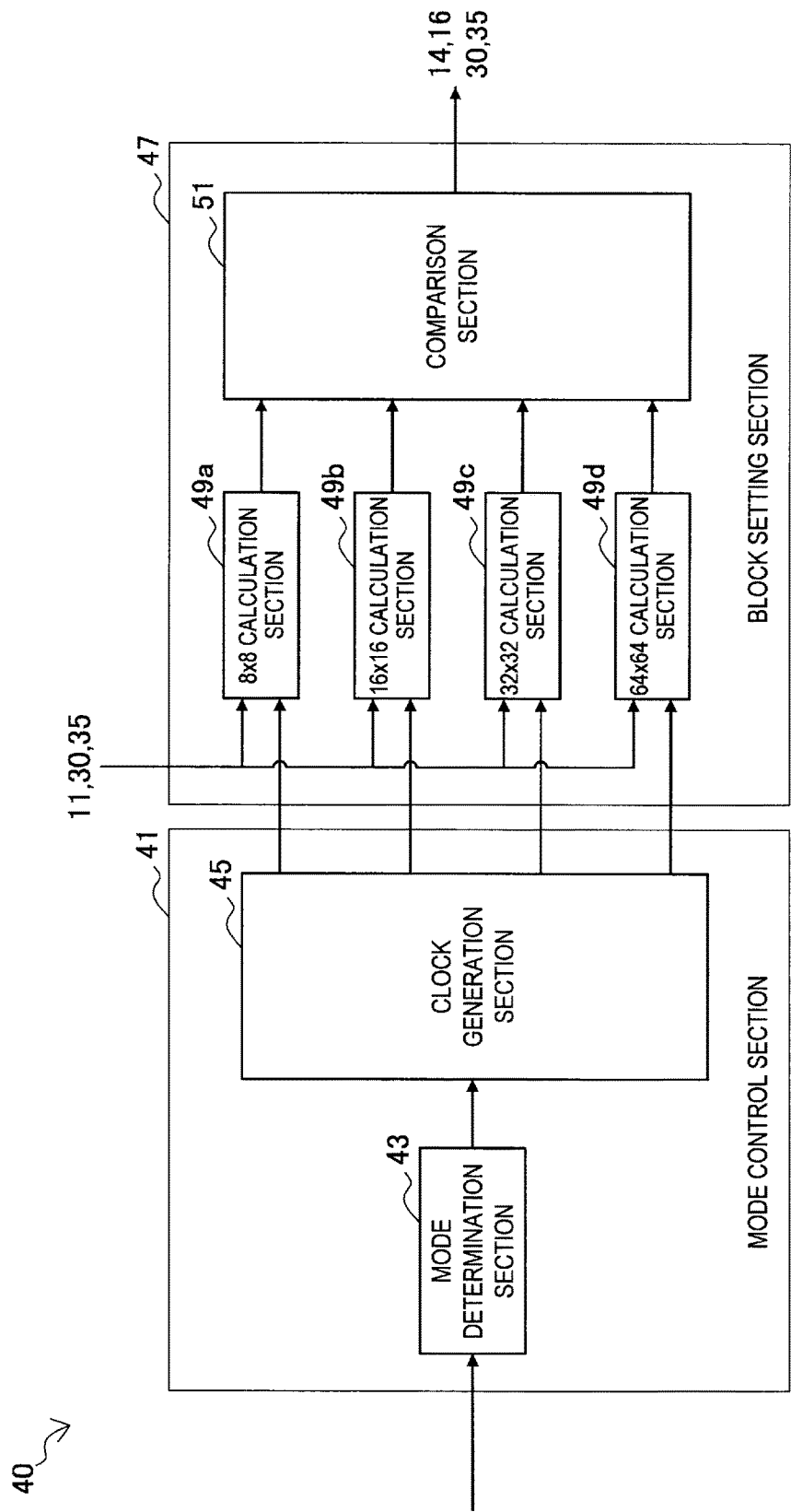

[Fig. 5C]
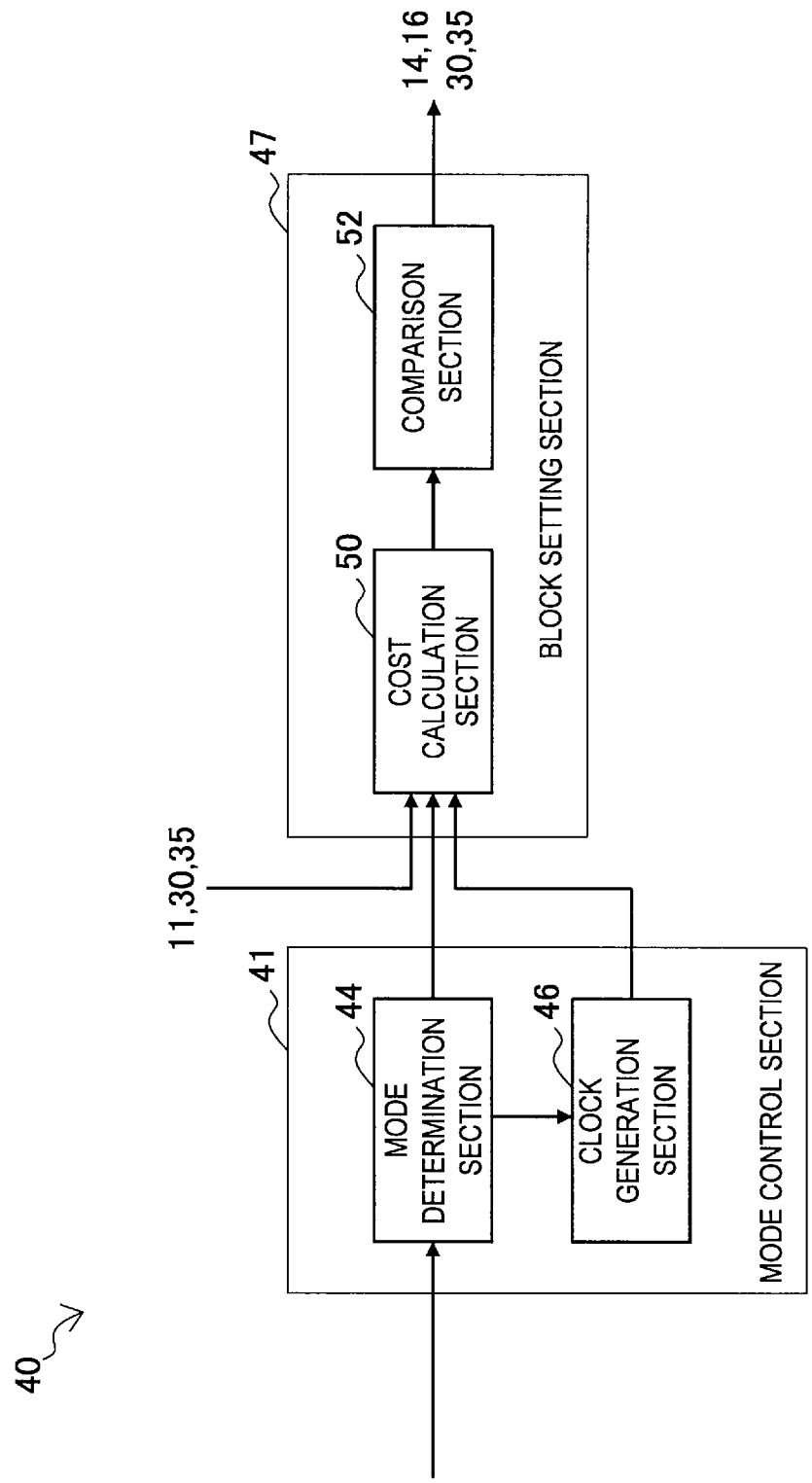

[Fig. 6A]
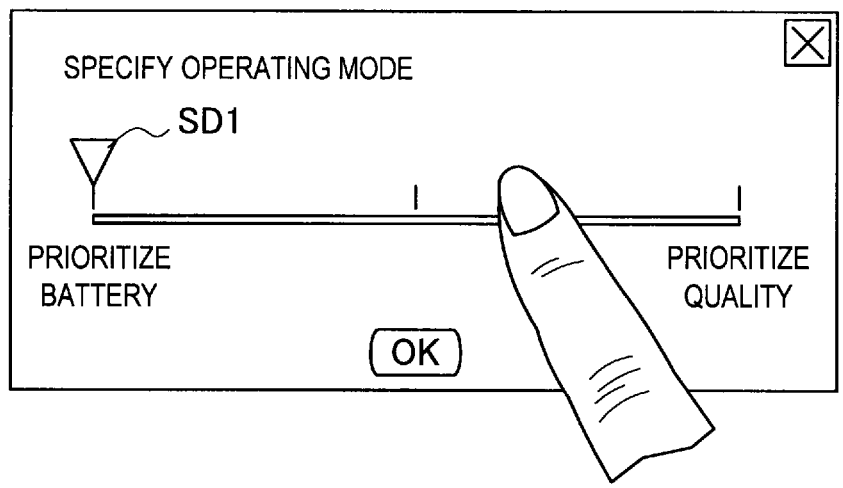
[Fig. 6B]
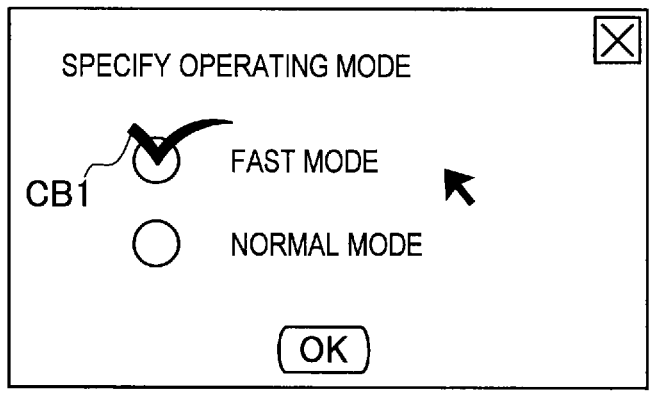

[Fig. 7A]
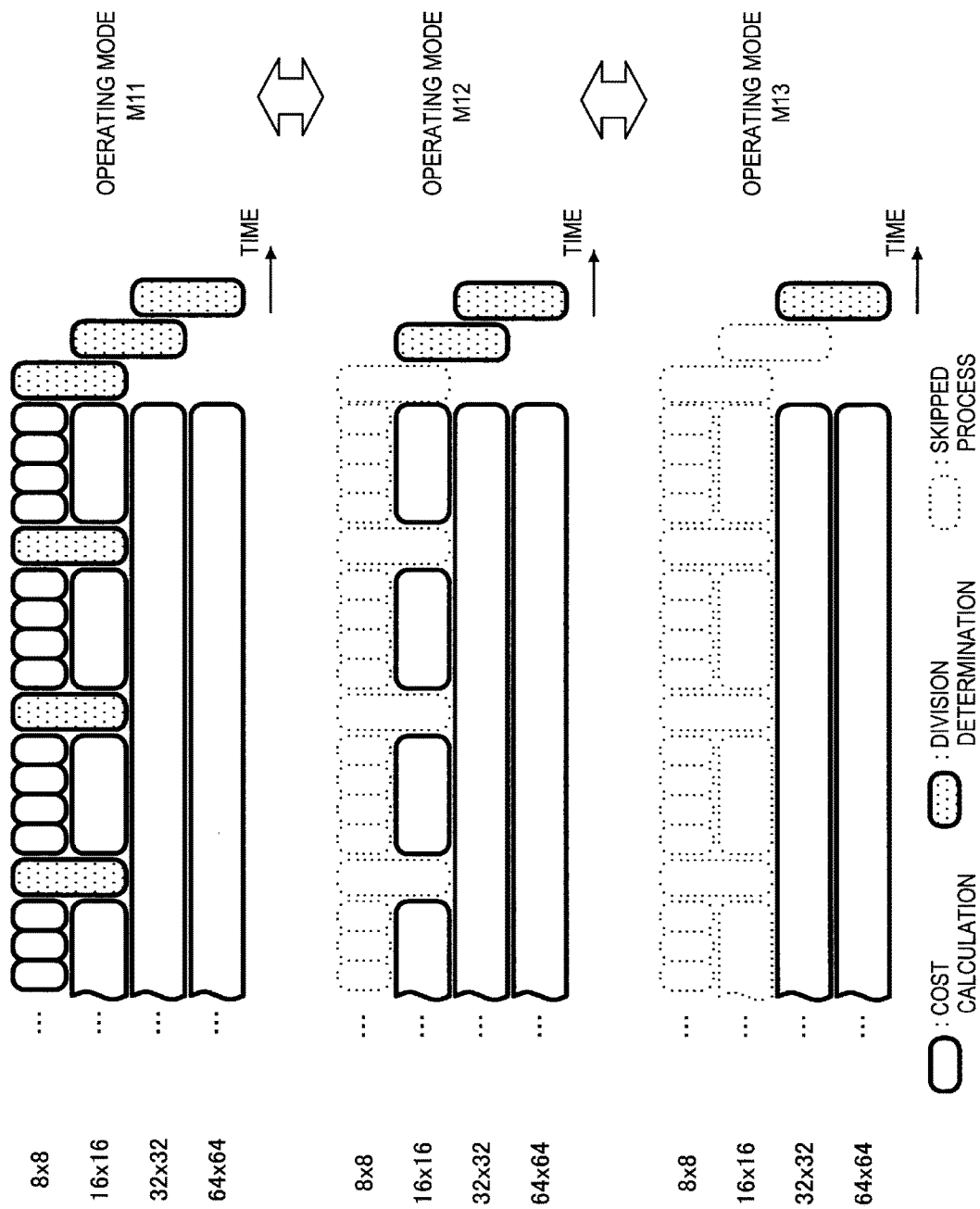

[Fig. 7B]
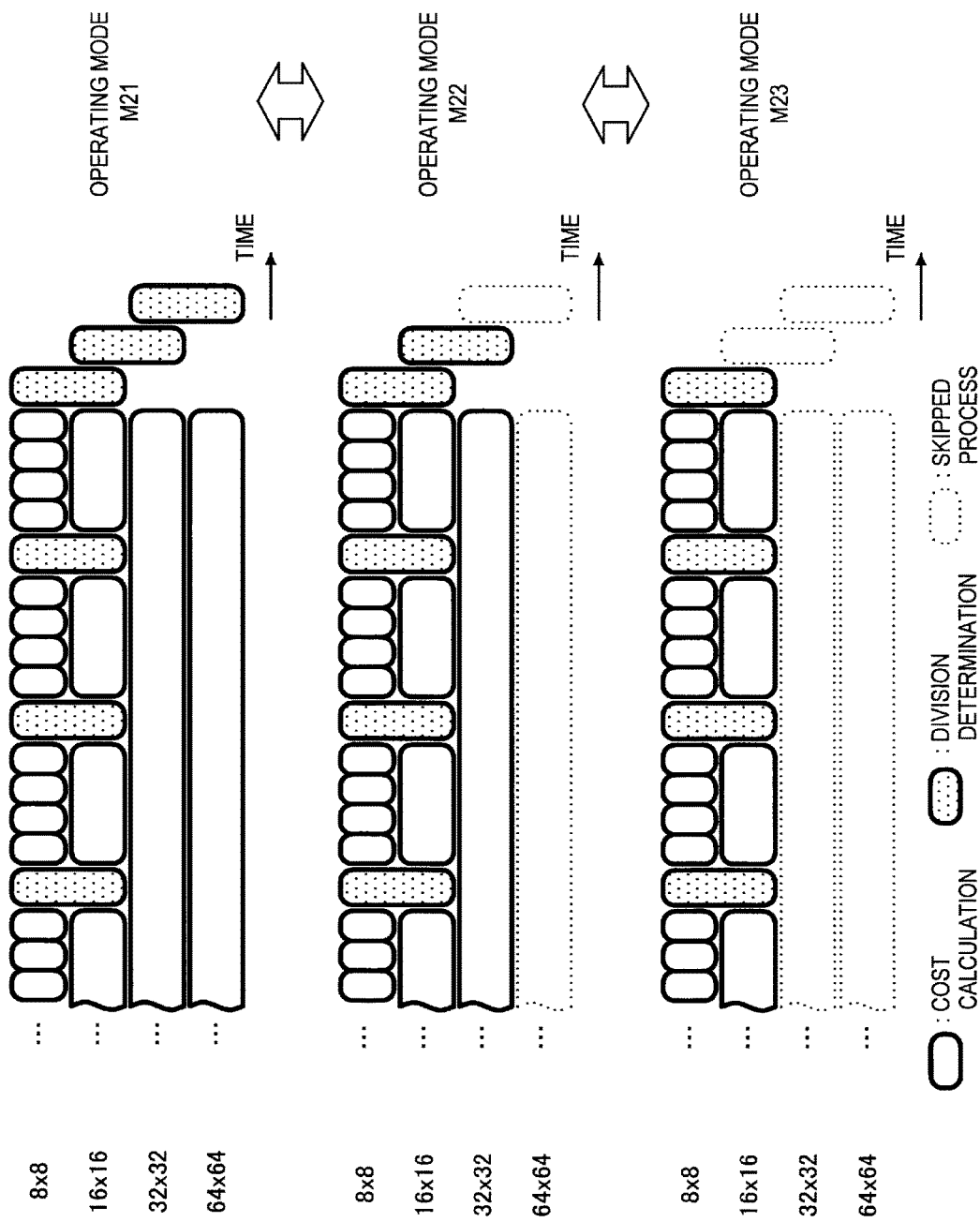

[Fig. 8A]
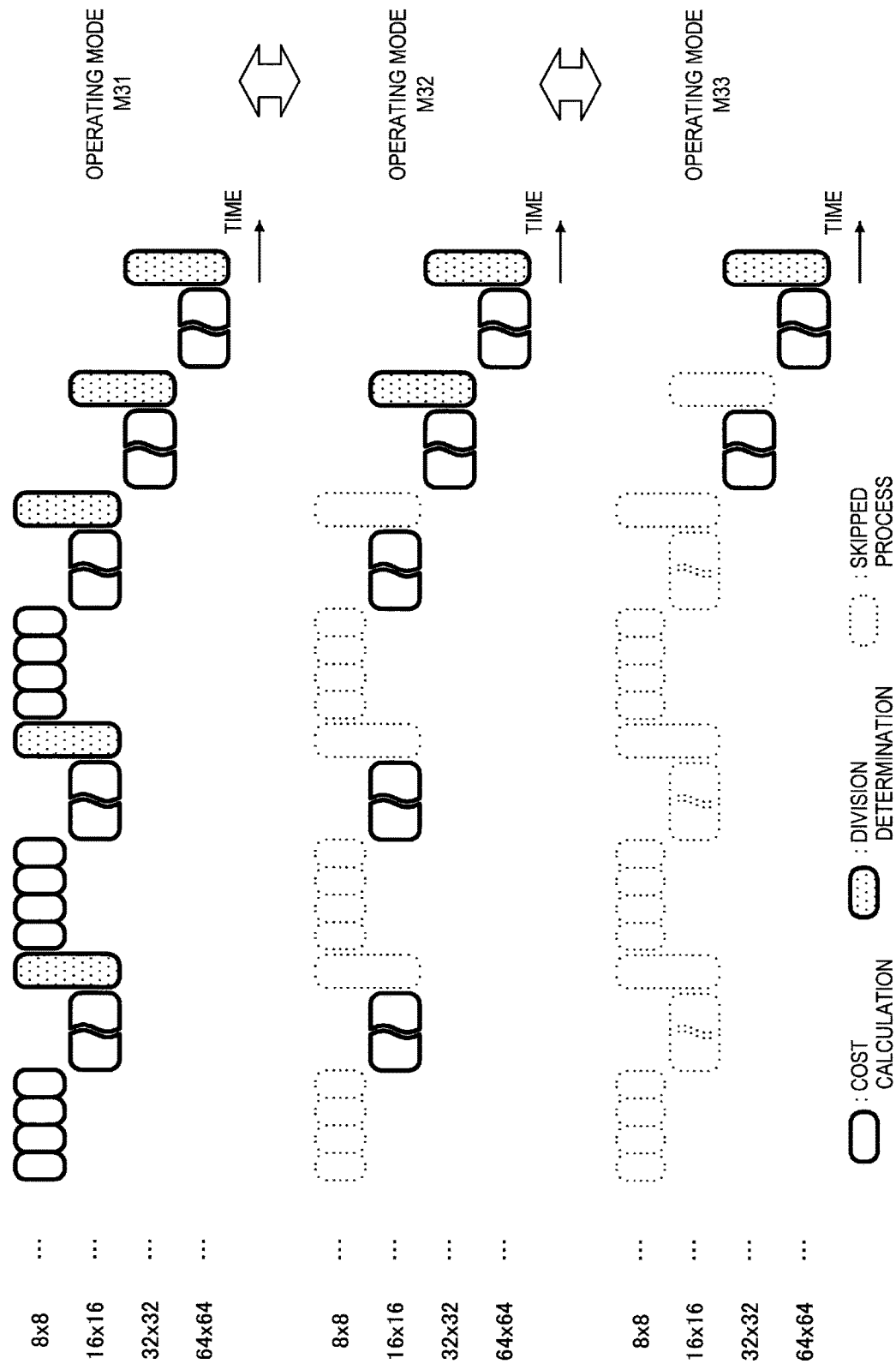

[Fig. 8B]
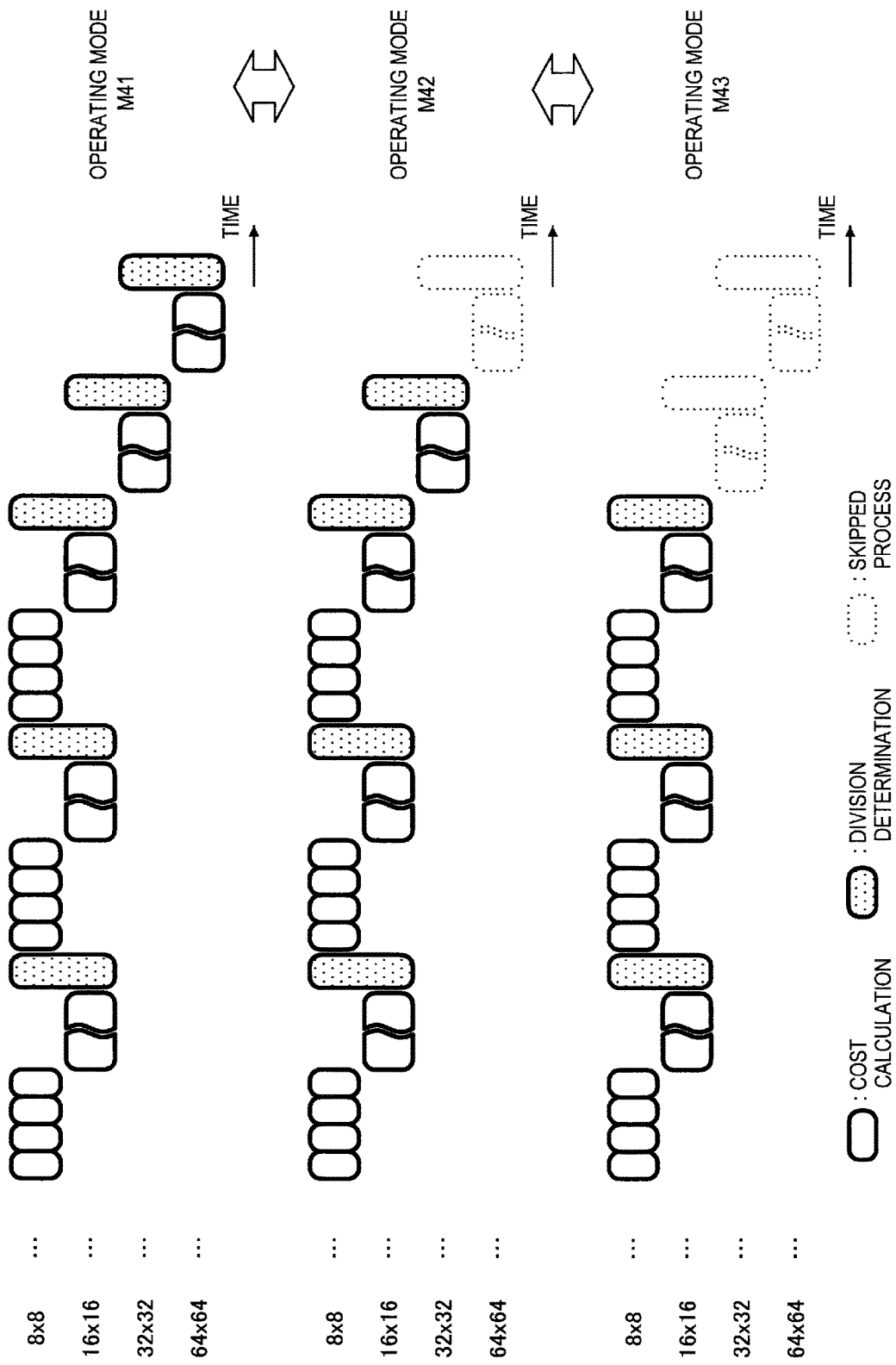

[Fig. 9]
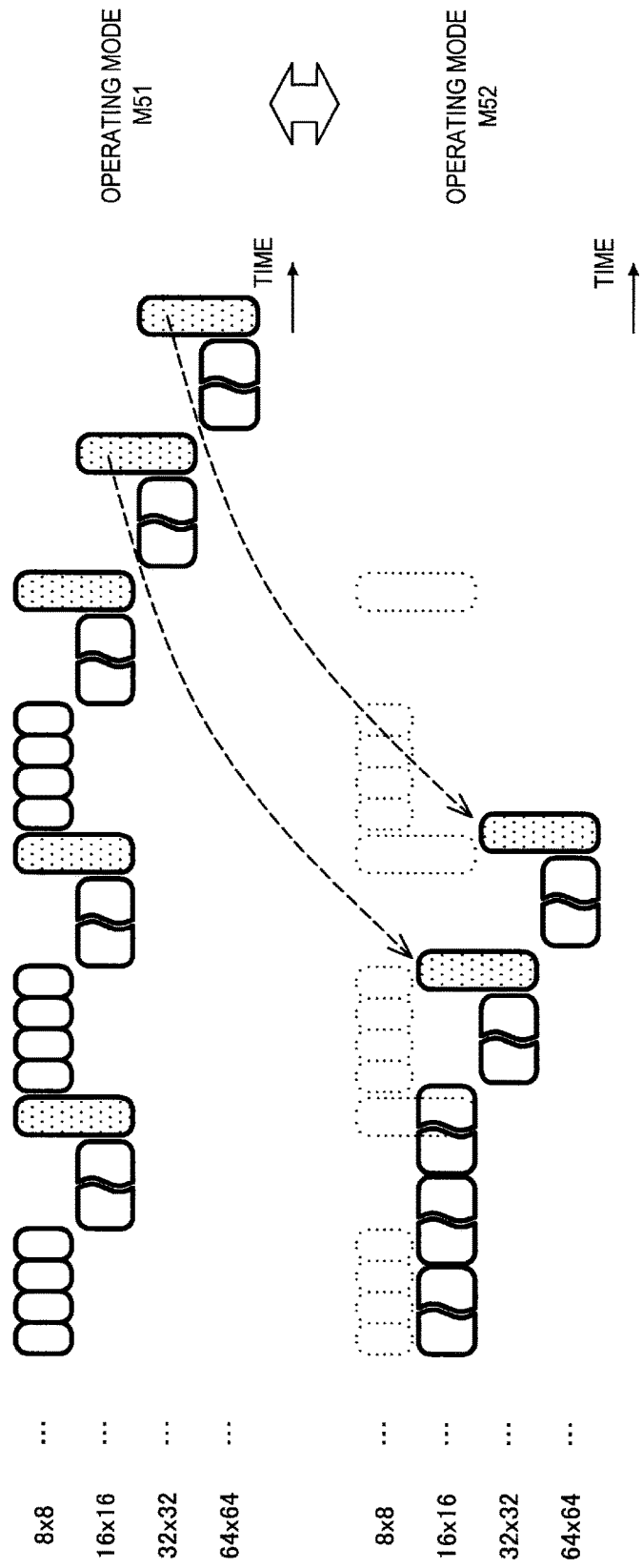

[Fig. 10]
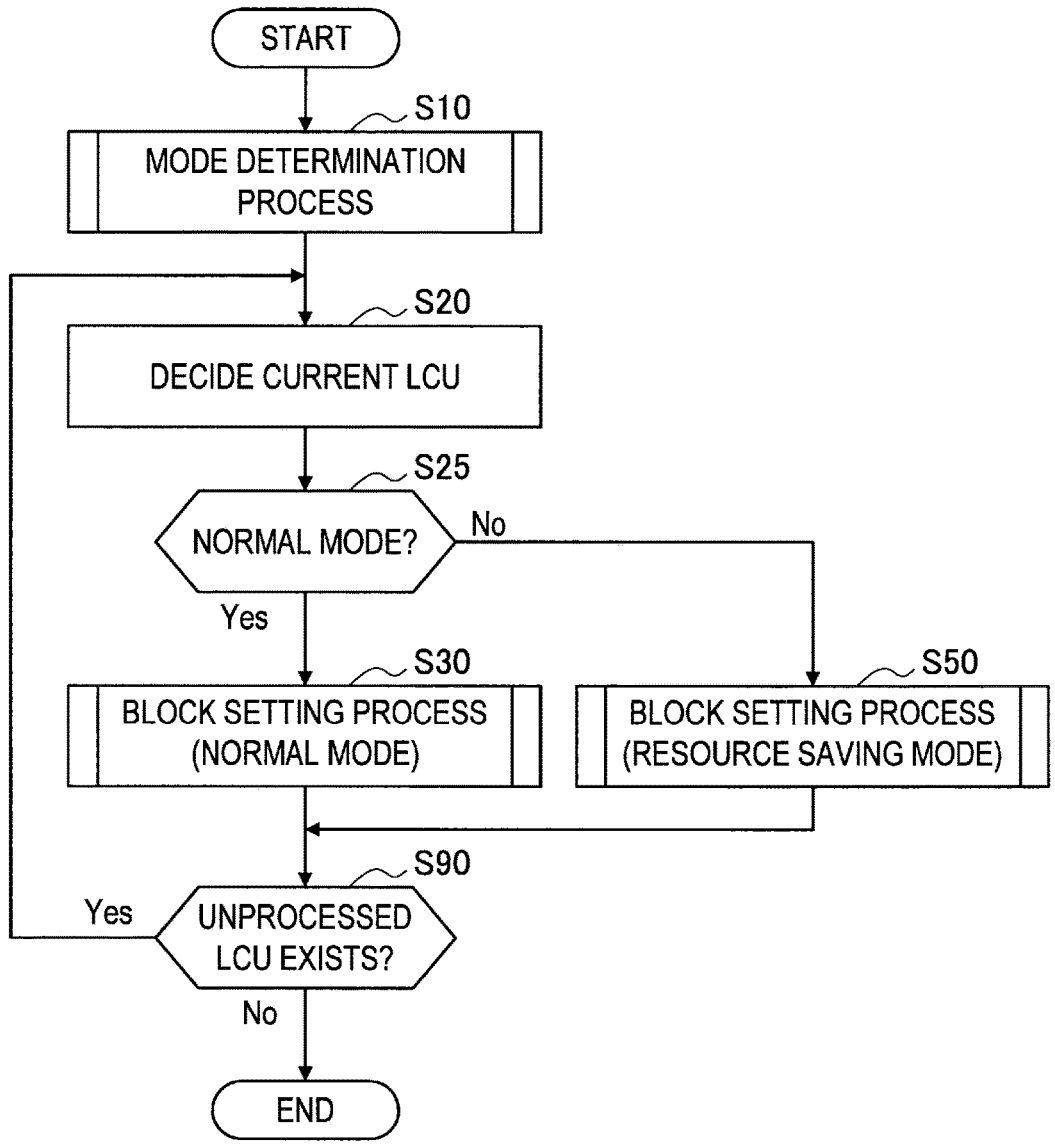

[Fig. 11A]
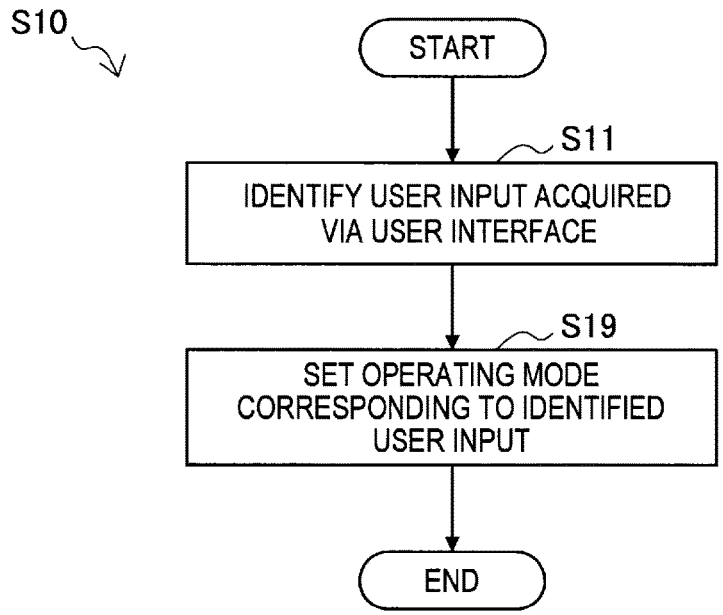
[Fig. 11B]
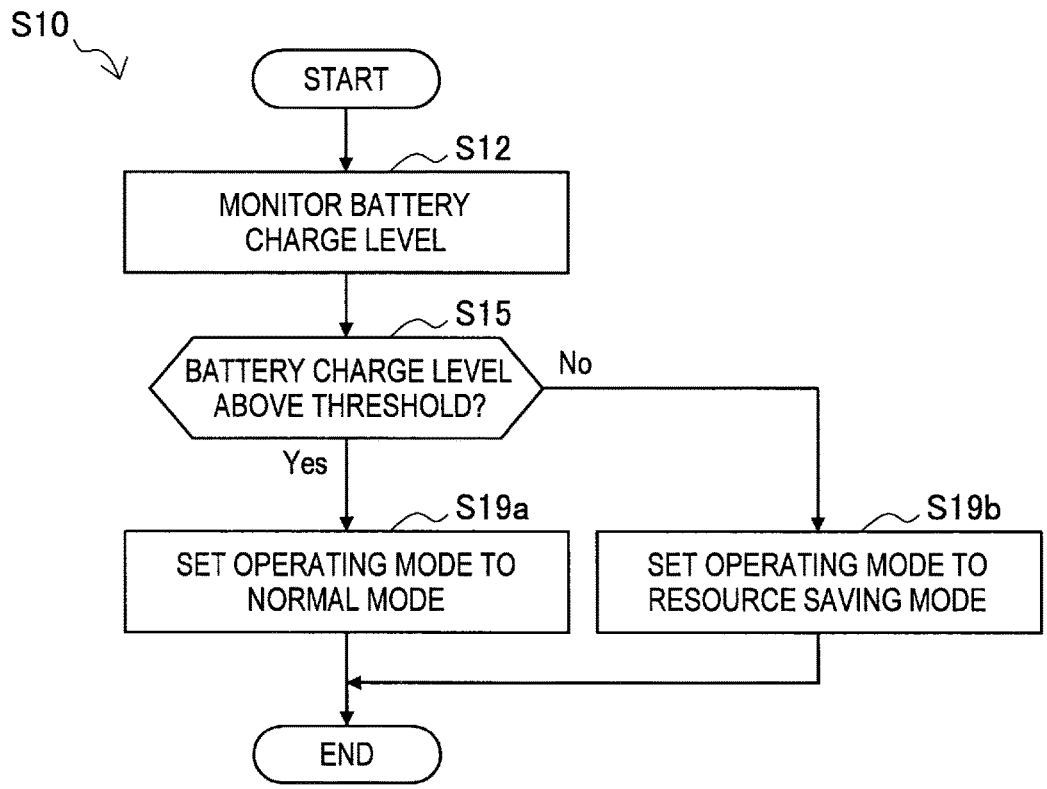

[Fig. 11C]
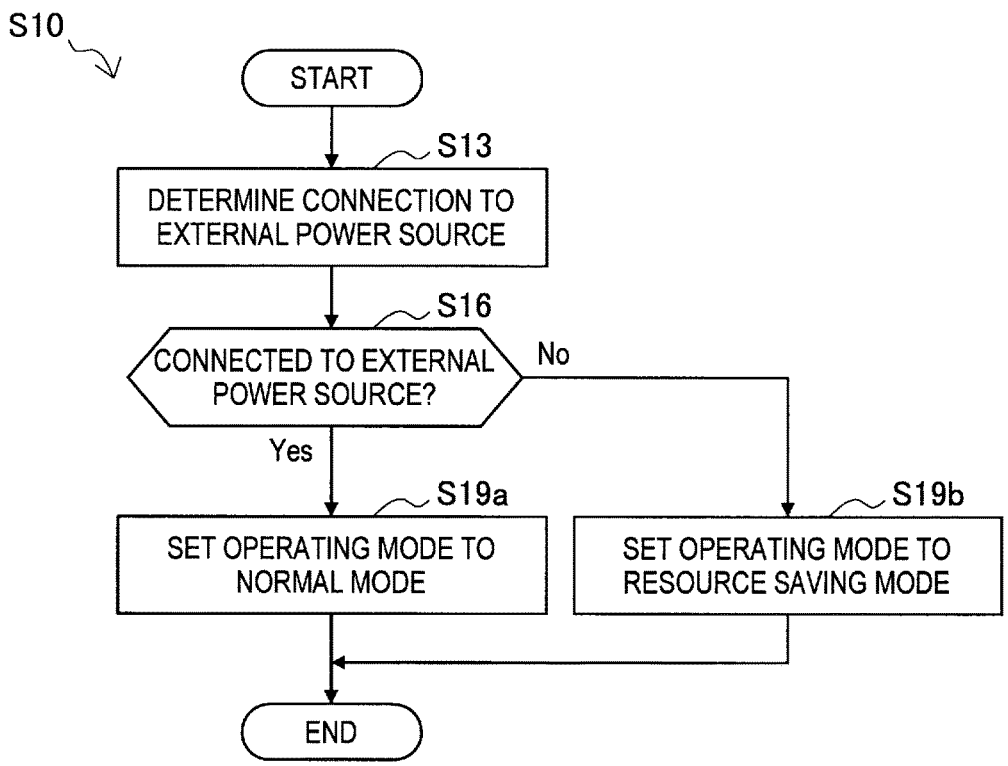
[Fig. 11D]
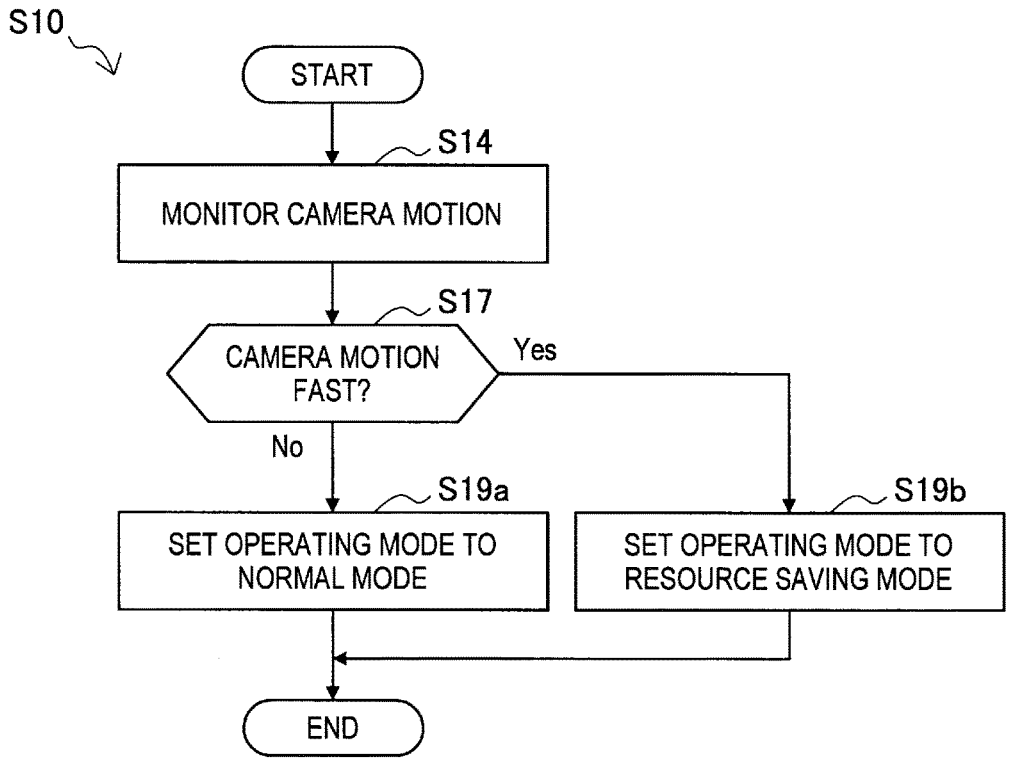

[Fig. 12]
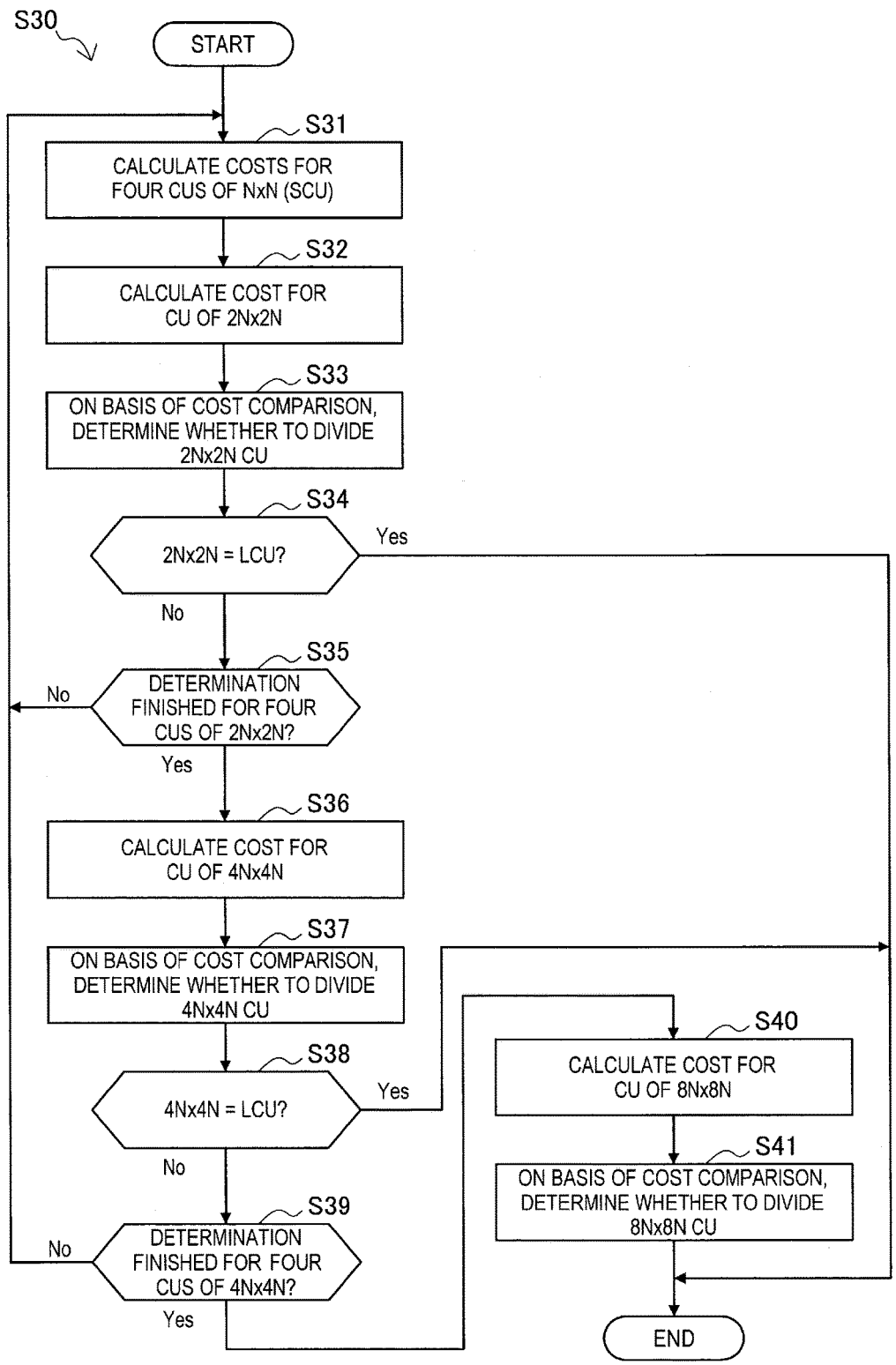

[Fig. 13A]
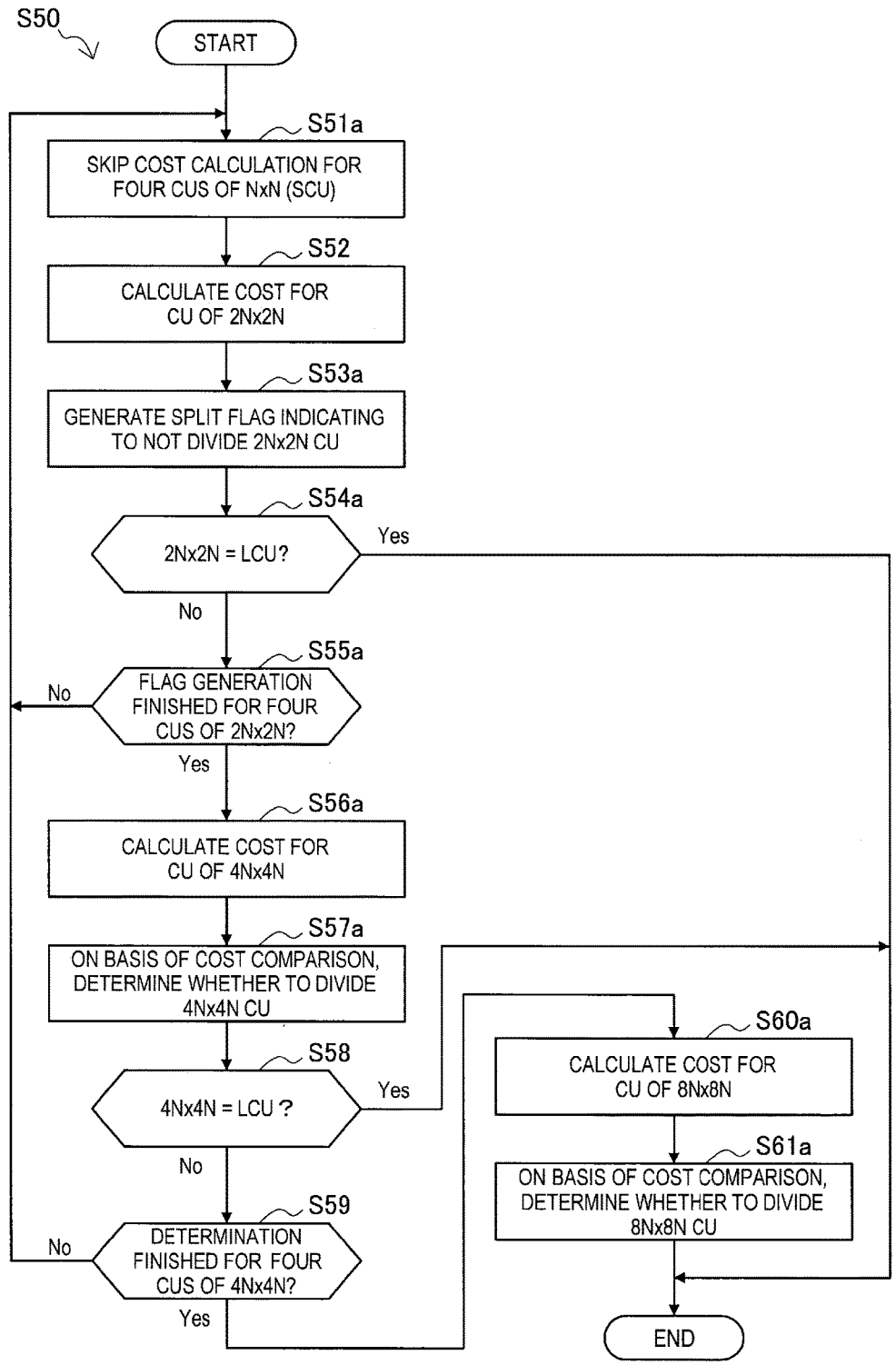

[Fig. 13B]
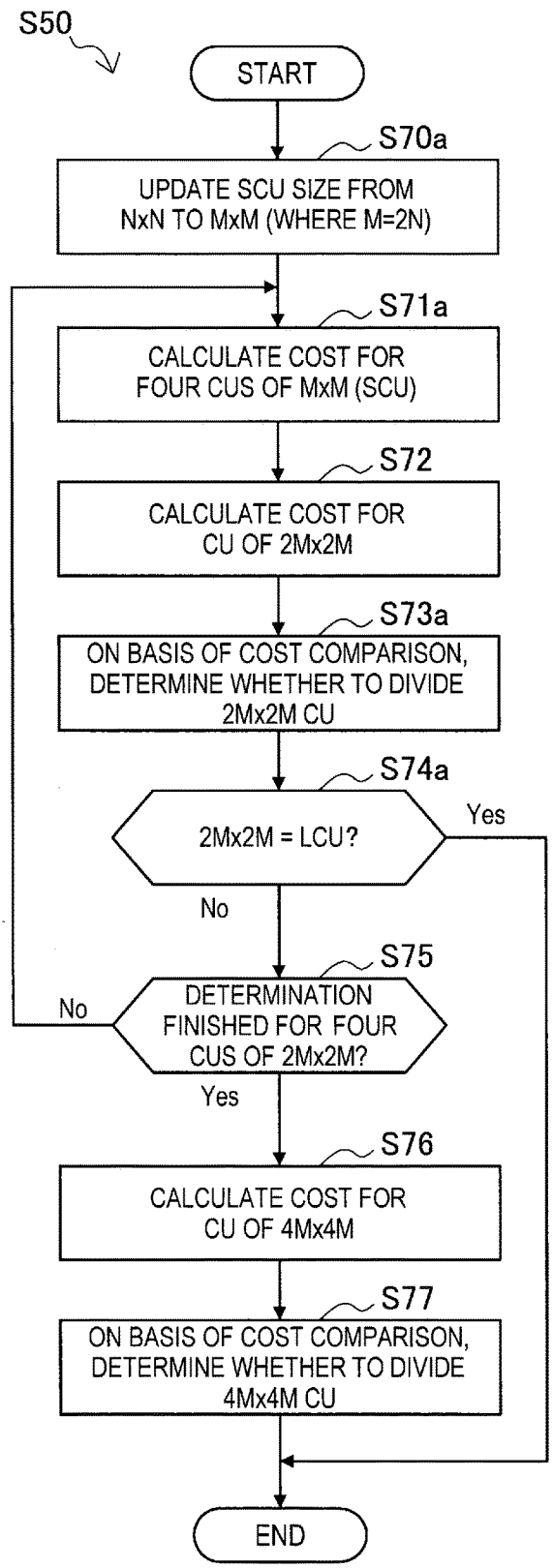

[Fig. 13C]
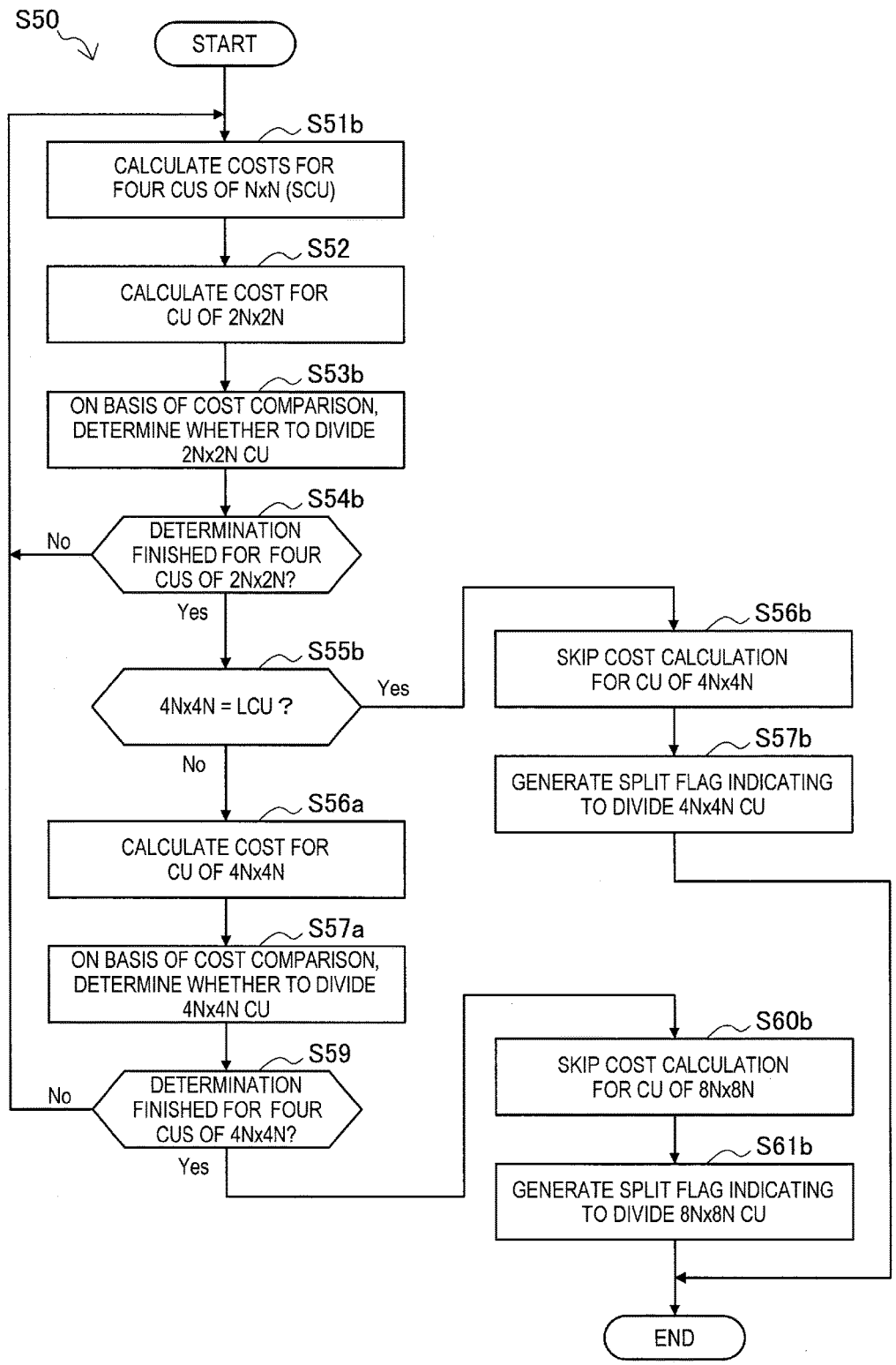

[Fig. 13D]
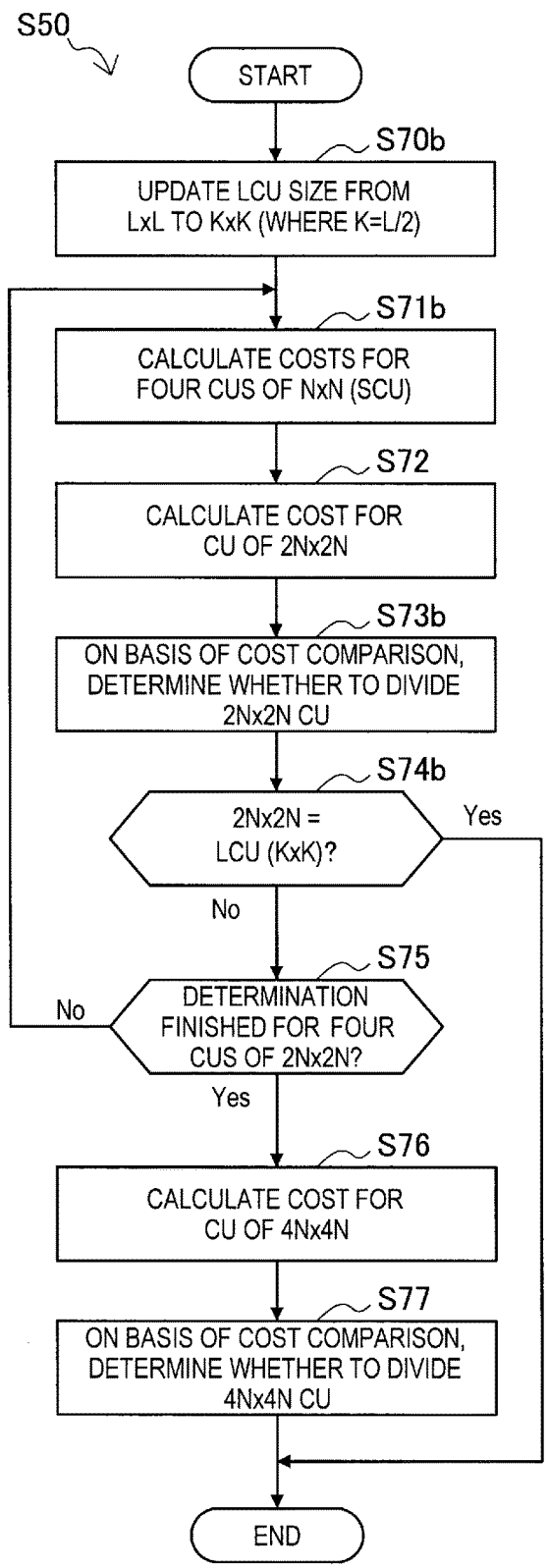

[Fig. 14]

[Fig. 15]
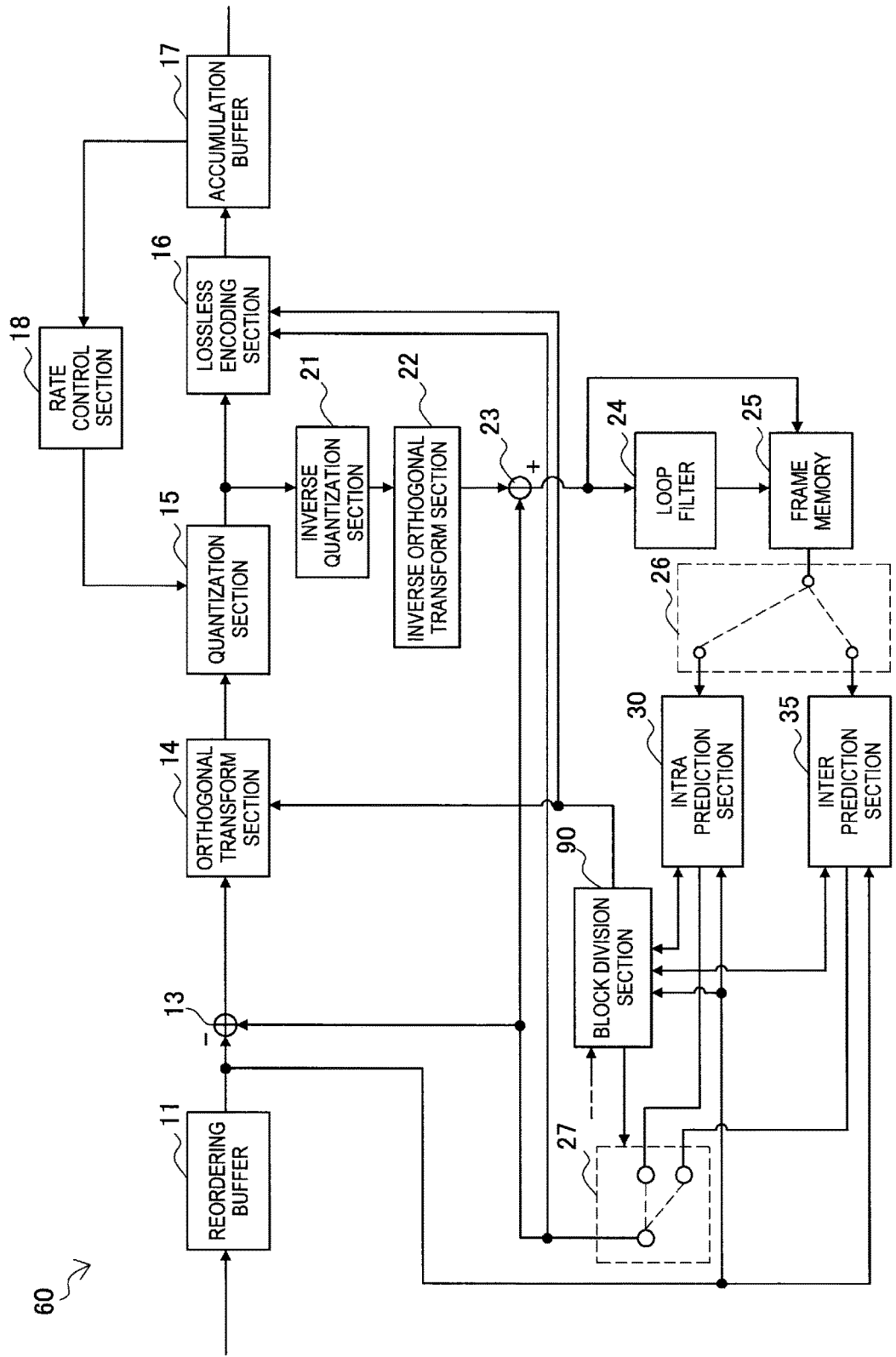

[Fig. 16]
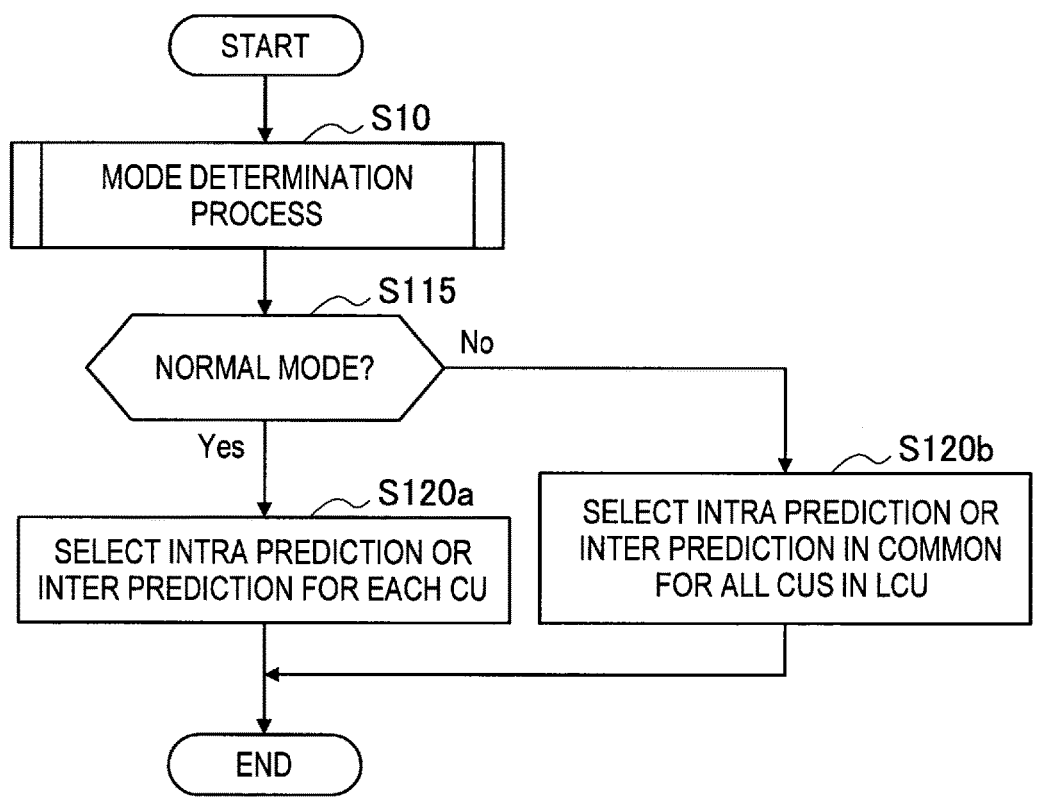

[Fig. 17]
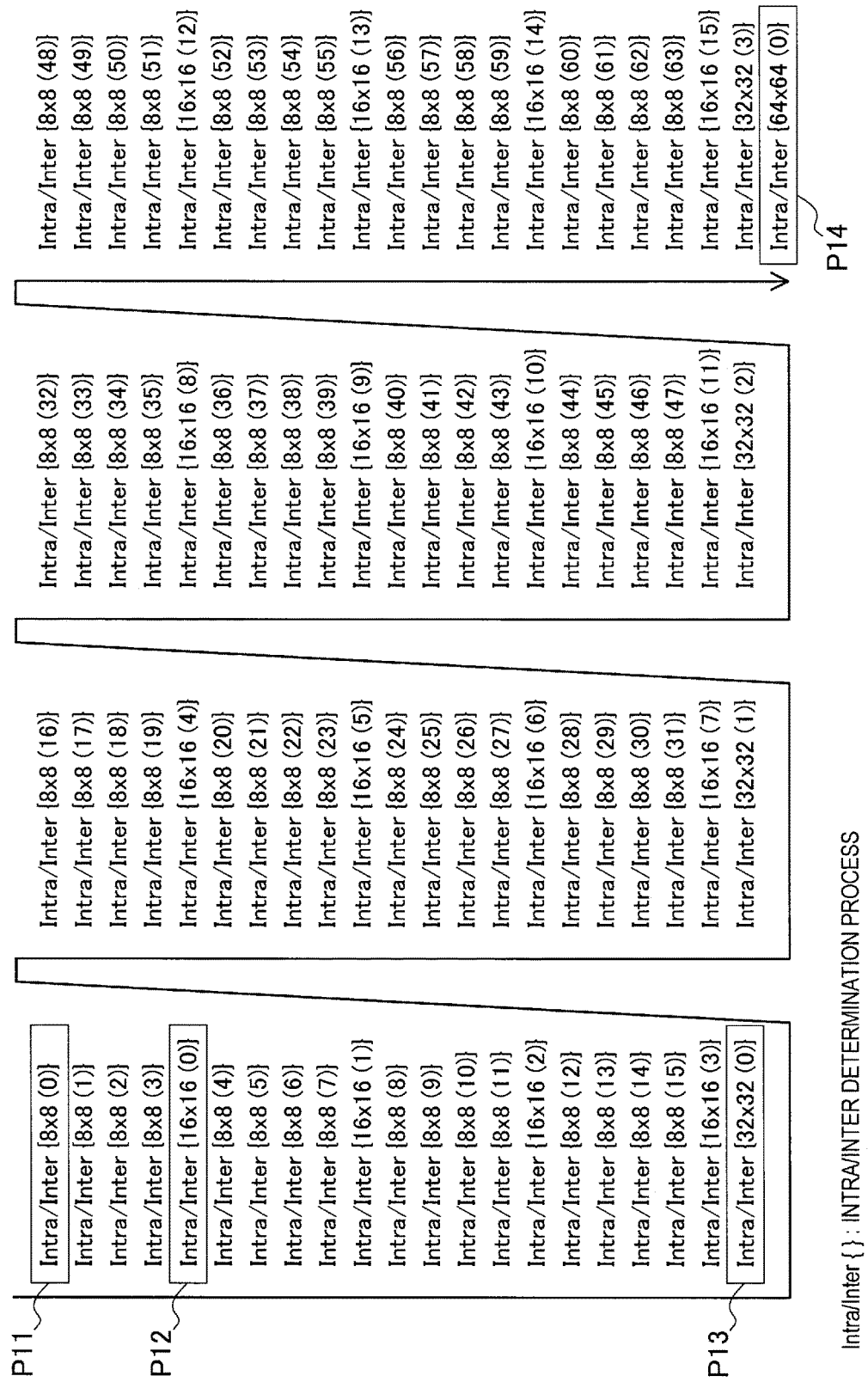

[Fig. 18]
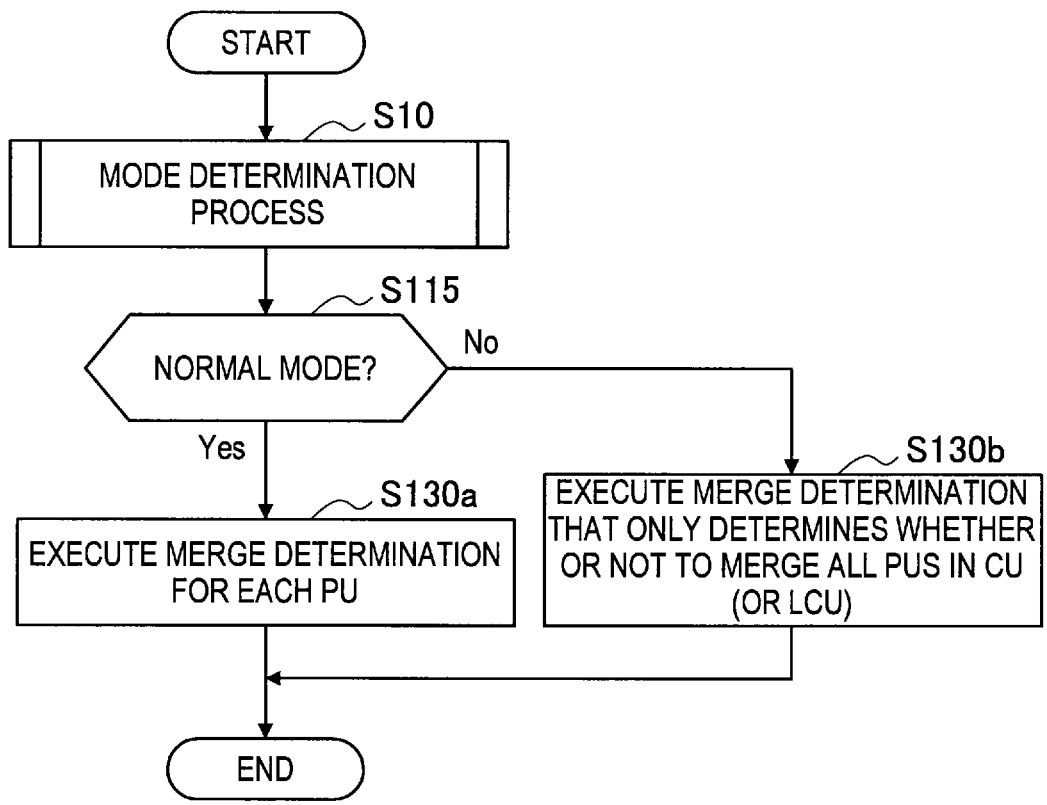

[Fig. 19]
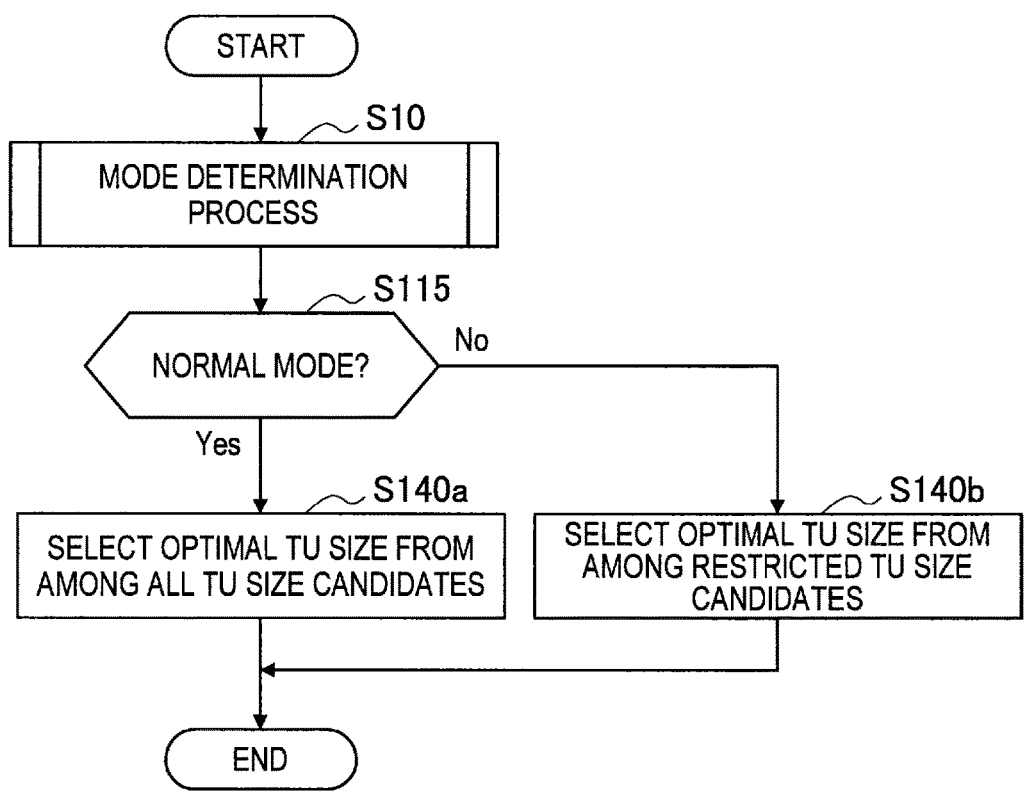

[Fig. 20]
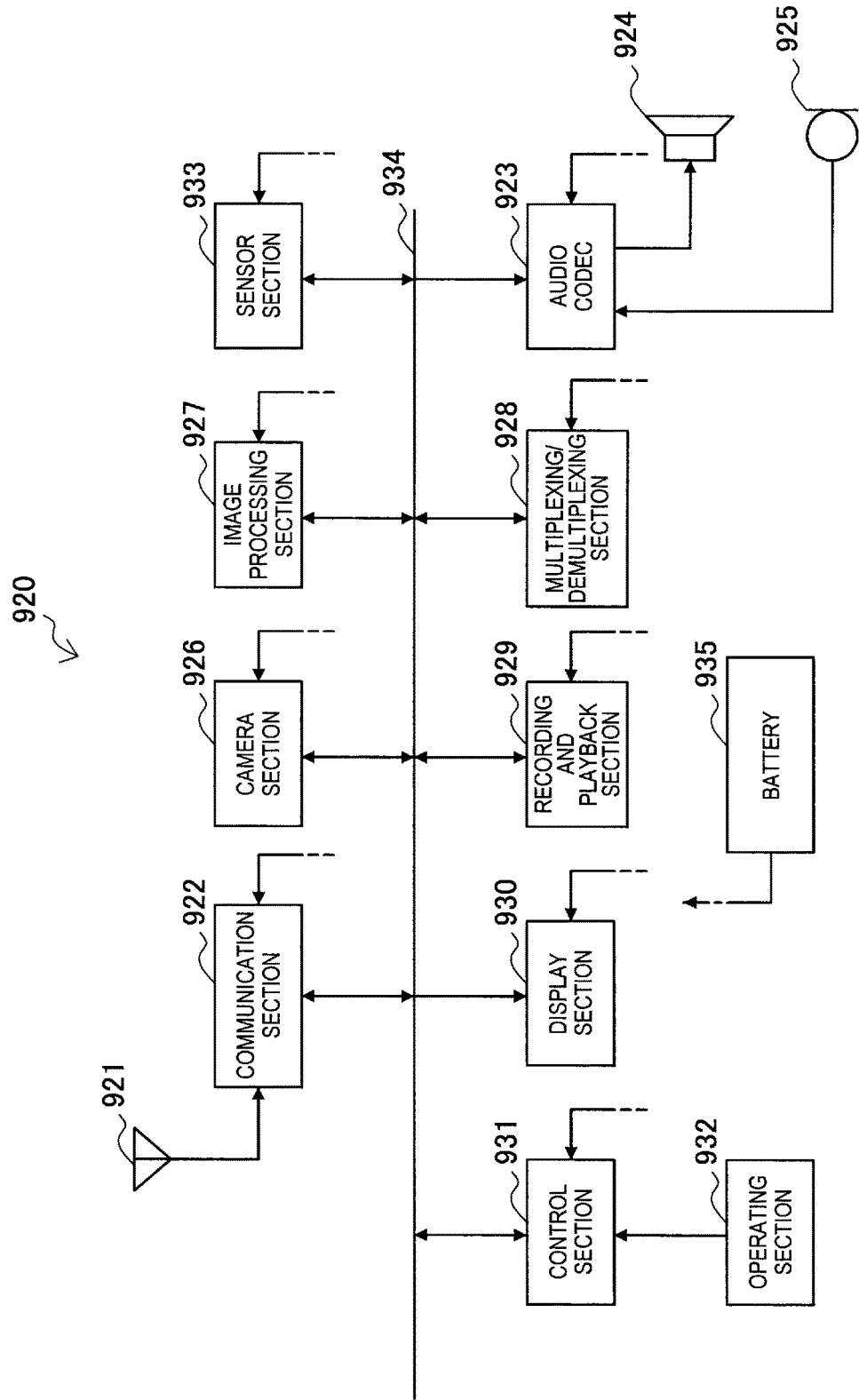

[Fig. 21]
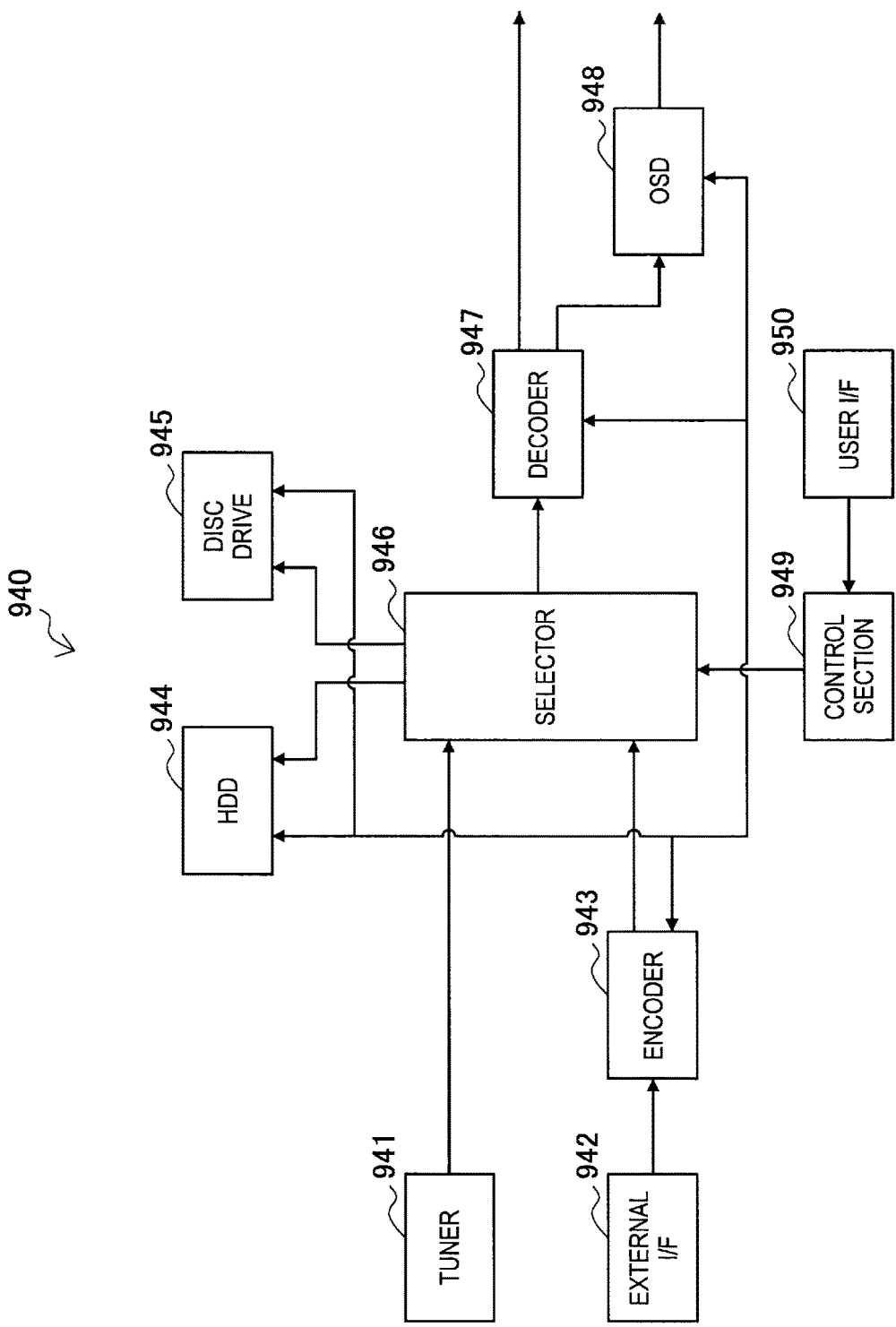

[Fig. 22]
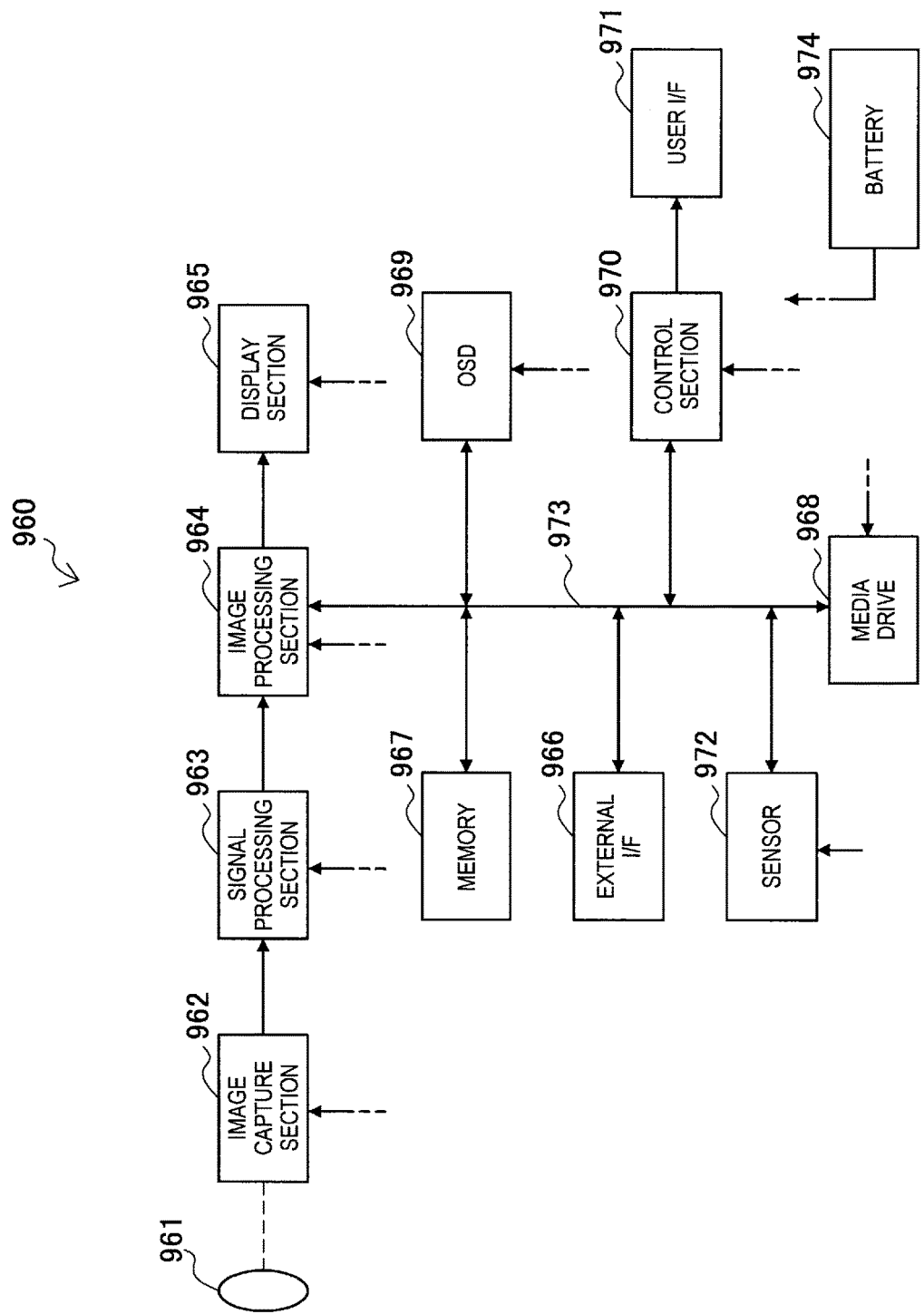

IMAGE PROCESSING DEVICE, IMAGE PROCESSING METHOD, AND PROGRAM

CROSS REFERENCE TO RELATED APPLICATIONS

This application claims the benefit of Japanese Priority Patent Application JP 2013-114947 filed May 31, 2013, the entire contents of which are incorporated herein by reference.

TECHNICAL FIELD

The present disclosure relates to an image processing device, an image processing method, and a program.

BACKGROUND ART

Presently, standardization of an image coding scheme called High Efficiency Video Coding (HEVC) has been progressing under work by the Joint Collaboration Team-Video Coding (JCTVC), a joint standards group between the ITU-T and the ISO/IEC, with the aim of further improving the coding efficiency over H.264/AVC.

With older image coding schemes such as MPEG-2 or H.264/AVC, a coding process is executed in processing units called macroblocks. Macroblocks are blocks having a uniform size of 16×16 pixels. Conversely, with HEVC, a coding process is executed in processing units called coding units (CUs). CUs are blocks having a variable size, formed by recursively dividing a largest coding unit (LCU). The maximum available CU size is 64×64 pixels. The minimum available CU size is 8×8 pixels. As a result of implementing CUs having a variable size, with HEVC it is possible to adaptively adjust image quality and coding efficiency according to image content. The question of how deep to divide an LCU (that is, what size of CU to use) is typically determined on the basis of a comparison of costs affecting the coding efficiency.

CITATION LIST

Patent Literature

PTL 1: JP 2008-078969A

SUMMARY

Technical Problem

However, if one attempts to execute a comprehensive cost comparison for all conceivable division patterns, the processing load becomes very great, and produces an adverse effect on the processing performance or power consumption of the encoder.

Consequently, it is desirable to realize a mechanism enabling flexible configuration of the depth of block division.

Solution to Problem

According to an embodiment of the present disclosure, there is provided an image processing device including a setting section that sets coding units formed by recursively dividing a block of an image to encode in the block, and a control section that controls a depth of block division performed in the setting section according to a mode related to a resource efficiency.

According to an embodiment of the present disclosure, there is provided an image processing method including setting coding units formed by recursively dividing a block of an image to encode in the block, and controlling a depth of block division while setting the coding units in the block according to a mode related to a resource efficiency.

According to an embodiment of the present disclosure, there is provided a program causing a computer that controls an image processing device to function as: a setting section that sets coding units formed by recursively dividing a block of an image to encode in the block, and a control section that controls a depth of block division performed in the setting section according to a mode related to a resource efficiency.

In one or more embodiments of the present disclosure, an encoder for encoding an image signal comprises a processor configured to receive an operating mode signal indicative of a determined operating mode associated with resource efficiency, and control a depth of block division for a block setting process based on the determined operating mode indicated by the operating mode signal. Optionally, the encoder encodes the image signal according to High Efficiency Video Coding (HEVC)

Optionally, the processor controls a depth of block division for a block setting process based on the determined operating mode indicated by the operating mode signal for each determined largest coding unit (LCU). The operating mode may be determined based on user input to a user interface selecting the operating mode from a plurality of operating modes. Optionally, the determined operating mode associated with resource efficiency is one of a normal mode and a resource efficiency mode, the resource efficiency mode being one of a battery usage efficiency mode whereby reducing battery consumption is prioritized over image quality, a battery charge level mode automatically initiated when a battery charge level falls below a threshold, a usage efficiency of processing resources mode whereby processing resources are prioritized, and specified by user input to a user interface.

Additionally, optionally, the determined operating mode is one of a first operating mode and a second operating mode, and the processor controls the depth of block division for the block setting process by setting the depth of block division to a first depth in the first operating mode and by setting the depth of block division to a second depth in the second operating mode, the second depth in the second operating mode being less than the first depth in the first operating mode.

For a determined first operating mode from among a plurality of operating modes including the first operating mode and a second operating mode, optionally, the processor controls the depth of block division such that no restriction is placed on the depth of block division for the block setting process. Optionally or alternatively, for a determined first operating mode from among a plurality of operating modes including the first operating mode and a second operating mode, the processor performs the block setting process on all coding units (CU), from a smallest coding unit (SCU) to a determined largest coding unit (LCU).

Additionally, optionally, for a determined second operating mode from among a plurality of operating modes including a first operating mode and the second operating mode, the processor controls the depth of block division so as to restrict the depth of block division for the block setting process. Optionally or alternatively, for a determined second operating mode from among a plurality of operating modes including a first operating mode and the second operating mode, the processor performs the block setting process on less than all coding units (CU) from a smallest coding unit (SCU) to a determined largest coding unit (LCU). Optionally or alternatively, for a determined second operating mode from among a plurality of operating modes including a first operating mode and the second operating mode, the processor processes at least one less cost calculation regarding a plurality of coding units (CU) less than a total number of CUs than would be performed for the first operating mode regarding the total number of CUs.

Optionally, the block division process is performed either by increasing a value of a smallest coding unit (SCU) and performing cost calculation and cost comparison regarding all other coding units (CUs), including a determined largest coding unit (LCU), or by skipping cost calculation and comparison regarding the LCU. Optionally or alternatively, the block division process is performed either by decreasing a value of a determined largest coding unit (LCU) and performing cost calculation and cost comparison regarding all other coding units (CUs), including a smallest coding unit (SCU), or by skipping cost calculation and comparison regarding the LCU.

According to one or more embodiments of the present disclosure, a decoder configured to decode an encoded image signal comprises processing circuitry configured to decode the encoded image signal to reproduce a quadtree structure associated with the encoded image signal, wherein the encoded image signal is encoded based on an operating mode signal indicative of a determined operating mode associated with resource efficiency for an encoder that encoded the encoded image signal, and a depth of block division set for a block setting process based on the determined operating mode indicated by the operating mode signal for the encoder that encoded the encoded image signal. Optionally, the processing circuitry reproduces the quadtree structure associated with the encoded image signal by recursively dividing largest coding units (LCUs) of the encoded image signal based on parameters multiplexed to the encoded image signal.

Additionally, according to one or more embodiments of the present disclosure, an image processing system comprises a user interface; and processing circuitry configured to receive an operating mode signal indicative of a determined operating mode associated with resource efficiency, and control a depth of block division for a block setting process based on the determined operating mode indicated by the operating mode signal, wherein the determined operating mode is determined based on user input to the user interface selecting the operating mode from a plurality of operating modes.

Optionally, the processing circuitry controls a depth of block division for a block setting process based on the determined operating mode indicated by the operating mode signal for each determined largest coding unit (LCU). Additionally, in one or more embodiments of the present disclosure, the determined operating mode is one of a first operating mode and a second operating mode, and the processing circuitry controls the depth of block division for the block setting process by setting the depth of block division to a first depth in the first operating mode and by setting the depth of block division to a second depth in the second operating mode, the second depth in the second operating mode being less than the first depth in the first operating mode.

In one or more embodiments of the present disclosure, the image processing system may be a mobile phone and may further comprise a battery. Alternatively, the image processing system is a recording and playback device and can further comprise a decoder; an HDD; and a disc drive. Alternatively, the image processing system is a camera and can further comprise a battery; and image capture circuitry.

Advantageous Effects of Invention

According to technology in accordance with the present disclosure, flexible configuration of the depth of block division becomes possible.

BRIEF DESCRIPTION OF DRAWINGS

FIG. 1 is an explanatory diagram for describing an example of recursive block division in HEVC.

FIG. 2 is an explanatory diagram for describing a block division determination by an encoder.

FIG. 3A is a first explanatory diagram for describing an example of a processing sequence for division determination.

FIG. 3B is a second explanatory diagram for describing an example of a processing sequence for division determination.

FIG. 4 is a block diagram illustrating a schematic configuration of an image encoding device according to the first embodiment.

FIG. 5A is a block diagram illustrating a first example of a detailed configuration of a block division section.

FIG. 5B is a block diagram illustrating a second example of a detailed configuration of a block division section.

FIG. 5C is a block diagram illustrating a third example of a detailed configuration of a block division section.

FIG. 6A is an explanatory diagram illustrating a first example of a user interface enabling a user to specify an operating mode.

FIG. 6B is an explanatory diagram illustrating a second example of a user interface enabling a user to specify an operating mode.

FIG. 7A is an explanatory diagram illustrating a first example of relationships between operating mode and resource efficiency in parallel processing.

FIG. 7B is an explanatory diagram illustrating a second example of relationships between operating mode and resource efficiency in parallel processing.

FIG. 8A is an explanatory diagram illustrating a first example of relationships between operating mode and resource efficiency in series processing.

FIG. 8B is an explanatory diagram illustrating a second example of relationships between operating mode and resource efficiency in series processing.

FIG. 9 is an explanatory diagram for describing speedup of an encoding process.

FIG. 10 is a flowchart illustrating an example of a diagrammatic flow of a block division process.

FIG. 11A is a flowchart illustrating a first example of a detailed flow of a mode determination process.

FIG. 11B is a flowchart illustrating a second example of a detailed flow of a mode determination process.

FIG. 11C is a flowchart illustrating a third example of a detailed flow of a mode determination process.

FIG. 11D is a flowchart illustrating a fourth example of a detailed flow of a mode determination process.

FIG. 12 is a flowchart illustrating an example of a detailed flow of a block setting process in normal mode.

FIG. 13A is a flowchart illustrating a first example of a detailed flow of a block setting process in resource saving mode.

FIG. 13B is a flowchart illustrating a second example of a detailed flow of a block setting process in resource saving mode.

FIG. 13C is a flowchart illustrating a third example of a detailed flow of a block setting process in resource saving mode.

FIG. 13D is a flowchart illustrating a fourth example of a detailed flow of a block setting process in resource saving mode.

FIG. 14 is an explanatory diagram for describing the scan order of blocks in the case of adjusting the LCU size in resource saving mode.

FIG. 15 is a block diagram illustrating a schematic configuration of an image encoding device according to the second embodiment.

FIG. 16 is a flowchart illustrating an example of a detailed flow of an intra/inter determination control process.

FIG. 17 is an explanatory diagram for describing an example of a processing sequence for intra/inter determination.

FIG. 18 is a flowchart illustrating an example of a detailed flow of a merge determination control process.

FIG. 19 is a flowchart illustrating an example of a detailed flow of a transform unit control process.

FIG. 20 is a block diagram illustrating an example of a schematic configuration of a mobile phone.

FIG. 21 is a block diagram illustrating an example of a schematic configuration of a recording and playback device.

FIG. 22 is a block diagram illustrating an example of a schematic configuration of an image capture device.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Also, the description will proceed in the following order.
1. Recursive block division
1-1. Examples of block division
1-2. Syntax related to block division
1-3. Processing sequence for block division
2. First embodiment
2-1. Overall configuration
2-2. Detailed configuration of block division section
2-3. Relationships between operating mode and resource efficiency
2-4. Process flow
3. Second embodiment
3-1. Overall configuration
3-2. Control of intra/inter determination
3-3. Control of merge determination
3-4. Control of transform unit setting
4. Applications
5. Conclusion
<1. Recursive Block Division>
<1-1. Examples of Block Division>
With HEVC, one or more largest coding units (LCUs) are configured for an image to be encoded, and one or more coding units (CUs) are configured by recursively dividing the LCUs. The CU is the processing unit of an encoding process in HEVC. Whereas the size of a macroblock is fixed at 16×16 pixels in older image coding schemes such as MPEG-2 or H.264/AVC, the size of a CU is variable. The range that the CU size may take is stipulated by a smallest coding unit (SCU) size and an LCU size. According to the HEVC specifications, since the minimum value of the SCU size is 8×8 pixels and the maximum value of the LCU size is 64×64 pixels, the range of available CU sizes is from 8×8 pixels to 64×64 pixels in the broadest case.

The tree-shaped block structure formed by recursively dividing an LCU is called a quadtree structure. CUs correspond to the leaves of a quadtree. FIG. 1 is an explanatory diagram for describing an example of recursive block division in HEVC. The left side of FIG. 1 illustrates an image IM01 depicting a person's face. The image IM01 includes U LCUs in the horizontal direction and V LCUs in the vertical direction, or in other words, U×V LCUs. Each LCU is recursively divided into one or more CUs in a range that does not fall below the SCU size. As an example, the right side of FIG. 1 illustrates an enlarged view of a state in which an LCU0 crossed by a texture boundary (a boundary between the person's head and the background) is divided into multiple CUs. In the region near the texture boundary, small CUs are configured by repeated division, whereas in other regions, large CUs are configured by reducing the number of divisions. For example, assuming that the size of LCU0 is 64×64 pixels, the size of CU01 is 32×32 pixels, the size of CU02 is 16×16 pixels, and the size of CU03 is 8×8 pixels. The number of repeated divisions is also called the division depth. In the case of an LCU size of 64×64 pixels, the CU size is 64×64 pixels if the division depth is 0, the CU size is 32×32 pixels if the division depth is 1, the CU size is 16×16 pixels if the division depth is 2, and the CU size is 8×8 pixels if the division depth is 3. In the case of an LCU size of 32×32 pixels, the CU size is 32×32 pixels if the division depth is 0, the CU size is 16×16 pixels if the division depth is 1, and the CU size is 8×8 pixels if the division depth is 2. Furthermore, although not illustrated in the drawing, each CU may be divided into one or more transform units (TUs) that act as the respective processing units of orthogonal transform. In addition, each CU may be divided into one or more prediction units (PUs) that act as the respective processing units of intra prediction or inter prediction. According to such recursive block division, by varying the block size according to the image content, the image quality and coding efficiency of an image to be decoded may be flexibly adjusted.

<1-2. Syntax Related to Block Division>

The questions of what size of LCUs to place in an image, and how to divide each LCU into CUs, are determined at the encoder. The encoder multiplexes parameters enabling the decoder to reproduce the determined quadtree structure into the stream of the image to be encoded. In the HEVC specification draft 10 (Benjamin Bross, Woo-Jin Han, Gary J. Sullivan, Jens-Rainer Ohm, Gary J. Sullivan, Ye-Kui Wang, Thomas Wiegand, "High Efficiency Video Coding (HEVC) text specification draft 10 (for FDIS & Consent)", JCTVC-L1003_v4, 2013 Jan. 14-23), the following three parameters are defined as parameters for specifying a quadtree structure:
log 2_min_luma_coding_block_size_minus3
log 2_diff_max_min_luma_coding_block_size
split_cu_flag The parameter "log 2_min_luma_coding_block_size_minus3" specifies the (luma component) SCU size (expressed as the value obtained by subtracting 3 from the log base 2 of the SCU size). For example, if this parameter is equal to 0, the SCU size is 8×8 pixels. The parameter "log 2_diff_max_min_luma_coding_block_size" specifies the difference between (the logarithms of) the SCU size and the LCU size. For example, if the SCU size is 8×8 pixels and this parameter is equal to 3, the LCU size is 64×64 pixels. LCUs having a size specified using these parameters are arranged in a raster over an image. The flag "split_cu_flag" specifies whether to divide each LCU or each CU divided from an LCU (hereinafter designated the split flag), and is recursively generated depending on the division depth. In the case in which the split flag associated with a given LCU or CU indicates 0, that LCU or CU is not divided any further. In the case in which the split flag associated with a given LCU or CU indicates 1, that LCU or CU is divided into four CUs at half the size. Whereas "log 2_min_luma_coding_block_size_minus3" and "log 2_diff_max_min_luma_coding_block_size" are included in the sequence parameter set (SPS), the split_cu_flag set is included in the segment data of each slice.

<1-3. Processing Sequence for Block Division>

The decoder recursively divides LCUs to reproduce the quadtree structure by referencing the above parameters. Meanwhile, the encoder determines whether or not to divide an LCU or CU into smaller CUs on the basis of a comparison of costs dependent on the code rate that is expected to be produced. In actual practice, this process may be conducted in a bottom-up manner, in which cost calculation and division determination is conducted in order starting from the smallest size, as implemented in the HM reference software.

FIG. 2 is an explanatory diagram for describing a block division determination by an encoder. In the example in FIG. 2, the LCU size is 64×64 pixels, and the SCU size is 8×8 pixels. The four blocks B30, B31, B32, and B33 illustrated at the left edge of the drawing are candidate CUs having a size equal to the SCU size. The block B20 is a candidate CU having a size double the SCU size. The encoder first calculates respective costs for the four blocks B30, B31, B32, and B33, as well as the block B20, and compares the total of the costs of the blocks B30, B31, B32, and B33 to the cost of the block B20 (process P1). Subsequently, in the case in which the former cost is lower, the encoder determines to divide the block B20 into the blocks B30, B31, B32, and B33. Conversely, in the case in which the latter cost is lower, the encoder determines to not divide the block B20. Furthermore, when division determination finishes for the four blocks B20, B21, B22, and B23, the encoder calculates the cost for the block B10, and compares the total of the costs of the blocks B20, B21, B22, and B23 to the cost of the block B10 (process P2). Subsequently, in the case in which the former cost is lower, the encoder determines to divide the block B10 into the blocks B20, B21, B22, and B23. Conversely, in the case in which the latter cost is lower, the encoder determines to not divide the block B10. Furthermore, when division determination finishes for the four blocks B10, B11, B12, and B13, the encoder calculates the cost for the block B00, and compares the total of the costs of the blocks B10, B11, B12, and B13 to the cost of the block B00 (process P3). Subsequently, in the case in which the former cost is lower, the encoder determines to divide the block B00 into the blocks B10, B11, B12, and B13. Conversely, in the case in which the latter cost is lower, the encoder determines to not divide the block B00. In the case in which the candidate CU size reaches the LCU size, cost calculation and comparison is not conducted for a larger size. The split flag (split_cu_flag) expresses the result of such division determination as a value of 0 (do not divide) or 1 (divide).

Figure 3A:
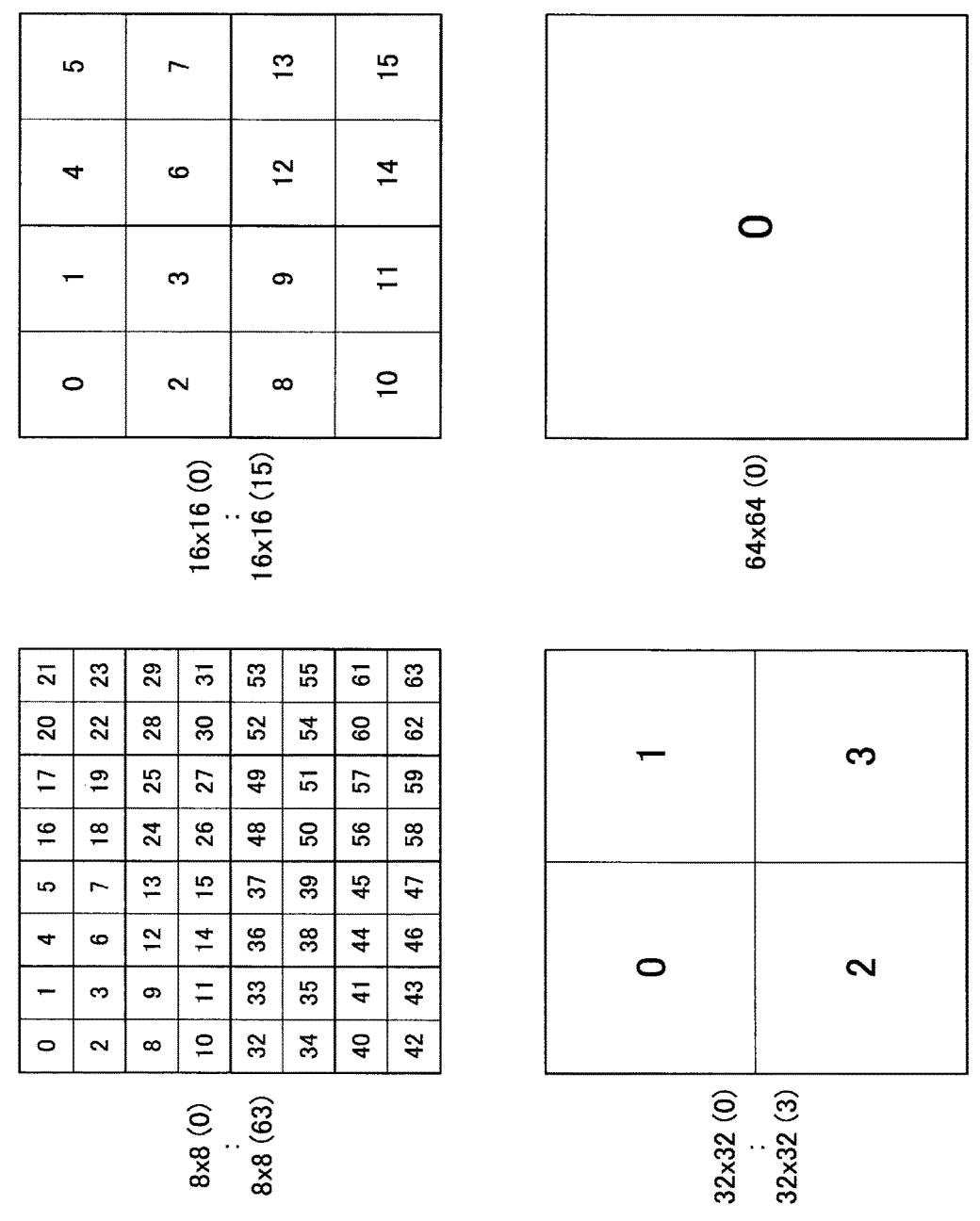

FIGS. 3A and 3B are explanatory diagrams for describing an example of a processing sequence for division determination. FIG. 3A illustrates labels for the blocks used in this description. Only one 64×64 pixel CU exists within an LCU, and that CU is labeled "64×64 (0)". Four 32×32 pixel CUs exist within an LCU, and these CUs are labeled from "32×32 (0)" to "32×32 (3)" in the order of upper-left, upper-right, lower-left, lower-right. Sixteen 16×16 pixel CUs exist within an LCU, and these CUs are labeled from "16×16 (0)" to "16×16 (15)" in the order illustrated in the drawing. Sixty-four 8×8 pixel CUs exist within an LCU, and these CUs are labeled from "8×8 (0)" to "8×8 (63)" in the order illustrated in the drawing. FIG. 3B diagrammatically illustrates an example of the order of the cost calculation process and division determination (cost comparison) process for these CUs. The cost calculation process is expressed as "Cost{X}", and the division determination process is expressed as "Compare{X}", where X is the label of the block to process. Note that in actual practice, several processes may also be conducted in parallel. As illustrated in FIG. 3B, in the largest case, the cost calculation process is executed 64+16+4+1=85 times, and the division determination process is executed 16+4+1=21 times.

However, if one attempts to execute a comprehensive cost calculation and comparison as exemplified in FIG. 3B, the processing load becomes very great, and the resource efficiency of the encoder lowers. For example, with mobile equipment driven by a battery, excessive load may shorten battery life. With equipment lacking sufficient processor performance or memory capacity, excessive load may even impede normal progress of a process. Also, even in the case in which equipment has sufficient processor performance and memory capacity, coding processes will take time if there is a large amount of processing. Accordingly, in the embodiment described in the next section, a new operating mode is provided in addition to a normal operating mode in order to enable suitable control of the processing load. With the new operating mode, by restricting the depth of the division to process, encoder resources are efficiently utilized, and the processing load is reduced. Note that in this specification, for the sake of convenience, the normal operating mode is designated the "normal mode", and the operating mode in which resources are efficiently utilized is designated the "resource saving mode".

<2. First Embodiment>
<2-1. Overall Configuration>

FIG. 4 is a block diagram illustrating a schematic configuration of an image encoding device 10 according to the first embodiment. Referring to FIG. 4, the image encoding device 10 is equipped with a reordering buffer 11, a subtraction section 13, an orthogonal transform section 14, a quantization section 15, a lossless encoding section 16, an accumulation buffer 17, a rate control section 18, an inverse quantization section 21, an inverse orthogonal transform section 22, an addition section 23, a loop filter 24, frame memory 25, selection sections 26 and 27, an intra prediction section 30, an inter prediction section 35, and a block division section 40.

The reordering buffer 11 reorders the images included in a sequence of image data. After reordering the images according to a group of pictures (GOP) structure in accordance with the encoding process, the reordering buffer 11 outputs the reordered image data to the subtraction section 13, the intra prediction section 30, the inter prediction section 35, and the block division section 40.

The subtraction section 13 is supplied with image data input from the reordering buffer 11, and predicted image data input from the intra prediction section 30 or the inter prediction section 35 described later. The subtraction section 13 calculates prediction error data, which is the difference between the image data input from the reordering buffer 11 and the predicted image data, and outputs the calculated prediction error data to the orthogonal transform section 14.

The orthogonal transform section 14 applies an orthogonal transform to the prediction error data input from the subtraction section 13. The orthogonal transform executed by the orthogonal transform section 14 may be the discrete cosine transform (DCT) or the Karhunen-Loeve transform, for example. Orthogonal transform is executed for each transform unit (TU) formed by dividing a CU. The TU size is adaptively selected from among 4×4 pixels, 8×8 pixels, 16×16 pixels, and 32×32 pixels. The orthogonal transform section 14 outputs transform coefficient data acquired by the orthogonal transform process to the quantization section 15.

The quantization section 15 is supplied with transform coefficient data input from the orthogonal transform section 14, and a rate control signal from the rate control section 18 described later. The quantization section 15 quantizes transform coefficient data with a quantization step determined according to a rate control signal. The quantization section 15 outputs post-quantization transform coefficient data (hereinafter designated quantized data) to the lossless encoding section 16 and the inverse quantization section 21.

The lossless encoding section 16 generates an encoded stream by applying a lossless encoding process to the quantized data input from the quantization section 15. In addition, the lossless encoding section 16 encodes various parameters referenced by the decoder, and inserts the encoded parameters into the header area of the encoded stream. Parameters encoded by the lossless encoding section 16 may include the above parameter that specifies the quadtree structure, as well as information related to intra prediction and information related to inter prediction described later. The lossless encoding section 16 then outputs the generated encoded stream to the accumulation buffer 17.

The accumulation buffer 17 uses a storage medium such as semiconductor memory to temporarily buffer the encoded stream input from the lossless encoding section 16. The accumulation buffer 17 then outputs the buffered encoded stream to a transmission section not illustrated (such as a communication interface or a connection interface that connects with peripheral equipment, for example), at a rate according to the bandwidth of the transmission channel.

The rate control section 18 monitors the free space in the accumulation buffer 17. Then, the rate control section 18 generates a rate control signal according to the free space in the accumulation buffer 17, and outputs the generated rate control signal to the quantization section 15. For example, when there is not much free space in the accumulation buffer 17, the rate control section 18 generates a rate control signal for lowering the bit rate of the quantized data. Also, when there is sufficient free space in the accumulation buffer 17, for example, the rate control section 18 generates a rate control signal for raising the bit rate of the quantized data.

The inverse quantization section 21, the inverse orthogonal transform section 22, and the addition section 23 constitute a local decoder. The inverse quantization section 21 inversely quantizes quantized data with the same quantization step as that used by the quantization section 15, and reconstructs the transform coefficient data. Then inverse quantization section 21 then outputs the reconstructed transform coefficient data to the inverse orthogonal transform section 22.

The inverse orthogonal transform unit 22 reconstructs the prediction error data by applying an inverse orthogonal transform to the transform coefficient data input from the inverse quantization section 21. Similarly to orthogonal transform, inverse orthogonal transform is executed for each TU. The inverse orthogonal transform section 22 then outputs the reconstructed prediction error data to the addition section 23.

The addition section 23 generates decoded image data (a reconstructed image) by adding together reconstructed prediction error data input from the inverse orthogonal transform section 22 and predicted image data input from the intra prediction section 30 or the inter prediction section 35. The addition section 23 then outputs the generated decoded image data to the loop filter 24 and the frame memory 25.

The loop filter 24 includes a filter group, such as a deblocking filter (DF), a sample adaptive offset (SAO) filter, and an adaptive loop filter (ALF), for the purpose of improving image quality. The loop filter 24 filters decoded image data input from the addition section 23, and outputs filtered decoded image data to the frame memory 25.

The frame memory 25 uses a storage medium to store pre-filtering decoded image data input from the addition section 23, and post-filtering decoded image data input from the loop filter 24.

The selection section 26 retrieves pre-filtering decoded image data to be used for intra prediction from the frame memory 25, and supplies the retrieved decoded image data to the intra prediction section 30 as reference image data. Also, the selection section 26 retrieves post-filtering decoded image data to be used for inter prediction from the frame memory 25, and supplies the retrieved decoded image data to the inter prediction section 35 as reference image data.

In intra prediction mode, the selection section 27 outputs predicted image data as a result of intra prediction output from the intra prediction section 30 to the subtraction section 13, and also outputs information related to intra prediction to the lossless encoding section 16. Also, in inter prediction mode, the selection section 27 outputs predicted image data as a result of inter prediction output from the inter prediction section 35 to the subtraction section 13, and also outputs information related to inter prediction to the lossless encoding section 16. The selection section 27 switches between intra prediction mode and inter prediction mode according to the cost magnitude.

The intra prediction section 30 conducts an intra prediction process for each prediction unit (PU) formed by dividing a CU, on the basis of original image data and decoded image data. For example, the intra prediction section 30 uses a designated cost function to evaluate a prediction result for each candidate mode in a prediction mode set. Next, the intra prediction section 30 selects the prediction mode yielding the minimum cost, or in other words the prediction mode yielding the highest compression ratio, as an optimal prediction mode. In addition, the intra prediction section 30 generates predicted image data in accordance with the optimal prediction mode. The intra prediction section 30 then outputs information related to intra prediction, including prediction mode information expressing the selected optimal prediction mode, as well as the cost and predicted image data, to the selection section 27.

The inter prediction section 35 conducts an inter prediction process for each PU formed by dividing a CU, on the basis of original image data and decoded image data. For example, the inter prediction section 35 uses a designated cost function to evaluate a prediction result for each candidate mode in a prediction mode set. Next, the inter prediction section 35 selects the prediction mode yielding the minimum cost, or in other words the prediction mode yielding the highest compression ratio, as an optimal prediction mode. In addition, the inter prediction section 35 generates predicted image data in accordance with the optimal prediction mode. The inter prediction section 35 then outputs information related to inter prediction, including prediction mode information expressing the selected optimal prediction mode and motion information, as well as the cost and predicted image data, to the selection section 27.

The block division section 40 configures the quadtree structure of CUs for each of the LCUs configured in an image. More specifically, the block division section 40 arranges LCUs in a raster over an image. In addition, the block division section 40 divides each LCU into multiple candidate CUs. Subsequently, as described using FIG. 2, the block division section 40 calculates the costs for four candidate CUs of a given size as well as a candidate CU of double size. The block division section 40 then compares the total of the costs of the four candidate CUs to the cost of the double-size candidate CU, and determines whether to divide the double-size candidate CU. The block division section 40 executes such cost calculation and division determination while accumulating costs from the SCU size up to the LCU size, and configures in each LCU a quadtree structure of CUs that optimizes coding efficiency. Additionally, in the present embodiment, the block division section 40 controls the depth of block division in the above process, according to an operating mode related to resource efficiency. At least two types are provided in the selection of an operating mode. A first operating mode is a normal mode, while a second operating mode is a resource saving mode. In resource saving mode, the range of CU sizes processed for cost calculation and division determination is restricted to a narrower range compared to normal mode. Note that multiple resource saving modes with different CU size restriction levels may also be provided.

<2-2. Detailed Configuration of Block Division Section>

In this section, several examples of a detailed configuration of the block division section 40 will be described.

(1) First Exemplary Configuration

FIG. 5A is a block diagram illustrating a first example of a detailed configuration of the block division section 40. Referring to FIG. 5A, the block division section 40 is equipped with a mode control section 41 and a block setting section 47. The mode control section 41 and the block setting section 47 may be program modules executed by a processor such as a central processing unit (CPU) or a digital signal processor (DSP), for example.

The mode control section 41 determines an operating mode related to resource efficiency, and controls the depth of block division by the block setting section 47 according to the determined mode. Any number of operating mode candidates may be selectable by the mode control section 41. The operating mode candidates include the normal mode and resource saving mode discussed above, for example. In the case in which normal mode is selected, the mode control section 41 utilizes various available sizes of CUs without restricting the depth of block division, enabling an image to be decoded with high quality. On the other hand, resource saving mode indicates that resource efficiency is to be prioritized compared to normal mode. In the case in which resource saving mode is selected, the mode control section 41 restricts the depth of block division by the block setting section 47.

As an example, resource efficiency may mean battery usage efficiency. In this case, in resource saving mode, reducing battery consumption is prioritized over image quality. For example, the mode control section 41 may monitor the charge level of a battery that supplies power to the image encoding device 10, and automatically set the operating mode to resource saving mode in the case in which the battery charge level falls below a threshold. The operating mode may be set to normal mode in the case in which the battery charge level does not fall below a threshold. Otherwise, the mode control section 41 may automatically set the operating mode to resource saving mode in the case in which the image encoding device 10 is not connected to an external power source (that is, is being driven by a battery), for example. The operating mode may be set to normal mode in the case in which the image encoding device 10 is connected to an external power source. Additionally, the mode control section 41 may also combine these two criteria. For example, resource saving mode may be set in the case in which the image encoding device 10 is not connected to an external power source and the battery charge level falls below a threshold.

As another example, resource efficiency may mean the usage efficiency of processing resources such as a processor, memory, or logic circuit. In this case, in resource saving mode, efficiently utilizing processing resources is prioritized. Additionally, excess processing resources that are produced may be used to realize a higher frame rate, for example. Otherwise, the encoding process may be accelerated by executing a process discussed later ahead of schedule.

The mode control section 41 may also set an operating mode specified by user input. User input may be acquired via a user interface such as a touch panel, buttons, switches, dial, or speech input interface provided in the device. FIGS. 6A and 6B respectively illustrate examples of a user interface enabling a user to specify an operating mode. In the first example in FIG. 6A, an operating mode specification window W1 is a window that may be displayed on a touch panel. The operating mode specification window W1 includes a slider SD1. The user is able to specify one of three operating modes by dragging the slider SD1 left and right. In the case in which the slider SD1 is positioned at the left edge, resource efficiency mode is selected, and reducing battery consumption may be prioritized, for example. In the case in which the slider SD1 is positioned at the right edge, normal mode is selected, and image quality may be prioritized. In the case in which the slider SD1 is positioned in the middle, an intermediate operating mode may be selected. In the second example in FIG. 6B, an operating mode specification window W2 is a window that may be displayed on a screen. The operating mode specification window W2 includes a check box CB1. The user is able to specify one of two operating modes by specifying one of the candidates listed in the check box CB1. For example, in the case in which the top candidate is specified, a fast mode, which is one type of resource efficiency mode, is selected, and the depth of block division is restricted in order to speed up the encoding process. In the case in which the bottom candidate is specified, normal mode is selected, and image quality may be prioritized over processing speed. Note that instead of having the user specify an operating mode as illustrated in FIGS. 6A and 6B, a user interface enabling the user to specify a division depth restriction value may also be provided.

As another example, the mode control section 41 may also automatically set the operating mode to resource saving mode in the case of fast motion by the device capturing the image. For example, the mode control section 41 may monitor an indicator (such as acceleration, velocity, or angular velocity) expressing camera motion based on output from a sensor provided in conjunction with a camera (such as an acceleration sensor or gyro sensor, for example). Generally, in the case of fast camera motion, maintaining high image quality is difficult due to lowered precision of the prediction coding. Also, the visual characteristics of users have a tendency to not overly perceive image quality degradation while the angle of view is changing rapidly. Consequently, it is valuable to automatically set resource saving mode under conditions of fast camera motion, and prioritize efficiently utilizing resources over maintaining image quality.

The block setting section 47 configures, for each of one or more LCUs, one or more CUs having a quadtree structure formed by recursively dividing that LCU. As discussed earlier, the range of available CU sizes is defined by the SCU size and the LCU size. The block setting section 47 calculates a cost for each candidate CU by inputting input information such as original image data as well as prediction results from intra prediction or inter prediction into a cost function. Subsequently, the block setting section 47 determines whether to divide a candidate CU by comparing the costs between that candidate CU and four smaller CUs corresponding to that candidate CU. The block setting section 47 repeatedly executes such cost calculation and division determination in order from the SCU size up to the LCU size, and configures in each LCU a quadtree structure of the CUs derived as a result.

The block setting section 47 generates parameters for specifying the quadtree structure configured in each LCU. The parameters generated by the block setting section 47 include, in addition to parameters specifying the SCU size and the LCU size, a split flag set that specifies the depth of block division. Split flags are recursively specified. In other words, if a given block is divided into four CUs, a split flag specifying that division is generated, and then split flags indicating whether to divide each of the four CUs are also generated. These parameters generated by the block setting section 47 are encoded by the lossless encoding section 16.

As discussed earlier, the depth of block division in the block setting section 47 is controlled by the mode control section 41 according to an operating mode related to resource efficiency. As an example, in resource saving mode, the mode control section 41 may restrict the depth of block division in the block setting section 47 such that the CUs do not have a smaller size among multiple available sizes. In this case, block division in deep layers is inhibited. In a first technique of inhibiting block division in deep layers, the mode control section 41 causes the block setting section 47 to skip cost calculation and cost comparison for CUs having a size equal to the SCU size. The split flags for CUs having a size that is double the SCU size all indicate 0 (do not divide). According to the first technique, it is possible to vary the depth of division while maintaining the SCU size setting, or in other words, without updating the SPS. Cost calculation and cost comparison may be additionally skipped for CUs having a size that is larger than the SCU size. In a second technique of inhibiting block division in deep layers, the mode control section 41 adjusts the value of the SCU size, raising the value above that of normal mode. According to the second technique, it is possible to reduce the number of split flags used to specify a quadtree structure. Also, as a result of the SPS being redefined, the user may be easily informed of the timings at which the operating mode switched between normal mode and resource saving mode.

As another example, in resource saving mode, the mode control section 41 may restrict the depth of block division in the block setting section 47 such that the CUs do not have a larger size among multiple available sizes. In this case, block division is enforced in shallow layers. In a first technique of enforcing block division in shallow layers, the mode control section 41 causes the block setting section 47 to skip cost calculation and cost comparison for CUs having a size equal to the LCU size. The split flags for CUs having a size that is equal to the LCU size all indicate 1 (divide). According to the first technique, it is possible to vary the depth of division while maintaining the LCU size setting, or in other words, without updating the SPS. Cost calculation and cost comparison may be additionally skipped for CUs having a size that is smaller than the LCU size. In a second technique of enforcing block division in shallow layers, the mode control section 41 adjusts the value of the LCU size, lowering the value below that of normal mode. According to the second technique, it is possible to reduce the number of split flags used to specify a quadtree structure. Also, as a result of the SPS being redefined, the user may be easily informed of the timings at which the operating mode switched between normal mode and resource saving mode. Note that in the case in which the LCU size changes, the scan order of blocks in an image changes.

(2) Second Exemplary Configuration

FIG. 5B is a block diagram illustrating a second example of a detailed configuration of the block division section 40. Referring to FIG. 5B, likewise in the second example, the block division section 40 is equipped with a mode control section 41 and a block setting section 47. The mode control section 41 and the block setting section 47 respectively include functions similar to those described in the first exemplary configuration. However, in the second exemplary configuration, each section is realized as a dedicated logic circuit rather than being realized as a logical program module.

The mode control section 41 includes a mode determination section 43 and a clock generation section 45. The block setting section 47 includes an 8×8 calculation section 49a, a 16×16 calculation section 49b, a 32×32 calculation section 49c, a 64×64 calculation section 49d, and a comparison section 51. The 8×8 calculation section 49a, the 16×16 calculation section 49b, the 32×32 calculation section 49c, and the 64×64 calculation section 49d are connected in parallel between the clock generation section 45 and the comparison section 51.

The mode determination section 43 determines an operating mode related to resource efficiency. The mode determination section 43 switches the operating mode between normal mode and resource saving mode, either automatically or according to user input via a user interface. For example, the mode determination section 43 may set the operating mode to resource saving mode according to user input in order to reduce battery consumption, raise the frame rate, or for higher speed. Also, in the case in which the battery charge level falls below a threshold, or in the case in which the image encoding device 10 is not connected to an external power source, the mode determination section 43 may set the operating mode to resource saving mode in order to reduce battery consumption. The mode determination section 43 may also set the operating mode to resource saving mode in the case of fast motion by the device capturing the image.

The clock generation section 45 generates a clock signal, and provides the generated clock signal to the 8×8 calculation section 49a, the 16×16 calculation section 49b, the 32×32 calculation section 49c, and the 64×64 calculation section 49d. The 8×8 calculation section 49a, the 16×16 calculation section 49b, the 32×32 calculation section 49c, and the 64×64 calculation section 49d use the clock signal provided by the clock generation section 45 to execute cost calculation for candidate CUs having the respectively corresponding sizes. In normal mode, if the SCU size is 8×8 pixels and the LCU size is 64×64 pixels, the clock generation section 45 provides a clock signal to all of the 8×8 calculation section 49a, the 16×16 calculation section 49b, the 32×32 calculation section 49c, and the 64×64 calculation section 49d. In resource saving mode, the clock generation section 45 stops providing a clock signal to the 8×8 calculation section 49a in the case of inhibiting block division in deep layers. The clock generation section 45 may also stop providing a clock signal to multiple calculation sections (for example, the 8×8 calculation section 49a and the 16×16 calculation section 49b). In resource saving mode, the clock generation section 45 stops providing a clock signal to the 64×64 calculation section 49d in the case of enforcing block division in shallow layers. The clock generation section 45 may also stop providing a clock signal to multiple calculation sections (for example, the 32×32 calculation section 49c and the 64×64 calculation section 49d). The clock generation section 45 does not provide a clock signal to a calculation section corresponding to a size smaller than the SCU size. Similarly, the clock generation section 45 does not provide a clock signal to a calculation section corresponding to a size larger than the LCU size.

The 8×8 calculation section 49a uses a clock signal provided by the clock generation section 45 to execute cost calculation for candidate CUs having a size of 8×8 pixels. The 8×8 calculation section 49a then outputs calculated costs to the comparison section 51. The 16×16 calculation section 49b uses a clock signal provided by the clock generation section 45 to execute cost calculation for candidate CUs having a size of 16×16 pixels. The 16×16 calculation section 49b then outputs calculated costs to the comparison section 51. The 32×32 calculation section 49c uses a clock signal provided by the clock generation section 45 to execute cost calculation for candidate CUs having a size of 32×32 pixels. The 32×32 calculation section 49c then outputs calculated costs to the comparison section 51. The 64×64 calculation section 49d uses a clock signal provided by the clock generation section 45 to execute cost calculation for candidate CUs having a size of 64×64 pixels. The 64×64 calculation section 49d then outputs calculated costs to the comparison section 51.

The comparison section 51 determines whether to divide a candidate CU of given size by comparing the calculated costs between that candidate CU and four smaller CUs corresponding to that candidate CU. The comparison section 51 repeatedly executes such division determination in order from the SCU size up to the LCU size. In the case in which the provision of a clock signal is stopped and cost calculation is skipped for a given size, the comparison section 51 skips division determination related to that size. Subsequently, the comparison section 51 generates parameters for specifying the quadtree structure of each LCU derived as a result of a series of division determinations, and outputs the generated parameters to the lossless encoding section 16.

(3) Third Exemplary Configuration

FIG. 5C is a block diagram illustrating a third example of a detailed configuration of the block division section 40. Referring to FIG. 5C, likewise in the third example, the block division section 40 is equipped with a mode control section 41 and a block setting section 47. The mode control section 41 and the block setting section 47 respectively include functions similar to those described in the first exemplary configuration. However, in the third exemplary configuration, each section is realized as a dedicated logic circuit rather than being realized as a logical program module.

The mode control section 41 includes a mode determination section 44 and a clock generation section 46. The block setting section 47 includes a cost calculation section 50 and a comparison section 52. Unlike the second exemplary configuration, in the third exemplary configuration, the cost calculation section 50 executes a cost calculation process for a series of candidate CUs in series.

The mode determination section 44 determines an operating mode related to resource efficiency. The mode determination section 44 switches the operating mode between normal mode and resource saving mode, either automatically or according to user input via a user interface. For example, the mode determination section 44 may set the operating mode to resource saving mode according to user input in order to reduce battery consumption, raise the frame rate, or for higher speed. Also, in the case in which the battery charge level falls below a threshold, or in the case in which the image encoding device 10 is not connected to an external power source, the mode determination section 44 may set the operating mode to resource saving mode in order to reduce battery consumption. The mode determination section 44 may also set the operating mode to resource saving mode in the case of fast motion by the device capturing the image.

The clock generation section 46 generates a clock signal, and supplies the generated clock signal to the cost calculation section 50. The cost calculation section 50 uses a clock signal provided by the clock generation section 46 to execute cost calculation for each in a series of candidate CUs. In the case in which resource saving mode is set in order to reduce battery consumption, the clock generation section 46 may also temporarily stop providing a clock signal during a period in which a skipped cost calculation would have been executed. In the case in which resource saving mode for higher speed, provision of a clock signal from the clock generation section 46 to the cost calculation section 50 is not stopped, and block division finishes more quickly as a result of cost calculation being skipped for several candidate CUs. Likewise in the case in which resource saving mode is set in order to raise the frame rate, provision of a clock signal from the clock generation section 46 to the cost calculation section 50 is not stopped, and excess processing resources produced by skipping cost calculation for some candidate CUs are used in order to raise the frame rate.

The cost calculation section 50 uses a clock signal provided by the clock generation section 46 to execute cost calculation for candidate CUs having various sizes. The cost calculation section 50 then sequentially outputs calculated costs to the comparison section 52.

The comparison section 52 determines whether to divide a candidate CU of given size by comparing the calculated costs between that candidate CU and four smaller CUs corresponding to that candidate CU. The comparison section 52 repeatedly executes such division determination in order from the SCU size up to the LCU size. In the case in which cost calculation is skipped for a given size, the comparison section 52 skips division determination related to that size. Subsequently, the comparison section 52 generates parameters for specifying the quadtree structure of each LCU derived as a result of a series of division determinations, and outputs the generated parameters to the lossless encoding section 16.

<2-3. Relationships Between Operating Mode and Resource Efficiency>

(1) Parallel Processing—First Example

FIG. 7A is an explanatory diagram illustrating a first example of relationships between operating mode and resource efficiency in parallel processing. The horizontal direction of the drawing corresponds to a time axis. The hollow bold frames represent cost calculations, the solid bold frames represent division determination processes that are executed, and the dotted frames represent processes that are skipped.

The sequence of processes illustrated in the upper part of FIG. 7A exemplifies a sequence in an operating mode M11, where the operating mode M11 is a normal mode. In normal mode, cost calculation may be executed in parallel for 8×8 pixel, 16×16 pixel, 32×32 pixel, and 64×64 pixel candidate CUs. When cost calculation finishes for one 16×16 pixel candidate CU, a division determination for that candidate CU is executed. When cost calculation finishes for one 32×32 pixel candidate CU, a division determination for that candidate CU is executed. When cost calculation finishes for one 64×64 pixel candidate CU, a division determination for that candidate CU is executed.

The sequence of processes illustrated in the middle part of FIG. 7A exemplifies a sequence in an operating mode M12, where the operating mode M12 is a resource saving mode. In this resource saving mode, cost calculation is executed in parallel for 16×16 pixel, 32×32 pixel, and 64×64 pixel candidate CUs, whereas cost calculation is skipped for 8×8 pixel candidate CUs. Division determination for 16×16 pixel candidate CUs is likewise skipped. As a result, the battery consumption rate or the usage rate of other resources is reduced.

The sequence of processes illustrated in the lower part of FIG. 7A exemplifies a sequence in an operating mode M13, where the operating mode M13 is a stronger resource saving mode. In this resource saving mode, cost calculation is executed in parallel for 32×32 pixel and 64×64 pixel candidate CUs, whereas cost calculation is skipped for 8×8 pixel and 16×16 pixel candidate CUs. Division determination for 16×16 pixel and 32×32 pixel candidate CUs is likewise skipped. As a result, the battery consumption rate or the usage rate of other resources is reduced even further.

(2) Parallel Processing—Second Example

FIG. 7B is an explanatory diagram illustrating a second example of relationships between operating mode and resource efficiency in parallel processing.

The sequence of processes illustrated in the upper part of FIG. 7B exemplifies a sequence in an operating mode M21, where the operating mode M21 is a normal mode. The sequence in the operating mode M21 is substantially the same as the sequence of the operating mode M11 illustrated in the upper part of FIG. 7A.

The sequence of processes illustrated in the middle part of FIG. 7B exemplifies a sequence in an operating mode M22, where the operating mode M22 is a resource saving mode. In this resource saving mode, cost calculation is executed in parallel for 8×8 pixel, 16×16 pixel, and 32×32 pixel candidate CUs, whereas cost calculation is skipped for 64×64 pixel candidate CUs. Division determination for 64×64 pixel candidate CUs is likewise skipped. As a result, the battery consumption rate or the usage rate of other resources is reduced.

The sequence of processes illustrated in the lower part of FIG. 7B exemplifies a sequence in an operating mode M23, where the operating mode M23 is a stronger resource saving mode. In this resource saving mode, cost calculation is executed in parallel for 8×8 pixel and 16×16 pixel candidate CUs, whereas cost calculation is skipped for 32×32 pixel and 64×64 pixel candidate CUs. Division determination for 32×32 pixel and 64×64 pixel candidate CUs is likewise skipped. As a result, the battery consumption rate or the usage rate of other resources is reduced even further.

(3) Series Processing—First Example

FIG. 8A is an explanatory diagram illustrating a first example of relationships between operating mode and resource efficiency in series processing.

The sequence of processes illustrated in the upper part of FIG. 8A exemplifies a sequence in an operating mode M31, where the operating mode M31 is a normal mode. In normal mode, when cost calculation finishes for four 8×8 pixel candidate CUs and a corresponding 16×16 pixel candidate CU, division determination is executed for that 16×16 pixel candidate CU. Also, when division determination finishes for four 16×16 pixel candidate CUs, cost calculation and division determination is executed for a corresponding 32×32 pixel candidate CU. Also, when division determination finishes for four 32×32 pixel candidate CUs, cost calculation and division determination is executed for a corresponding 64×64 pixel candidate CU.

The sequence of processes illustrated in the middle part of FIG. 8A exemplifies a sequence in an operating mode M32, where the operating mode M32 is a resource saving mode. In this resource saving mode, cost calculation for 8×8 pixel candidate CUs as well as division determination for 16×16 pixel candidate CUs are skipped. As a result, the battery consumption rate or the usage rate of other resources is reduced.

The sequence of processes illustrated in the lower part of FIG. 8A exemplifies a sequence in an operating mode M33, where the operating mode M33 is a stronger resource saving mode. In this resource saving mode, cost calculation for 8×8 pixel and 16×16 pixel candidate CUs is skipped. Division determination for 16×16 pixel and 32×32 pixel candidate CUs is likewise skipped. As a result, the battery consumption rate or the usage rate of other resources is reduced even further.

(4) Series Processing—Second Example

FIG. 8B is an explanatory diagram illustrating a second example of relationships between operating mode and resource efficiency in series processing.

The sequence of processes illustrated in the upper part of FIG. 8B exemplifies a sequence in an operating mode M41, where the operating mode M41 is a normal mode. The sequence in the operating mode M41 is substantially the same as the sequence of the operating mode M31 illustrated in the upper part of FIG. 8A.

The sequence of processes illustrated in the middle part of FIG. 8B exemplifies a sequence in an operating mode M42, where the operating mode M42 is a resource saving mode. In this resource saving mode, cost calculation and division determination for 64×64 pixel candidate CUs are skipped. As a result, the battery consumption rate or the usage rate of other resources is reduced.

The sequence of processes illustrated in the lower part of FIG. 8B exemplifies a sequence in an operating mode M43, where the operating mode M43 is a stronger resource saving mode. In this resource saving mode, cost calculation for 32×32 pixel and 64×64 pixel candidate CUs is skipped. Division determination for 32×32 pixel and 64×64 pixel candidate CUs is likewise skipped. As a result, the battery consumption rate or the usage rate of other resources is reduced even further.

(5) Higher Frame Rate and Higher Speed

In the examples illustrated in FIGS. 7A to 8B, excess resources are produced as a result of skipping the processes indicated by the dotted frames. If no processes are executed during the skip timings, the time average of battery consumption is reduced. Otherwise, a higher frame rate may be realized by executing an encoding process for additional frames using the produced excess resources. As an example, whereas a frame rate of 60 frames per second (fps) may be provided in normal mode, a high frame rate of 120 fps may be provided in resource saving mode.

Also, in the case of skipping a given process, faster encoding processing may be realized by conducting subsequent processes at earlier timings. FIG. 9 is an explanatory diagram for describing speedup of an encoding process. The sequence of processes illustrated in the upper part of FIG. 9 exemplifies a sequence in an operating mode M51, where the operating mode M51 is a normal mode. The sequence in the operating mode M51 is substantially the same as the sequence of the operating mode M31 illustrated in the upper part of FIG. 8A. The sequence of processes illustrated in the bottom part of FIG. 9 exemplifies a sequence in an operating mode M52, where the operating mode M52 is a resource saving mode. In this resource saving mode, cost calculation for 8×8 pixel candidate CUs as well as division determination for 16×16 pixel candidate CUs are skipped. Additionally, as indicated by the dashed arrows in the drawing, processes following the skipped processes are executed ahead of schedule. As a result, in the operating mode M52, the processing time taken for block division is shortened, and the encoding processing may be sped up.

<2-4. Process Flow>

(1) Diagrammatic Flow

FIG. 10 is a flowchart illustrating an example of a diagrammatic flow of a block division process executed by the block division section 40. The block division section 40 executes the block division process illustrated in FIG. 10 for each of a series of images constituting video.

Referring to FIG. 10, first, the mode control section 41 of the block division section 40 executes a mode determination process to be discussed later (step S10). As a result, an operating mode selected from multiple candidates, which include a normal and a resource saving mode, is set in the block division section 40.

Later processes are repeated for each of the LCUs arranged in a raster over an image. In each repetition, the block setting section 47 first determines the current LCU, which is the LCU to be processed. Typically, LCUs are processed in raster scan order.

Subsequently, the block division process branches depending on the operating mode at that time (step S25). In the case in which the operating mode is normal mode, the block setting section 47 executes a block setting process in normal mode for the current LCU (step S30). In the case in which the operating mode is resource saving mode, the block setting section 47 executes a block setting process in resource saving mode for the current LCU (step S50). Note that the block division process is not limited to the example illustrated in the drawing, and may also branch into processes corresponding to three or more operating modes.

When the block setting process finishes for the current LCU, the block setting section 47 determines whether or not an unprocessed LCU remains in the image (step S90). Subsequently, in the case in which an unprocessed LCU remains, the process returns to step S20, and the next LCU becomes the new current LCU. In the case where no unprocessed LCUs remain, the block division process ends for that image.

(2) Mode Determination Process

FIG. 11A is a flowchart illustrating a first example of a detailed flow of a mode determination process. In the first example, first, the mode control section 41 identifies user input acquired via a user interface (step S11). The user interface at this point may be a graphical user interface (GUI) as exemplified in FIGS. 6A and 6B. Also, a physical UI such as simple buttons or switches, or a speech UI may also be used. Subsequently, the mode control section 41 sets an operating mode corresponding to the identified user input in the block division section 40. Note that the process is not limited to the example illustrated in the drawing, and an operating mode may also be selected from three or more candidates.

FIG. 11B is a flowchart illustrating a second example of a detailed flow of a mode determination process. In the second example, first, the mode control section 41 monitors the battery charge level (step S12). Subsequently, the mode control section 41 determines whether the battery charge level at that time exceeds a designated threshold (step S15). In the case in which the battery charge level exceeds the threshold, the mode control section 41 sets normal mode as the operating mode (step S19*a*). Conversely, in the case in which the battery charge level does not exceed the threshold, the mode control section 41 sets resource saving mode as the operating mode (step S19*b*). Note that the process is not limited to the example illustrated in the drawing, and an operating mode may also be selected from three or more candidates using two or more thresholds.

FIG. 11C is a flowchart illustrating a third example of a detailed flow of a mode determination process. In the third example, first, the mode control section 41 determines a connection to an external power source (step S13). Subsequently, in the case in which the image encoding device 10 is connected to an external power source at that time (step S16), the mode control section 41 sets normal mode as the operating mode (step S19*a*). Conversely, in the case in which the image encoding device 10 is not connected to an external power source, the mode control section 41 sets resource saving mode as the operating mode (step S19*b*).

FIG. 11D is a flowchart illustrating a fourth example of a detailed flow of a mode determination process. In the fourth example, first, the mode control section 41 monitors camera motion (step S14). Subsequently, the mode control section 41 determines whether or not the camera motion is fast, by comparing an indicator expressing camera motion against a threshold, for example (step S17). In the case of determining that the camera motion is not fast, the mode control section 41 sets normal mode as the operating mode (step S19*a*). Conversely, in the case of determining that the camera motion is fast, the mode control section 41 sets resource saving mode as the operating mode (step S19*b*). Note that the process is not limited to the example illustrated in the drawing, and an operating mode may also be selected from three or more candidates using two or more thresholds.

(3) Block Setting Process in Normal Mode

FIG. 12 is a flowchart illustrating an example of a detailed flow of a block setting process in normal mode. The block setting process illustrated in FIG. 12 is executed for each current LCU.

Referring to FIG. 12, first, the block setting section 47 calculates costs for four CUs of N×N pixels within the current LCU (step S31). At this point, N is equal to the SCU size. Next, the block setting section 47 calculates the cost for one CU of 2N×2N pixels corresponding to those four CUs (step S32). Next, the block setting section 47 determines whether to divide the 2N×2N pixel CU, by comparing the total of the costs calculated in step S31 to the cost calculated in step S32 (step S33). For example, in the case in which the former cost is lower, the block setting section 47 decides to divide the 2N×2N pixel CU. On the other hand, in the case in which the latter cost is lower, the block setting section 47 decides to not divide the 2N×2N pixel CU.

Next, the block setting section 47 determines whether or not the 2N×2N pixel CU is equal to the LCU (step S34). In the case in which the 2N×2N pixel CU is equal to the LCU, the block setting process illustrated in FIG. 12 ends. On the other hand, the process proceeds to step S35 in the negative case.

In step S35, the block setting section 47 determines whether or not division determination has finished for four CUs of 2N×2N pixels (step S35). At this point, in the case in which division determination has not finished for four CUs of 2N×2N pixels, the process returns to step S31, and the process for division determination is executed for the next 2N×2N pixel CU.

In the case in which division determination has finished for four CUs of 2N×2N pixels, the block setting section 47 calculates the cost for one CU of 4N×4N pixels corresponding to those four CUs (step S36). Next, the block setting section 47 determines whether to divide the 4N×4N pixel CU, by comparing the total of the costs of the four CUs of 2N×2N pixels to the cost calculated in step S36 (step S37). For example, in the case in which the former cost is lower, the block setting section 47 decides to divide the 4N×4N pixel CU. On the other hand, in the case in which the latter cost is lower, the block setting section 47 decides to not divide the 4N×4N pixel CU.

Next, the block setting section 47 determines whether or not the 4N×4N pixel CU is equal to the LCU (step S38). In the case in which the 4N×4N pixel CU is equal to the LCU, the block setting process illustrated in FIG. 12 ends. On the other hand, the process proceeds to step S39 in the negative case.

In step S39, the block setting section 47 determines whether or not division determination has finished for four CUs of 4N×4N pixels (step S39). At this point, in the case in which division determination has not finished for four CUs of 4N×4N pixels, the process returns to step S31, and the process for division determination is executed for the next 4N×4N pixel CU (and smaller CUs).

In the case in which division determination has finished for four CUs of 4N×4N pixels, the block setting section 47 calculates the cost for one CU of 8N×8N pixels corresponding to those four CUs (step S40). Next, the block setting section 47 determines whether to divide the 8N×8N pixel CU, by comparing the total of the costs of the four CUs of 4N×4N pixels to the cost calculated in step S40 (step S41). For example, in the case in which the former cost is lower, the block setting section 47 decides to divide the 8N×8N pixel CU. On the other hand, in the case in which the latter cost is lower, the block setting section 47 decides to not divide the 8N×8N pixel CU. From the constraints on the SCU size and the LCU size, an 8N×8N pixel CU is equal to the LCU, and thus when division determination finishes for an 8N×8N pixel CU, the block setting process illustrated in FIG. 12 ends.

(4) Block Setting Process in Resource Saving Mode—First Example

FIG. 13A is a flowchart illustrating a first example of a detailed flow of a block setting process in resource saving mode. In the first example, the depth of block division is restricted so that CUs do not have the smallest size from among the available sizes. The SCU size setting is maintained irrespectively of the operating mode.

Referring to FIG. 13A, first, the block setting section 47 skips cost calculation for four CUs of N×N pixels within the current LCU (step S51). At this point, N is equal to the SCU size. Next, the block setting section 47 calculates the cost for one CU of 2N×2N pixels corresponding to those four CUs (step S52). Next, the block setting section 47 skips division determination for the 2N×2N pixel CU, and generates a split flag indicating to not divide that 2N×2N pixel CU (step S53a).

Next, the block setting section 47 determines whether or not the 2N×2N pixel CU is equal to the LCU (step S54a). In the case in which the 2N×2N pixel CU is equal to the LCU, the block setting process illustrated in FIG. 13A ends. On the other hand, the process proceeds to step S55a in the negative case.

In step S55a, the block setting section 47 determines whether or not split flag generation has finished for four CUs of 2N×2N pixels (step S55a). At this point, the process returns to step S51a in the case in which split flag generation has not finished.

In the case in which split flag generation has finished for four CUs of 2N×2N pixels, the block setting section 47 calculates the cost for one CU of 4N×4N pixels corresponding to those four CUs (step S56a). Next, the block setting section 47 determines whether to divide the 4N×4N pixel CU by comparing the total of the costs of the four CUs of 2N×2N pixels to the cost calculated in step S56a, and generates a split flag corresponding to the determination result (step S57a).

Next, the block setting section 47 determines whether or not the 4N×4N pixel CU is equal to the LCU (step S58). In the case in which the 4N×4N pixel CU is equal to the LCU, the block setting process illustrated in FIG. 13A ends. On the other hand, the process proceeds to step S59 in the negative case.

In step S59, the block setting section 47 determines whether or not division determination has finished for four CUs of 4N×4N pixels (step S59). At this point, in the case in which division determination has not finished for four CUs of 4N×4N pixels, the process returns to step S51, and the process for division determination is executed for the next 4N×4N pixel CU.

In the case in which division determination has finished for four CUs of 4N×4N pixels, the block setting section 47 calculates the cost for one CU of 8N×8N pixels corresponding to those four CUs (step S60a). Next, the block setting section 47 determines whether to divide the 8N×8N pixel CU by comparing the total of the costs of the four CUs of 4N×4N pixels to the cost calculated in step S60a, and generates a split flag corresponding to the determination result (step S61a). When division determination finishes for the 8N×8N pixel CU, the block setting process illustrated in FIG. 13A ends.

(5) Block Setting Process in Resource Saving Mode—Second Example

FIG. 13B is a flowchart illustrating a second example of a detailed flow of a block setting process in resource saving mode. In the second example, the depth of block division is restricted so that CUs do not have the smallest size from among the available sizes. The SCU size is reconfigured to a value that is double that of normal mode.

Referring to FIG. 13B, first, the mode control section 41 updates the SCU size from N×N pixels to M×M pixels (where M=2N) (step S70a).

Next, the block setting section 47 calculates costs for four CUs of M×M pixels within the current LCU (step S71a). Next, the block setting section 47 calculates the cost for one CU of 2M×2M pixels corresponding to those four CUs (step S72). Next, the block setting section 47 determines whether to divide the 2M×2M pixel CU by comparing the total of the costs calculated in step S71a to the cost calculated in step S72, and generates a split flag corresponding to the determination result (step S73a).

Next, the block setting section 47 determines whether or not the 2M×2M pixel CU is equal to the LCU (step S74a). In the case in which the 2M×2M pixel CU is equal to the LCU, the block setting process illustrated in FIG. 13B ends. On the other hand, the process proceeds to step S75 in the negative case.

In step S75, the block setting section 47 determines whether or not division determination has finished for four CUs of 2M×2M pixels (step S75a). At this point, the process returns to step S71a in the case in which division determination has not finished for four CUs of 2M×2M pixels.

In the case in which division determination has finished for four CUs of 2M×2M pixels, the block setting section 47 calculates the cost for one CU of 4M×4M pixels corresponding to those four CUs (step S76). Next, the block setting section 47 determines whether to divide the 4M×4M pixel CU by comparing the total of the costs of the four CUs of 2M×2M pixels to the cost calculated in step S76, and generates a split flag corresponding to the determination result (step S77). When division determination finishes for the 4M×4M pixel CU, the block setting process illustrated in FIG. 13B ends.

In the two examples illustrated in FIGS. 13A and 13B, block division in deep layers is inhibited as discussed above. For example, in the case of inhibiting block division into CUs of 8×8 pixels, it is possible to skip 64 cost calculation processes (Cost{8×8 (0)} to Cost{8×8 (63)}) and 16 division determination processes (Compare{16×16 (0)} to Compare{16×16 (15)}) from among the cost calculation processes and division determination processes illustrated in FIG. 3B. As another example, in the case of inhibiting block division into CUs of 16×16 pixels, it is possible to additionally skip 16 cost calculation processes (Cost{16×16 (0)} to Cost{16×16 (15)}) and 4 division determination processes (Compare{32×32 (0)} to Compare{32×32 (3)}).

(6) Block Setting Process in Resource Saving Mode—Third Example

FIG. 13C is a flowchart illustrating a third example of a detailed flow of a block setting process in resource saving mode. In the third example, the depth of block division is restricted so that CUs do not have the largest size from among the available sizes. The LCU size setting is maintained irrespectively of the operating mode.

Referring to FIG. 13C, first, the block setting section 47 calculates costs for four CUs of N×N pixels within the current LCU (step S51b). At this point, N is equal to the SCU size. Next, the block setting section 47 calculates the cost for one CU of 2N×2N pixels corresponding to those four CUs (step S52). Next, the block setting section 47 determines whether to divide the 2N×2N pixel CU by comparing the total of the costs calculated in step S51b to the cost calculated in step S52, and generates a split flag corresponding to the determination result (step S53b).

Next, the block setting section 47 determines whether or not division determination has finished for four CUs of 2N×2N pixels (step S54b). At this point, the process returns to step S51b in the case in which division determination has not finished. In the case in which division determination has finished for four CUs of 2N×2N pixels, the block setting section 47 additionally determines whether or not a CU of 4N×4N pixels corresponding to those four CUs is equal to the LCU (step S55b). In the case in which the 4N×4N pixel CU is equal to the LCU, the process proceeds to step S56b. On the other hand, the process proceeds to step S55a in the negative case.

In step S56a, the block setting section 47 calculates the cost for one CU of 4N×4N pixels (step S56a). Next, the block setting section 47 determines whether to divide the 4N×4N pixel CU by comparing the total of the costs of the four CUs of 2N×2N pixels to the cost calculated in step S56a, and generates a split flag corresponding to the determination result (step S57a). Subsequently, the process proceeds to step S59.

Meanwhile, in step S56b, the block setting section 47 skips cost calculation for a 4N×4N pixel CU equal to the LCU (step S56b). Next, the block setting section 47 decides to divide the 4N×4N pixel CU, and generates a split flag indicating to divide that CU (step S57b).

In step S59, the block setting section 47 determines whether or not division determination has finished for four CUs of 4N×4N pixels (step S59). At this point, in the case in which division determination has not finished for four CUs of 4N×4N pixels, the process returns to step S51b, and the process for division determination is executed for the next 4N×4N pixel CU (and smaller CUs).

After division determination finishes for four CUs of 4N×4N pixels, the block setting section 47 skips cost calculation for a CU of 8N×8N pixels corresponding to those four CUs (step S60b). Next, the block setting section 47 decides to divide the 8N×8N pixel CU, and generates a split flag indicating to divide that CU (step S61b). When the generation of a split flag for a CU equal to the LCU finishes in step S57b or step S61b, the block setting process illustrated in FIG. 13C ends.

(7) Block Setting Process in Resource Saving Mode—Fourth Example

FIG. 13D is a flowchart illustrating a fourth example of a detailed flow of a block setting process in resource saving mode. In the fourth example, the depth of block division is restricted so that CUs do not have the largest size from among the available sizes. The LCU size is reconfigured to a value that is half that of normal mode.

Referring to FIG. 13D, first, the mode control section 41 updates the LCU size from L×L pixels to K×K pixels (where K=L/2) (step S70b).

Next, the block setting section 47 calculates costs for four CUs of N×N pixels within the current LCU (step S71b). At this point, N is equal to the SCU size. Next, the block setting section 47 calculates the cost for one CU of 2N×2N pixels corresponding to those four CUs (step S72). Next, the block setting section 47 determines whether to divide the 2N×2N pixel CU by comparing the total of the costs calculated in step S71b to the cost calculated in step S72, and generates a split flag corresponding to the determination result (step S73b).

Next, the block setting section 47 determines whether or not the 2N×2N pixel CU is equal to the K×K pixel LCU (step S74b). In the case in which the 2N×2N pixel CU is equal to the LCU, the block setting process illustrated in FIG. 13D ends. On the other hand, the process proceeds to step S75 in the negative case.

In step S75, the block setting section 47 determines whether or not division determination has finished for four CUs of 2N×2N pixels (step S75). At this point, the process returns to step S71b in the case in which division determination has not finished. The process proceeds to step S76 in the case in which division determination has finished for four CUs of 2N×2N pixels.

In step S76, the block setting section 47 calculates the cost for one CU of 4N×4N pixels (step S76). Next, the block setting section 47 determines whether to divide the 4N×4N pixel CU by comparing the total of the costs of the four CUs of 2N×2N pixels to the cost calculated in step S76, and generates a split flag corresponding to the determination result (step S77). When the generation of a split flag for a CU equal to the LCU finishes in this way, the block setting process illustrated in FIG. 13D ends.

In the third example illustrated in FIG. 13C, block division in shallow layers is enforced as discussed above. For example, in the case of enforcing block division of a 64×64 pixel CU into 32×32 pixel CUs, it is possible to skip the more resource-intensive cost calculation process Cost{64×64 (0)} and division determination process Compare{64×64 (0)} from among the cost calculation processes and division determination process illustrated in FIG. 3B. As another example, in the case of enforcing block division into CUs of 16×16 pixels, it is possible to additionally skip 4 cost calculation processes (Cost{32×32 (0)} to Cost{32×32 (3)}) and 4 division determination processes (Compare{32×32 (0)} to Compare{32×32 (3)}).

Figure 14:
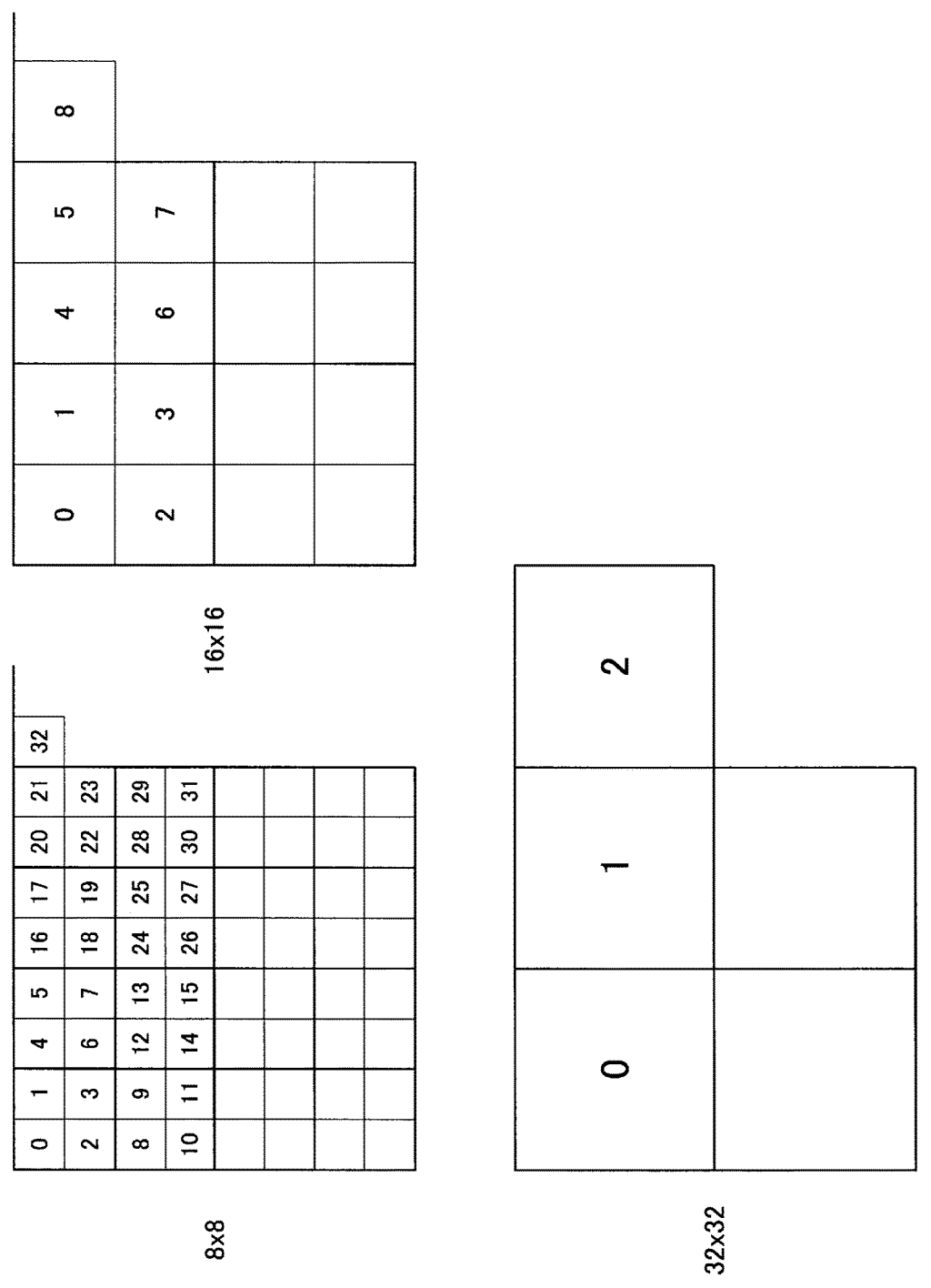

Likewise, in the fourth example illustrated in FIG. 13D, cost calculation processes and division determination processes may be similarly skipped. However, since in this example the LCU size is scaled down, the scan order of blocks in an image differs between normal mode and resource saving mode. FIG. 14 is an explanatory diagram for describing the scan order of blocks in the case of scaling down the LCU size in resource saving mode, in comparison to FIG. 3A. In the example of FIG. 3A, since blocks are scanned within a 64×64 pixel LCU, the block 8×8 (32) that is scanned next after the block 8×8 (31) is positioned at the left edge of the row below the block 8×8 (31), for example. Conversely, in the example of FIG. 14, since blocks are scanned within a 32×32 pixel LCU, the block 8×8 (32) that is scanned next after the block 8×8 (31) is positioned at the top edge of the column to the right of the block 8×8 (31). Similarly, in the example of FIG. 3A, the block 16×16 (8) that is scanned next after the block 16×16 (7) is positioned at the left edge of the row below the block 16×16 (7). Conversely, in the example of FIG. 14, the block 16×16 (8) that is scanned next after the block 16×16 (7) is positioned at the top edge of the column to the right of the block 16×16 (7).

<3. Second Embodiment>

The first embodiment describes controlling the depth of block division from the LCU into CUs in accordance with an operating mode related to resource efficiency. The second embodiment described in this section attempts to reduce the processing load on the encoder even more by further utilizing an operating mode related to resource efficiency in addition to control of the depth of block division.

<3-1. Overall Configuration>

FIG. 15 is a block diagram illustrating a schematic configuration of an image encoding device 60 according to the second embodiment. Referring to FIG. 15, the image encoding device 60 is equipped with a reordering buffer 11, a subtraction section 13, an orthogonal transform section 14, a quantization section 15, a lossless encoding section 16, an accumulation buffer 17, a rate control section 18, an inverse quantization section 21, an inverse orthogonal transform section 22, an addition section 23, a loop filter 24, frame memory 25, selection sections 26 and 27, an intra prediction section 30, an inter prediction section 35, and a block division section 90.

The block division section 90 includes functions similar to the block division section 40 according to the first embodiment, and sets the quadtree structure of CUs for each of the LCUs set in an image. The block division section 90 arranges LCUs in a raster over an image, and additionally divides each LCU into multiple CUs. Likewise in the present embodiment, the block division section 90 controls the depth of block division according to an operating mode related to resource efficiency. Furthermore, in the present embodiment, the block division section 90 controls at least one of a selection of intra prediction or inter prediction by the selection section 27, a merge determination by the inter prediction section 35, and TU setting by the orthogonal transform section 14, according to an operating mode related to resource efficiency.

<3-2. Control of Intra/Inter Determination>

For example, for each of one or more CUs within an LCU, the selection section 27 selects one of intra prediction and inter prediction by comparing a cost of intra prediction to a cost of inter prediction. In normal mode, the block division section 90 causes the selection section 27 to determine whether to select intra prediction or inter prediction for each CU. On the other hand, in resource saving mode, the block division section 90 causes the selection section 27 to determine whether to select intra prediction or inter prediction in common for all CUs within an LCU. For example, the block division section 90 may apply the determination result for the CU scanned first within an LCU (typically the upper-left CU) in common to the remaining CUs.

FIG. 16 is a flowchart illustrating an example of a detailed flow of an intra/inter determination control process. Referring to FIG. 16, first, the block division section 90 executes the mode determination process described using FIGS. 11A to 11D (step S10). Subsequently, the intra/inter determination control process branches depending on the determined operating mode (step S115). In the case in which the operating mode is normal mode, the block division section 90 causes the selection section 27 to select intra prediction or inter prediction for each CU (step S120a). In the case in which the operating mode is resource saving mode, the block division section 90 causes the selection section 27 to select intra prediction or inter prediction in common for all CUs within an LCU (step S120b).

FIG. 17 is an explanatory diagram for describing an example of a processing sequence for intra/inter determination. Herein, the intra/inter determination process executed by the selection section 27 is expressed as "Intra/Inter{X}", where X is the label of the block to process as illustrated in FIG. 3A. As illustrated in FIG. 17, in the case in which the SCU size is 8×8 pixels and the LCU size is 64×64 pixels, in normal mode the selection section 27 executes sixty-four intra/inter determinations for 8×8 pixel CUs, sixteen intra/ inter determinations for 16×16 pixel CUs, four intra/inter determinations for 32×32 pixel CUs, and one intra/inter determination for a 64×64 pixel CU. Conversely, in resource saving mode, a fewer number of intra/inter determinations (only one, for example) may be executed. As an example, the selection section 27 may execute only the intra/inter determination P11 in the 8×8 pixel layer, and apply that result to all remaining CUs. Also, the selection section 27 may execute only the intra/inter determination P12 in the 16×16 pixel layer, and apply that result to all remaining CUs. Also, the selection section 27 may execute only the intra/inter determination P13 in the 32×32 pixel layer, and apply that result to all remaining CUs. Also, the selection section 27 may execute only the intra/inter determination P14 in the 64×64 pixel layer. As a result, it is possible to reduce the amount of resources used for intra/inter determination, and utilize resources efficiently.

<3-3. Control of Merge Determination>

Also, in HEVC, a merge mode is introduced as one tool for inter prediction. For each of one or more PUs within a CU, the inter prediction section 35 determines whether to merge that PU with other PUs as part of the inter prediction process. In the case of merging multiple PUs, since only one set of motion information is encoded for those PUs, the code rate used for motion information may be reduced. In normal mode, the block division section 90 causes the inter prediction section 35 to determine, for each PU, whether to merge that PU with other PUs. On the other hand, in resource saving mode, the block division section 90 causes the inter prediction section 35 to skip merge determinations other than whether all of the one or more PUs within each CU are merged. In addition, the block division section 90 may also cause the inter prediction section 35 to skip merge determinations other than whether all PUs within an LCU are merged.

FIG. 18 is a flowchart illustrating an example of a detailed flow of a merge determination control process. Referring to FIG. 18, first, the block division section 90 executes the mode determination process described using FIGS. 11A to 11D (step S10). Subsequently, the merge determination control process branches depending on the determined operating mode (step S115). In the case in which the operating mode is normal mode, the block division section 90 causes the inter prediction section 35 to execute merge determination for each PU (step S130a). In the case in which the operating mode is resource saving mode, the block division section 90 causes the inter prediction section 35 to execute a merge determination that only determines whether or not to merge all PUs within a CU (or LCU) (step S130b).

<3-4. Control of Transform Unit Setting>

Also, in HEVC, four sizes from 4×4 pixels to 32×32 pixels are available as TU sizes. The orthogonal transform section 14 executes an orthogonal transform on prediction error data for each of one or more TUs formed by dividing a CU. In the case of using a smaller TU size, high image quality may be achieved, but on the other hand, resource usage efficiency may lower since more DC components are included in the transform coefficient data. Consequently, although the block division section 90 does not restrict the selection of TU size in normal mode, in resource saving mode the block division section 90 restricts the selection TU size by the orthogonal transform section 14 so that TUs do not have a smaller size (for example 4×4 pixels, or 4×4 pixels and 8×8 pixels) from among the available sizes.

FIG. 19 is a flowchart illustrating an example of a detailed flow of a transform unit control process. Referring to FIG. 19, first, the block division section 90 executes the mode determination process described using FIGS. 11A to 11D (step S10). Subsequently, the transform unit control process branches depending on the determined operating mode (step S115). In the case in which the operating mode is normal mode, the block division section 90 causes the orthogonal transform section 14 to select an optimal TU size from among all TU size candidates (step S140a). In the case in which the operating mode is resource saving mode, the block division section 90 imposes a restriction so as to exclude 4×4 pixels from the TU size candidates or exclude 4×4 or 8×8 pixels from the TU size candidates regarding P picture and B picture of the GOP, for example, and causes the orthogonal transform section 14 to select an optimal TU size from among the restricted TU size candidates (step S140b).

<4. Exemplary Applications>

The foregoing embodiments may be applied to various electronic equipment, such as transmission devices that transmit an encoded video stream using a satellite link, a cable TV link, the Internet, a cellular communication network, or the like, or recording devices that record an encoded video stream to a medium such as an optical disc, a magnetic disk, or flash memory. Hereinafter, three exemplary applications will be described.

(1) First Example Application

FIG. 20 is a block diagram illustrating an exemplary schematic configuration of a mobile phone adopting the embodiment described above. A mobile phone 920 includes an antenna 921, a communication section 922, an audio codec 923, a speaker 924, a microphone 925, a camera section 926, an image processing section 927, a multiplexing/demultiplexing (mux/demux) section 928, a recording and playback section 929, a display section 930, a control section 931, an operable section 932, a sensor section 933, a bus 934, and a battery 935.

The antenna 921 is connected to the communication section 922. The speaker 924 and the microphone 925 are connected to the audio codec 923. The operable section 932 is connected to the control section 931. The bus 934 interconnects the communication section 922, the audio codec 923, the camera section 926, the image processing section 927, the mux/demux section 928, the recording and playback section 929, the display 930, the control section 931, and the sensor section 933.

The mobile phone 920 performs operations such as transmitting and receiving audio signals, transmitting and receiving emails or image data, taking images, and recording data in various operating modes including an audio communication mode, a data communication mode, an imaging mode, and a videophone mode.

In the audio communication mode, an analog audio signal generated by the microphone 925 is supplied to the audio codec 923. The audio codec 923 converts the analog audio signal into audio data, and A/D converts and compresses the converted audio data. Then, the audio codec 923 outputs the compressed audio data to the communication section 922. The communication section 922 encodes and modulates the audio data, and generates a transmit signal. Then, the communication section 922 transmits the generated transmit signal to a base station (not illustrated) via the antenna 921. Also, the communication section 922 amplifies a wireless signal received via the antenna 921 and converts the frequency of the wireless signal, and acquires a received signal. Then, the communication section 922 demodulates and decodes the received signal and generates audio data, and outputs the generated audio data to the audio codec 923. The audio codec 923 decompresses and D/A converts the audio data, and generates an analog audio signal. Then, the audio codec 923 supplies the generated audio signal to the speaker 924 and causes audio to be output.

Also, in the data communication mode, the control section 931 generates text data that makes up an email, according to operations by a user via the operable section 932, for example. Moreover, the control section 931 causes the text to be displayed on the display section 930. Furthermore, the control section 931 generates email data according to transmit instructions from the user via the operable section 932, and outputs the generated email data to the communication section 922. The communication section 922 encodes and modulates the email data, and generates a transmit signal. Then, the communication section 922 transmits the generated transmit signal to a base station (not illustrated) via the antenna 921. Also, the communication section 922 amplifies a wireless signal received via the antenna 921 and converts the frequency of the wireless signal, and acquires a received signal. Then, the communication section 922 demodulates and decodes the received signal, reconstructs the email data, and outputs the reconstructed email data to the control section 931. The control section 931 causes the display section 930 to display the contents of the email, and also causes the email data to be stored in the storage medium of the recording and playback section 929.

The recording and playback section 929 includes an arbitrary readable and writable storage medium. For example, the storage medium may be a built-in storage medium such as RAM, or flash memory, or an externally mounted storage medium such as a hard disk, a magnetic disk, a magneto-optical disc, an optical disc, USB memory, or a memory card.

Furthermore, in the imaging mode, the camera section 926 takes an image of a subject, generates image data, and outputs the generated image data to the image processing section 927, for example. The image processing section 927 encodes the image data input from the camera section 926, and causes the encoded stream to be stored in the storage medium of the recording and playback section 929.

Furthermore, in the videophone mode, the mux/demux section 928 multiplexes a video stream encoded by the image processing section 927 and an audio stream input from the audio codec 923, and outputs the multiplexed stream to the communication section 922, for example. The communication section 922 encodes and modulates the stream, and generates a transmit signal. Then, the communication section 922 transmits the generated transmit signal to a base station (not illustrated) via the antenna 921. Also, the communication section 922 amplifies a wireless signal received via the antenna 921 and converts the frequency of the wireless signal, and acquires a received signal. The transmit signal and received signal may include an encoded bit stream. Then, the communication section 922 demodulates and decodes the received signal, reconstructs the stream, and outputs the reconstructed stream to the mux/demux section 928. The mux/demux section 928 separates a video stream and an audio stream from the input stream, and outputs the video stream to the image processing section 927 and the audio stream to the audio codec 923. The image processing section 927 decodes the video stream, and generates video data. The video data is supplied to the display section 930, and a series of images is displayed by the display section 930. The audio codec 923 decompresses and D/A converts the audio stream, and generates an analog audio signal. Then, the audio codec 923 supplies the generated audio signal to the speaker 924 and causes audio to be output.

The sensor section includes a sensor group such as an acceleration sensor and a gyro sensor, and outputs an indicator that expresses the motion of the mobile phone 920. The battery 935 supplies electric power to the communication section 922, the audio codec 923, the camera section 926, the image processing section 927, the multiplexing/demultiplexing section 928, the recording and playback section 929, the display section 930, the control section 931, and the sensor section 933, via power supply lines omitted from the drawing.

In a mobile phone 920 configured in this way, the image processing section 927 includes the functions of the image encoding device 10 or 60 according to the foregoing embodiments. As a result, in the mobile phone 920, it becomes possible to flexibly control the depth of block division by the image processing section 927 according to an operating mode related to resource efficiency, and efficiently utilize the resources of the mobile phone 920.

(2) Second Example Application

FIG. 21 is a block diagram illustrating an exemplary schematic configuration of a recording and playback device adopting the embodiment described above. A recording and playback device 940 encodes, and records onto a recording medium, the audio data and video data of a received broadcast program, for example. The recording and playback device 940 may also encode, and record onto the recording medium, audio data and video data acquired from another device, for example. Furthermore, the recording and playback device 940 plays back data recorded onto the recording medium via a monitor and speaker according to instructions from a user, for example. At such times, the recording and playback device 940 decodes the audio data and the video data.

The recording and playback device 940 includes a tuner 941, an external interface 942, an encoder 943, a hard disk drive (HDD) 944, a disc drive 945, a selector 946, a decoder 947, an on-screen display (OSD) 948, a control section 949, and a user interface 950.

The tuner 941 extracts a signal of a desired channel from broadcast signals received via an antenna (not illustrated), and demodulates the extracted signal. Then, the tuner 941 outputs an encoded bit stream obtained by demodulation to the selector 946. That is, the tuner 941 serves as transmission means of the recording and playback device 940.

The external interface 942 is an interface for connecting the recording and playback device 940 to an external appliance or a network. For example, the external interface 942 may be an IEEE 1394 interface, a network interface, a USB interface, a flash memory interface, or the like. For example, video data and audio data received by the external interface 942 are input into the encoder 943. That is, the external interface 942 serves as transmission means of the recording and playback device 940.

In the case where the video data and the audio data input from the external interface 942 are not encoded, the encoder 943 encodes the video data and the audio data. Then, the encoder 943 outputs the encoded bit stream to the selector 946.

The HDD 944 records onto an internal hard disk an encoded bit stream, which is compressed content data such as video or audio, various programs, and other data. Also, the HDD 944 reads such data from the hard disk when playing back video and audio.

The disc drive 945 records or reads data with respect to an inserted recording medium. The recording medium inserted into the disc drive 945 may be a DVD disc (such as a DVD-Video, DVD-RAM, DVD-R, DVD-RW, DVD+, or DVD+RW disc), a Blu-ray (registered trademark) disc, or the like, for example.

When recording video and audio, the selector 946 selects an encoded bit stream input from the tuner 941 or the encoder 943, and outputs the selected encoded bit stream to the HDD 944 or the disc drive 945. Also, when playing back video and audio, the selector 946 outputs an encoded bit stream input from the HDD 944 or the disc drive 945 to the decoder 947.

The decoder 947 decodes the encoded bit stream, and generates video data and audio data. Then, the decoder 947 outputs the generated video data to the OSD 948. Also, the decoder 904 outputs the generated audio data to an external speaker.

The OSD 948 plays back the video data input from the decoder 947, and displays video. Also, the OSD 948 may superimpose GUI images, such as menus, buttons, or a cursor, for example, onto displayed video.

The control section 949 includes a processor such as a CPU, and memory such as RAM or ROM. The memory stores a program to be executed by the CPU, program data, and the like. A program stored in the memory is read and executed by the CPU when activating the recording and playback device 940, for example. By executing the program, the CPU controls the operation of the recording and playback device 940 according to an operation signal input from the user interface 950, for example.

The user interface 950 is connected to the control section 949. The user interface 950 includes buttons and switches used by a user to operate the recording and playback device 940, and a remote control signal receiver, for example. The user interface 950 detects an operation by the user via these structural elements, generates an operation signal, and outputs the generated operation signal to the control section 949.

In a recording and playback device 940 configured in this way, the encoder 943 includes the functions of the image encoding device 10 or 60 according to the foregoing embodiments. As a result, in the recording and playback device 940, it becomes possible to flexibly control the depth of block division by the encoder 943 according to an operating mode related to resource efficiency, and efficiently utilize the resources of the recording and playback device 940.

(3) Third Example Application

FIG. 22 is a block diagram showing an example of a schematic configuration of an imaging device adopting the embodiment described above. An imaging device 960 takes an image of a subject, generates an image, encodes the image data, and records the image data onto a recording medium.

The imaging device 960 includes an optical block 961, an imaging section 962, a signal processing section 963, an image processing section 964, a display section 965, an external interface 966, memory 967, a media drive 968, an OSD 969, a control section 970, a user interface 971, a sensor 972, a bus 973, and a battery 974.

The optical block 961 is connected to the imaging section 962. The imaging section 962 is connected to the signal processing section 963. The display section 965 is connected to the image processing section 964. The user interface 971 is connected to the control section 970. The bus 973 interconnects the image processing section 964, the external interface 966, the memory 967, the media drive 968, the OSD 969, the control section 970, and the sensor 972.

The optical block 961 includes a focus lens, an aperture stop mechanism, and the like. The optical block 961 forms an optical image of a subject on the imaging surface of the imaging section 962. The imaging section 962 includes an image sensor such as a CCD or CMOS sensor, and photo-electrically converts the optical image formed on the imaging surface into an image signal which is an electrical signal. Then, the imaging section 962 outputs the image signal to the signal processing section 963.

The signal processing section 963 performs various camera signal processes such as knee correction, gamma correction, and color correction on the image signal input from the imaging section 962. The signal processing section 963 outputs the processed image data to the image processing section 964.

The image processing section 964 encodes the image data input from the signal processing section 963, and generates encoded data. Then, the image processing section 964 outputs the encoded data thus generated to the external interface 966 or the media drive 968. Also, the image processing section 964 decodes encoded data input from the external interface 966 or the media drive 968, and generates image data. Then, the image processing section 964 outputs the generated image data to the display section 965. Also, the image processing section 964 may output the image data input from the signal processing section 963 to the display section 965, and cause the image to be displayed. Furthermore, the image processing section 964 may superimpose display data acquired from the OSD 969 onto an image to be output to the display section 965.

The OSD 969 generates GUI images such as menus, buttons, or a cursor, for example, and outputs the generated images to the image processing section 964.

The external interface 966 is configured as an USB input/output terminal, for example. The external interface 966 connects the imaging device 960 to a printer when printing an image, for example. Also, a drive is connected to the external interface 966 as necessary. A removable medium such as a magnetic disk or an optical disc, for example, is inserted into the drive, and a program read from the removable medium may be installed in the imaging device 960. Furthermore, the external interface 966 may be configured as a network interface to be connected to a network such as a LAN or the Internet. That is, the external interface 966 serves as transmission means of the image capturing device 960.

A recording medium to be inserted into the media drive 968 may be an arbitrary readable and writable removable medium, such as a magnetic disk, a magneto-optical disc, an optical disc, or semiconductor memory, for example. Also, a recording medium may be permanently installed in the media drive 968 to constitute a non-portable storage section such as an internal hard disk drive or a solid-state drive (SSD), for example.

The control section 970 includes a processor such as a CPU, and memory such as RAM or ROM. The memory stores a program to be executed by the CPU, program data, and the like. A program stored in the memory is read and executed by the CPU when activating the imaging device 960, for example. By executing the program, the CPU controls the operation of the imaging device 960 according to an operation signal input from the user interface 971, for example.

The user interface 971 is connected to the control section 970. The user interface 971 includes buttons, switches and the like used by a user to operate the imaging device 960, for example. The user interface 971 detects an operation by the user via these structural elements, generates an operation signal, and outputs the generated operation signal to the control section 970.

The sensor 972 includes a sensor group such as an acceleration sensor and a gyro sensor, and outputs an indicator that expresses the motion of the image capture device 960. The battery 974 supplies electric power to the image capture section 962, the signal processing section 963, the image processing section 964, the display section 965, the media drive 968, the OSD 969, the control section 970, and the sensor 972, via power supply lines omitted from the drawing.

In an image capture device 960 configured in this way, the image processing section 964 includes the functions of the image encoding device 10 or 60 according to the foregoing embodiments. As a result, in the image capture device 960, it becomes possible to flexibly control the depth of block division by the image processing section 964 according to an operating mode related to resource efficiency, and efficiently utilize the resources of the image capture device 960.

<5. Conclusion>

The foregoing thus describes embodiments of technology according to the present disclosure in detail using FIGS. 1 to 22. According to the foregoing embodiments, in an image coding scheme in which coding units are formed by recursively dividing blocks of an image to be encoded, the depth of block division when configuring the coding units is controlled according to a mode related to resource efficiency. Consequently, in a situation in which image quality is prioritized, it is possible to ensure sufficient resources for deciding optimal block division, whereas in a situation in which resource efficiency is prioritized, it is possible to restrict the depth of block division and save resources. For example, in the case of restricting the depth of block division, battery consumption may be reduced, and excess resources may be used to realize a higher frame or speed up the encoding process.

In one working example, the depth of block division is restricted so that coding units do not have a smaller size from among multiple available sizes. In this case, much of the processing used to decide block division may be omitted, and the usage rate of resources may be effectively reduced. Also, in one working example, the depth of block division is restricted so that coding units do not have a larger size from among multiple available sizes. In this case, it is possible to reduce the usage rate of resources while still using small CUs to leave room for reproducing fine textures of an image when decoding.

In one working example, the depth of block division is restricted by adjusting the value of the LCU size or the SCU size. In this case, the number of split flags used to specify a quadtree structure is reduced, thereby raising the coding efficiency. Also, in one working example, the depth of block division is restricted not by adjusting the value of the LCU or the SCU size, but instead by skipping comparison of costs for a designated size of coding unit. In this case, it is possible to freely vary the depth of division without updating the SPS.

Note that the series of control processes conducted by the devices described in this specification may be realized in any of software, hardware, and a combination of software and hardware. A program constituting software is stored in advance in a non-transitory medium provided internally or externally to each device, for example. Each program is then loaded into random access memory (RAM) at runtime and executed by a processor such as a CPU, for example.

The terms CU, PU, and TU stated in this specification refer to the logical units, including syntax, that are associated with individual blocks in HEVC. In the case of processing only individual blocks as a portion of an image, these terms may be respectively substituted with the terms coding block (CB), prediction block (PB), and transform block (TB). CBs are formed by recursively dividing a coding tree block (CTB) into a quadtree structure. One entire quadtree corresponds to a CTB, and the logical unit corresponding to a CTB is called a coding tree unit (CTU).

Note that this specification mainly describes an example in which the information related to the block division multiplexed into the header of the encoded stream and transmitted from the encoding side to the decoding side. However, the technique of transmitting such information is not limited to such an example. For example, such information may also be transmitted or recorded as separate data associated with an encoded bit stream without being multiplexed into the encoded bit stream. Herein, the term "associated" means that images included in the bit stream (also encompassing partial images such as slices or blocks) and information corresponding to those images can be linked at the time of decoding. In other words, information may also be transmitted on a separate transmission channel from an image (or bit stream). Also, the information may be recorded to a separate recording medium (or a separate recording area on the same recording medium) from the image (or bit stream). Furthermore, information and images (or bit streams) may be associated with each other in arbitrary units such as multiple frames, single frames, or portions within frames, for example.

The foregoing thus describes preferred embodiments of the present disclosure in detail and with reference to the attached drawings. However, the technical scope of the present disclosure is not limited to such examples. It is clear to persons ordinarily skilled in the technical field to which the present disclosure belongs that various modifications or alterations may occur insofar as they are within the scope of the technical ideas stated in the claims, and it is to be understood that such modifications or alterations obviously belong to the technical scope of the present disclosure.

Additionally, the present technology may also be configured as below.

(1)

An encoder for encoding an image signal comprising:
a processor configured to
receive an operating mode signal indicative of a determined operating mode associated with resource efficiency, and
control a depth of block division for a block setting process based on the determined operating mode indicated by the operating mode signal.

(2)

The encoder according to (1), wherein the processor controls a depth of block division for a block setting process based on the determined operating mode indicated by the operating mode signal for each determined largest coding unit (LCU).

(3) The encoder according to (1) or (2), wherein the encoder is for encoding the image signal according to High Efficiency Video Coding (HEVC).

(4)

The encoder according to any one of (1) to (3), wherein the operating mode is determined based on user input to a user interface selecting the operating mode from a plurality of operating modes.

(5)

The encoder according to any one of (1) to (4), wherein the determined operating mode associated with resource efficiency is one of a normal mode and a resource efficiency mode, the resource efficiency mode being one of a battery usage efficiency mode whereby reducing battery consumption is prioritized over image quality, a battery charge level mode automatically initiated when a battery charge level falls below a threshold, a usage efficiency of processing resources mode whereby processing resources are prioritized, and specified by user input to a user interface.

(6)

The encoder according to any one of (1) to (4), wherein the determined operating mode is one of a first operating mode and a second operating mode, and the processor controls the depth of block division for the block setting process by setting the depth of block division to a first depth in the first operating mode and by setting the depth of block division to a second depth in the second operating mode, the second depth in the second operating mode being less than the first depth in the first operating mode.

(7)

The encoder according to any one of (1) to (4), wherein, for a determined first operating mode from among a plurality of operating modes including the first operating mode and a second operating mode, the processor controls the depth of block division such that no restriction is placed on the depth of block division for the block setting process.

(8)

The encoder according to any one of (1) to (4), wherein, for a determined first operating mode from among a plurality of operating modes including the first operating mode and a second operating mode, the processor performs the block setting process on all coding units (CU), from a smallest coding unit (SCU) to a determined largest coding unit (LCU).

(9)

The encoder according to any one of (1) to (4), for a determined second operating mode from among a plurality of operating modes including a first operating mode and the second operating mode, the processor controls the depth of block division so as to restrict the depth of block division for the block setting process.

(10)

The encoder according to any one of (1) to (4), for a determined second operating mode from among a plurality of operating modes including a first operating mode and the second operating mode, the processor performs the block setting process on less than all coding units (CU) from a smallest coding unit (SCU) to a determined largest coding unit (LCU).

(11)

The encoder according to any one of (1) to (4), for a determined second operating mode from among a plurality of operating modes including a first operating mode and the second operating mode, the processor processes at least one less cost calculation regarding a plurality of coding units (CU) less than a total number of CUs than would be performed for the first operating mode regarding the total number of CUs.

(12)

The encoder according to any one of (9) to (11), wherein the block division process is performed either by increasing a value of a smallest coding unit (SCU) and performing cost calculation and cost comparison regarding all other coding units (CUs), including a determined largest coding unit (LCU), or by skipping cost calculation and comparison regarding the LCU.

(13)

The encoder according to any one of (9) to (11), wherein the block division process is performed either by decreasing a value of a determined largest coding unit (LCU) and performing cost calculation and cost comparison regarding all other coding units (CUs), including a smallest coding unit (SCU), or by skipping cost calculation and comparison regarding the LCU.

(14)

A decoder configured to decode an encoded image signal comprising:

processing circuitry configured to decode the encoded image signal to reproduce a quadtree structure associated with the encoded image signal, wherein the encoded image signal is encoded based on an operating mode signal indicative of a determined operating mode associated with resource efficiency for an encoder that encoded the encoded image signal, and a depth of block division set for a block setting process based on the determined operating mode indicated by the operating mode signal for the encoder that encoded the encoded image signal.

(15)

The decoder according to (14), wherein the processing circuitry reproduces the quadtree structure associated with the encoded image signal by recursively dividing largest coding units (LCUs) of the encoded image signal based on parameters multiplexed to the encoded image signal.

(16)

An image processing system comprising:

a user interface; and processing circuitry configured to receive an operating mode signal indicative of a determined operating mode associated with resource efficiency, and control a depth of block division for a block setting process based on the determined operating mode indicated by the operating mode signal, wherein the determined operating mode is determined based on user input to the user interface selecting the operating mode from a plurality of operating modes.

(17)

The image processing system according to (16), wherein the processing circuitry controls a depth of block division for a block setting process based on the determined operating mode indicated by the operating mode signal for each determined largest coding unit (LCU).

(18)

The image processing system according to (16) or (17), wherein the determined operating mode is one of a first operating mode and a second operating mode, and the processing circuitry controls the depth of block division for the block setting process by setting the depth of block division to a first depth in the first operating mode and by setting the depth of block division to a second depth in the second operating mode, the second depth in the second operating mode being less than the first depth in the first operating mode.

(19)

The image processing system according to any one of (16) to (18), wherein the image processing system is a mobile phone and further comprises a battery.

(20)

The image processing system according to any one of (16) to (18), wherein the image processing system is a recording and playback device and further comprises:
a decoder;
an HDD; and
a disc drive.

(21)

The image processing system according to any one of (16) to (18), wherein the image processing system is a camera and further comprises:
a battery; and
image capture circuitry.

REFERENCE SIGNS LIST 10, 60 image encoding device
14 orthogonal transform section
27 selection section
35 inter prediction section
41 mode control section
47 block setting section

The invention claimed is:

1. An encoder for encoding an image signal comprising:
processing circuitry configured to
perform cost calculation and divisional determination with respect to coding units,
receive an operating mode signal indicative of a determined operating mode associated with resource efficiency, and
set a depth of block division for a block setting process based on the determined operating mode indicated by the operating mode signal, wherein
in case the operating mode signal indicates an operating mode requiring resource efficiency higher than that of a normal mode, the processing circuitry
sets a first depth of block division with more limited variety of pixel sizes of coding units than that of the normal mode for the block setting process,
performs cost calculation and divisional determination only with respect to coding units within the set first depth, and
skips cost calculation and divisional determination with respect to coding units outside the set first depth.

2. The encoder according to claim 1, wherein the processing circuitry controls the depth of block division for the block setting process based on the determined operating mode indicated by the operating mode signal for each determined largest coding unit (LCU).

3. The encoder according to claim 1, wherein the encoder is for encoding the image signal according to High Efficiency Video Coding (HEVC).

4. The encoder according to claim 1, wherein the operating mode is determined based on user input to a user interface selecting the operating mode from a plurality of operating modes.

5. The encoder according to claim 1, wherein the determined operating mode associated with resource efficiency is one of the normal mode and a resource efficiency mode, the resource efficiency mode being one of a battery usage efficiency mode whereby reducing battery consumption is prioritized over image quality, a battery charge level mode automatically initiated when a battery charge level falls below a threshold, a usage efficiency of processing resources mode whereby processing resources are prioritized, and specified by user input to a user interface.

6. The encoder according to claim 1, wherein the determined operating mode is one of a first operating mode and a second operating mode, and the processing circuitry controls the depth of block division for the block setting process by setting the depth of block division to a first depth in the first operating mode and by setting the depth of block division to a second depth in the second operating mode, the second depth in the second operating mode being less than the first depth in the first operating mode.

7. The encoder according to claim 1, wherein, for a determined first operating mode from among a plurality of operating modes including the first operating mode and a second operating mode, the processing circuitry controls the depth of block division such that no restriction is placed on the depth of block division for the block setting process.

8. The encoder according to claim 1, wherein, for a determined first operating mode from among a plurality of operating modes including the first operating mode and a second operating mode, the processing circuitry performs the block setting process on all coding units (CU), from a smallest coding unit (SCU) to a determined largest coding unit (LCU).

9. The encoder according to claim 1, for a determined second operating mode from among a plurality of operating modes including a first operating mode and the second operating mode, the processing circuitry controls the depth of block division so as to restrict the depth of block division for the block setting process.

10. The encoder according to claim 1, for a determined second operating mode from among a plurality of operating modes including a first operating mode and the second operating mode, the processing circuitry performs the block setting process on less than all coding units (CU) from a smallest coding unit (SCU) to a determined largest coding unit (LCU).

11. The encoder according to claim 1, for a determined second operating mode from among a plurality of operating modes including a first operating mode and the second operating mode, the processing circuitry processes at least one less cost calculation regarding a plurality of coding units (CU) less than a total number of CUs than would be performed for the first operating mode regarding the total number of CUs.

12. The encoder according to claim 9, wherein the block division process is performed either by increasing a value of a smallest coding unit (SCU) and performing cost calculation and cost comparison regarding all other coding units (CUs), including a determined largest coding unit (LCU), or by skipping cost calculation and comparison regarding the LCU.

13. The encoder according to claim 9, wherein the block division process is performed either by decreasing a value of a determined largest coding unit (LCU) and performing cost calculation and cost comparison regarding all other coding units (CUs), including a smallest coding unit (SCU), or by skipping cost calculation and comparison regarding the LCU.

14. A decoder configured to decode an encoded image signal comprising:
processing circuitry configured to decode the encoded image signal to reproduce a quadtree structure associated with the encoded image signal, wherein
the encoded image signal is encoded based on an operating mode signal indicative of a determined operating mode associated with resource efficiency for an encoder that encoded the encoded image signal, a depth of block division is set for a block setting process based on the determined operating mode indicated by the operating mode signal for the encoder that encoded the encoded image signal, and in case the operating mode signal indicates an operating mode requiring resource efficiency higher than that of a normal mode, cost calculation and divisional determination are performed by the encoder only with respect to coding units within the set depth, and cost calculation and divisional determination are skipped by the encoder with respect to coding units outside the set depth.

15. The decoder according to claim 14, wherein the processing circuitry reproduces the quadtree structure associated with the encoded image signal by recursively dividing largest coding units (LCUs) of the encoded image signal based on parameters multiplexed to the encoded image signal.

16. An image processing system comprising:

a user interface; and processing circuitry configured to perform cost calculation and divisional determination with respect to coding units receive an operating mode signal indicative of a determined operating mode associated with resource efficiency, and set a depth of block division for a block setting process based on the determined operating mode indicated by the operating mode signal, wherein in case the operating mode signal indicates an operating mode requiring resource efficiency higher than that of a normal mode, the processing circuitry sets a first depth of block division with more limited variety of pixel sizes of coding units than that of the normal mode for the block setting process, performs cost calculation and divisional determination only with respect to coding units within the set first depth, skips cost calculation and divisional determination with respect to coding units outside the set first depth, and the determined operating mode is determined based on user input to the user interface selecting the operating mode from a plurality of operating modes.

17. The image processing system according to claim 16, wherein the processing circuitry controls the depth of block division for the block setting process based on the determined operating mode indicated by the operating mode signal for each determined largest coding unit (LCU).

18. The image processing system according to claim 16, wherein the determined operating mode is one of a first operating mode and a second operating mode, and the processing circuitry controls the depth of block division for the block setting process by setting the depth of block division to a first depth in the first operating mode and by setting the depth of block division to a second depth in the second operating mode, the second depth in the second operating mode being less than the first depth in the first operating mode.

19. The image processing system according to claim 16, wherein the image processing system is a mobile phone and further comprises a battery.

20. The image processing system according to claim 16, wherein the image processing system is a recording and playback device and further comprises:

a decoder;

an HDD; and a disc drive.

21. The image processing system according to claim 16, wherein the image processing system is a camera and further comprises:

a battery; and image capture circuitry.

* * * * *